United States Patent
Yamashita

(10) Patent No.: US 7,454,142 B2
(45) Date of Patent: Nov. 18, 2008

(54) DATA TRANSMISSION METHOD AND DATA TRANSMISSION APPARATUS

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1397 days.

(21) Appl. No.: 10/636,803

(22) Filed: Aug. 7, 2003

(65) Prior Publication Data
US 2004/0131359 A1    Jul. 8, 2004

(30) Foreign Application Priority Data
Aug. 9, 2002    (JP)    ............... 2002-232610

(51) Int. Cl.
*H04J 14/02*    (2006.01)
(52) U.S. Cl. ............... 398/82; 398/89; 398/78; 398/79; 398/66
(58) Field of Classification Search ........... 398/82, 398/89, 78, 79, 66; 348/207.1; 714/820
See application file for complete search history.

(56) References Cited

U.S. PATENT DOCUMENTS

| | | | | |
|---|---|---|---|---|
| 5,539,846 | A * | 7/1996 | Morikura et al. | 385/24 |
| 6,493,361 | B1 * | 12/2002 | Yamaguchi et al. | 370/532 |
| 2001/0022676 | A1 * | 9/2001 | Ishikawa et al. | 359/127 |
| 2001/0028486 | A1 * | 10/2001 | Kashima | 359/118 |
| 2001/0055135 | A1 * | 12/2001 | Sigloch | 359/124 |
| 2002/0057476 | A1 * | 5/2002 | Yamane | 359/124 |

FOREIGN PATENT DOCUMENTS

| | | |
|---|---|---|
| JP | 2002-185433 | 6/2002 |
| WO | WO 02/062071 | 8/2002 |

* cited by examiner

*Primary Examiner*—Kenneth Vanderpuye
*Assistant Examiner*—Hibret A Woldekidan
(74) *Attorney, Agent, or Firm*—Frommer Lawrence & Haug LLP; William S. Frommer

(57) ABSTRACT

A data transmission method and apparatus is disclosed by which bidirectional transmission of a plurality of optical signals obtained by conversion of a plurality of serial digital data can be achieved efficiently using a single common optical signal transmission cable. A plurality of serial data based on digital video signals from a camera section are converted into a plurality of optical signals using a CWDM technique and then multiplexed into a multiplexed optical signal. The multiplexed optical signal is signaled to a signal transmission cable through a bidirectional WDM coupler disposed at a first end of the optical signal transmission cable so as to be transmitted from the first end to a second end of the optical signal transmission cable. Further, serial data based on return video signals from a signal recording and reproduction section are converted into optical signals and then signaled to the optical signal transmission cable through another bidirectional WDM coupler disposed at the second end of the optical signal transmission cable. Consequently, the optical signals are transmitted from the second end to the first end of the optical signal transmission cable.

13 Claims, 26 Drawing Sheets

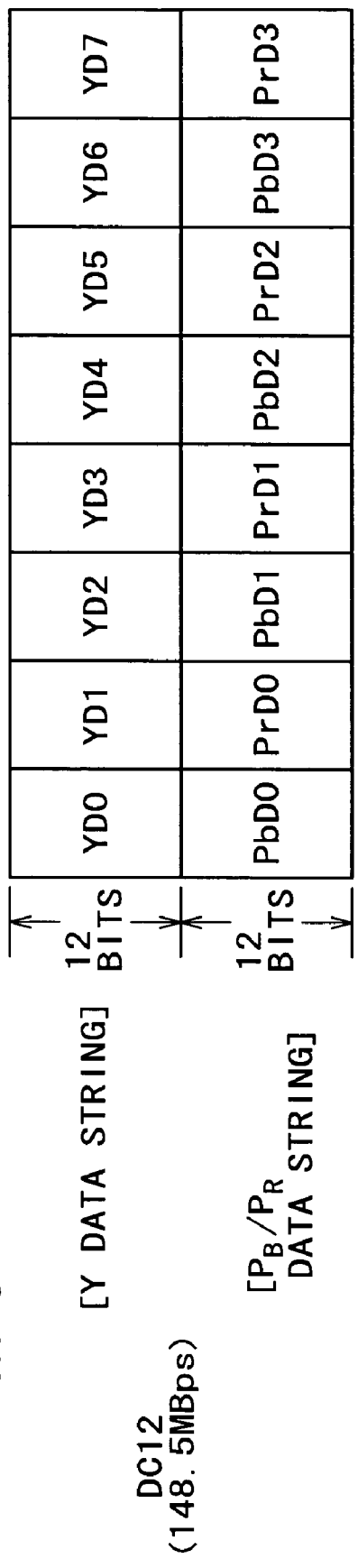
F I G. 3 A
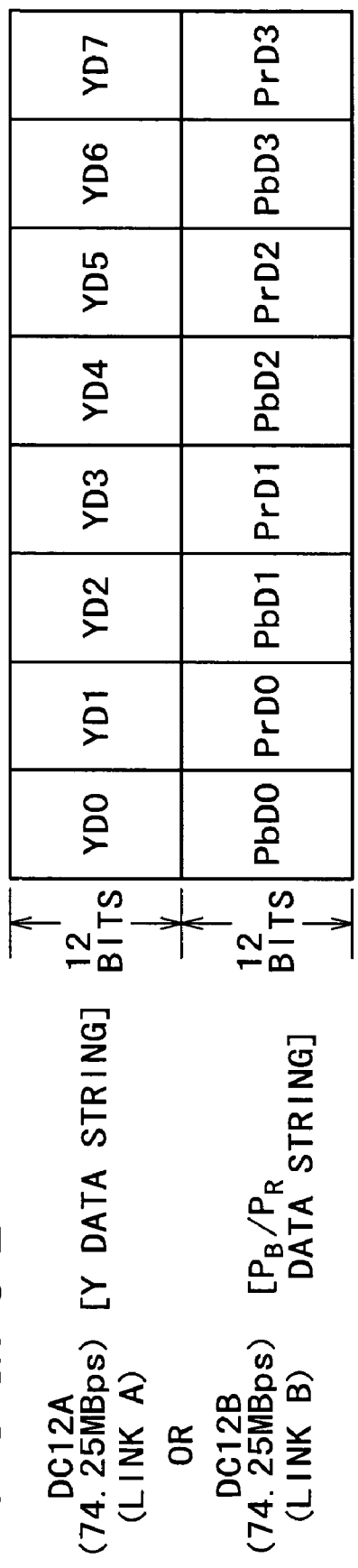
F I G. 3 B

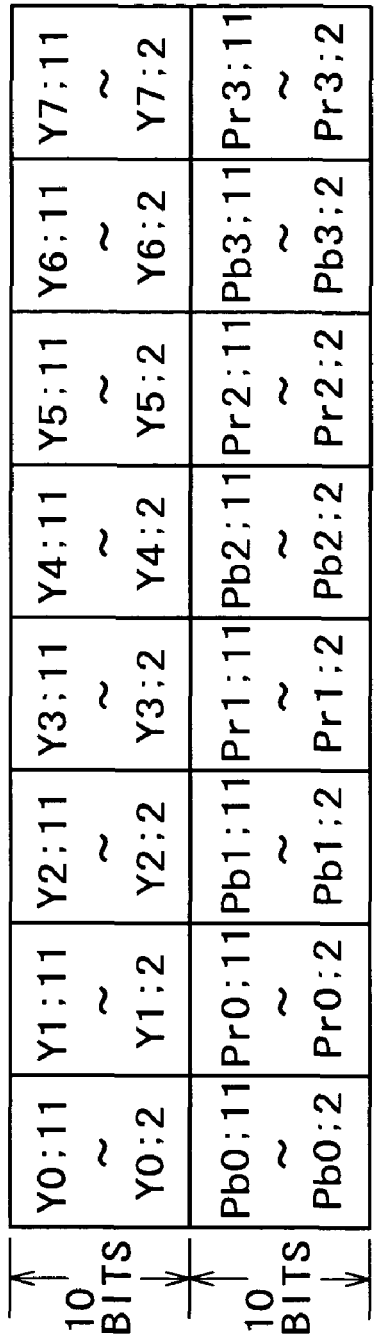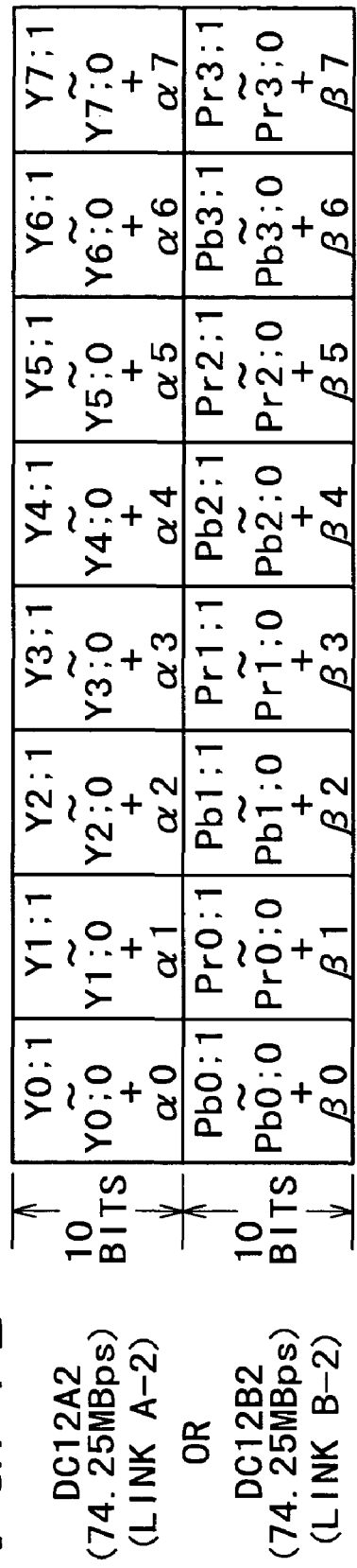

FIG. 6

10-BIT WORD GROUP 1

| 10 BITS | GD0 | GD1 | GD2 | GD3 | GD4 | GD5 | GD6 | GD7 |
|---|---|---|---|---|---|---|---|---|
| 10 BITS | BD0 | BD1 | BD2 | BD3 | BD4 | BD5 | BD6 | BD7 |
| 10 BITS | RD0 | RD1 | RD2 | RD3 | RD4 | RD5 | RD6 | RD7 |
| 10 BITS | ad0 | ad1 | ad2 | ad3 | ad4 | ad5 | ad6 | ad7 |

10-BIT WORD GROUP 2

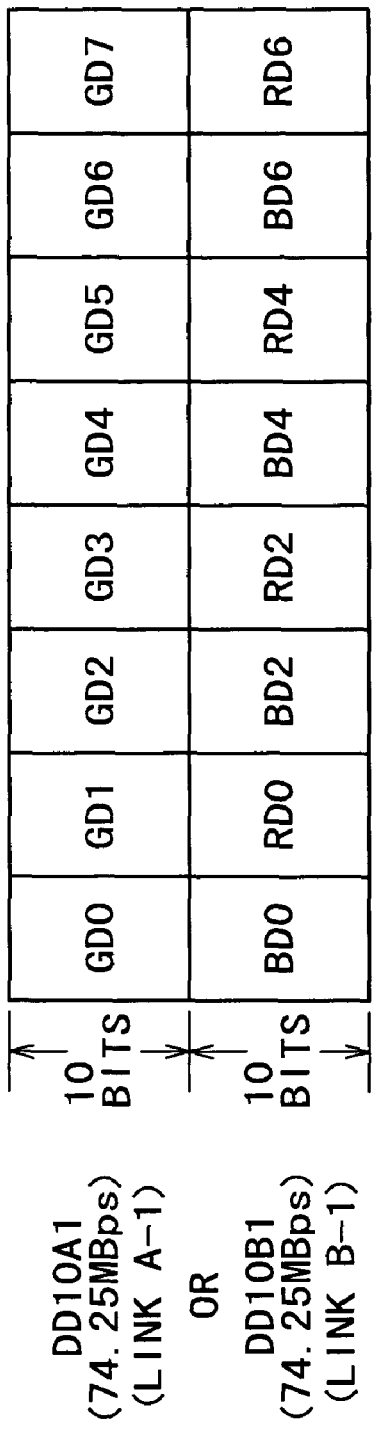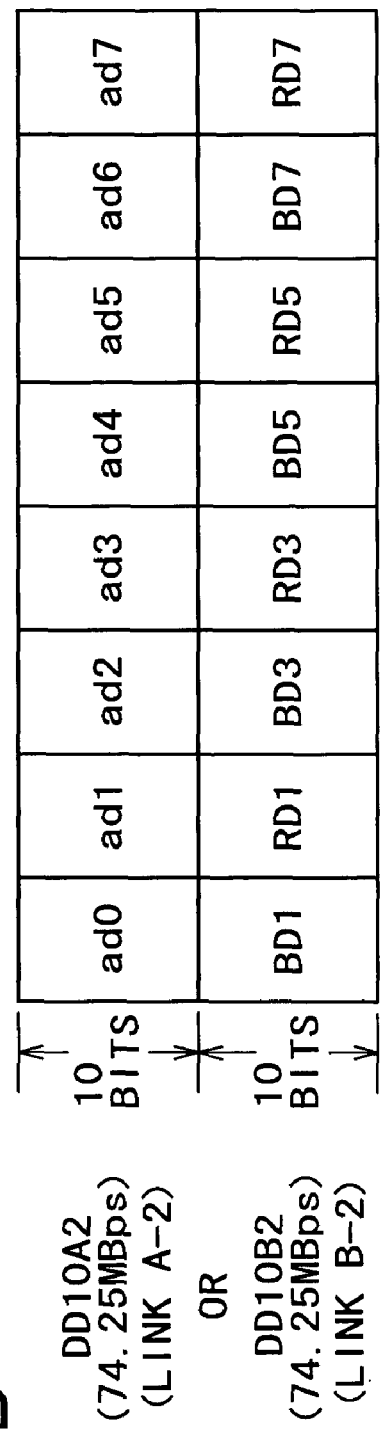

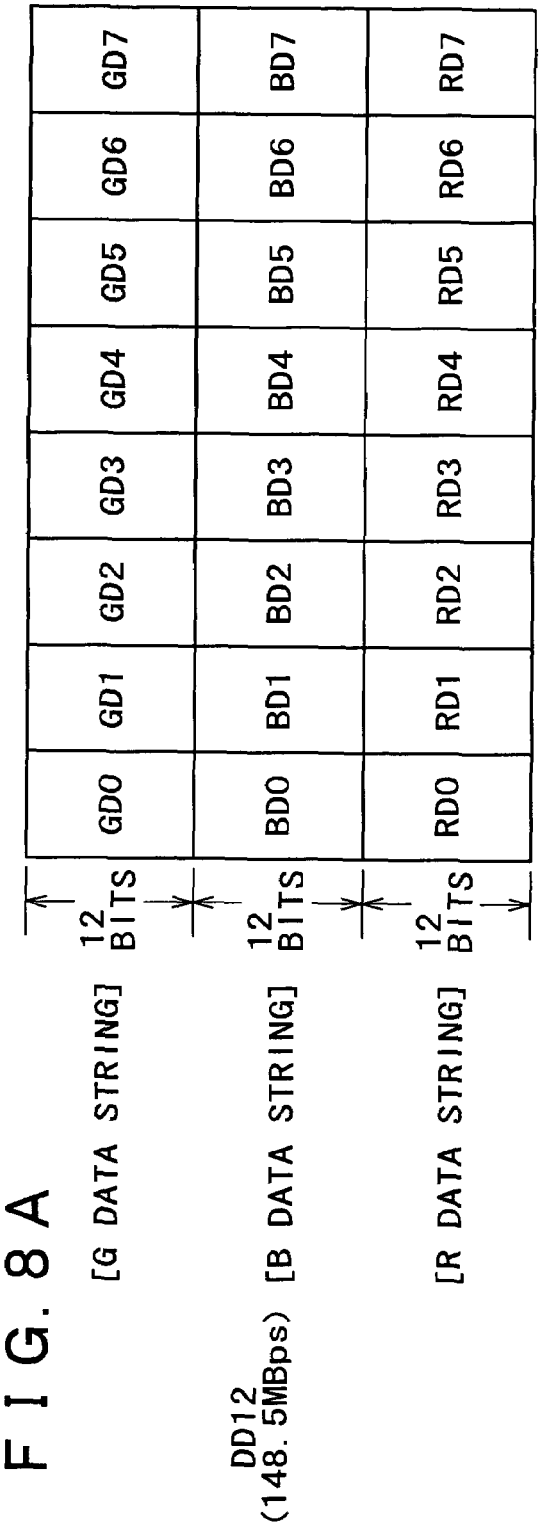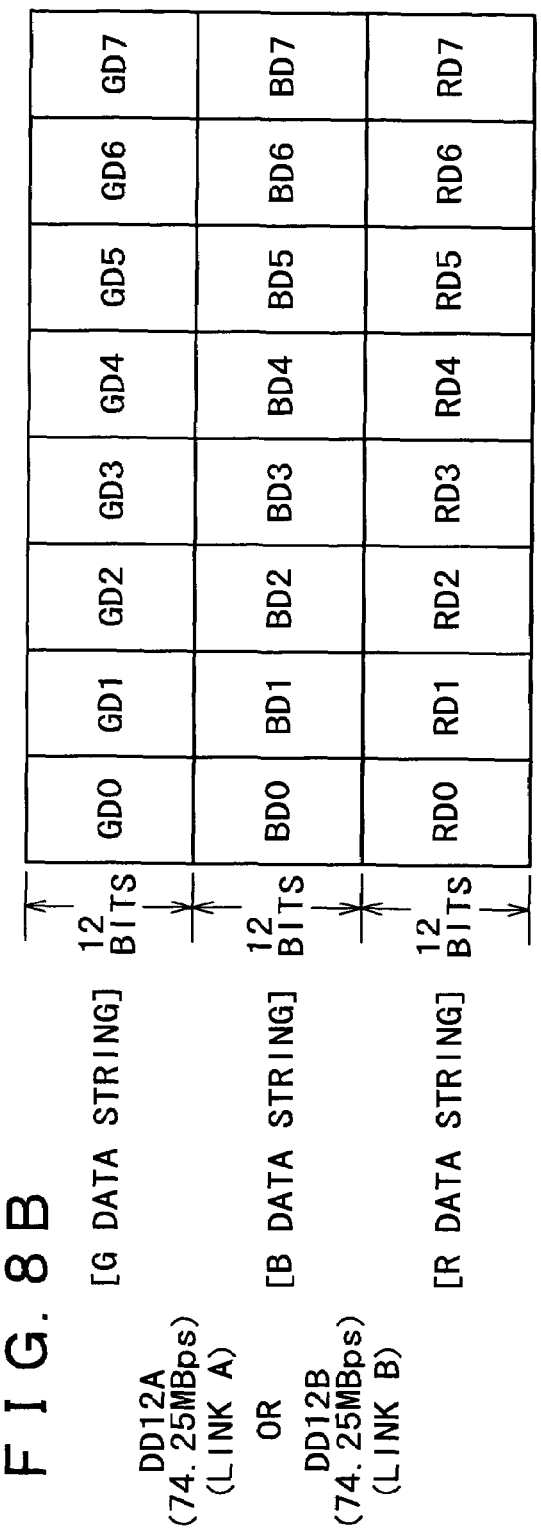

FIG. 9

10-BIT WORD GROUP 1

| | | | | | | | |
|---|---|---|---|---|---|---|---|
| G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
| B0;11 ~ B0;2 | B1;11 ~ B1;2 | B2;11 ~ B2;2 | B3;11 ~ B3;2 | B4;11 ~ B4;2 | B5;11 ~ B5;2 | B6;11 ~ B6;2 | B7;11 ~ B7;2 |
| R0;11 ~ R0;2 | R1;11 ~ R1;2 | R2;11 ~ R2;2 | R3;11 ~ R3;2 | R4;11 ~ R4;2 | R5;11 ~ R5;2 | R6;11 ~ R6;2 | R7;11 ~ R7;2 |
| GBR0(0-1) + $\gamma 0$ | GBR1(0-1) + $\gamma 1$ | GBR2(0-1) + $\gamma 2$ | GBR3(0-1) + $\gamma 3$ | GBR4(0-1) + $\gamma 4$ | GBR5(0-1) + $\gamma 5$ | GBR6(0-1) + $\gamma 6$ | GBR7(0-1) + $\gamma 7$ |

(each row labeled "10 BITS" on the left)

10-BIT WORD GROUP 2

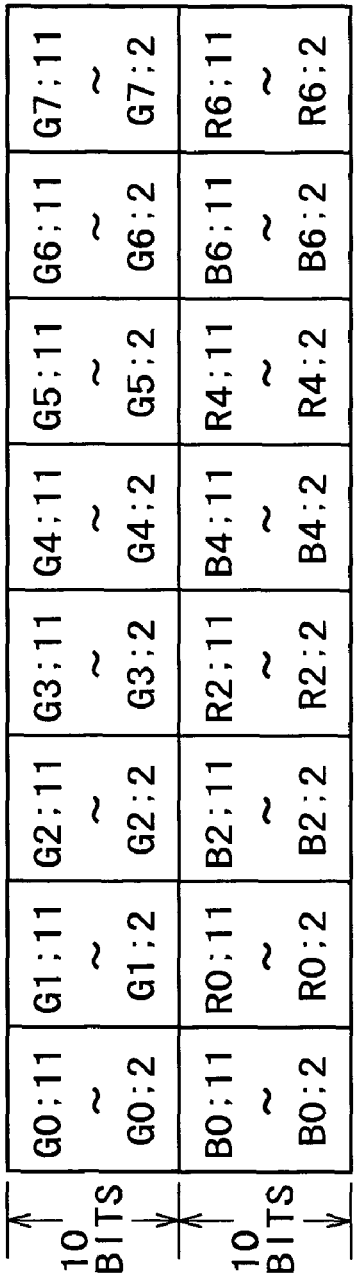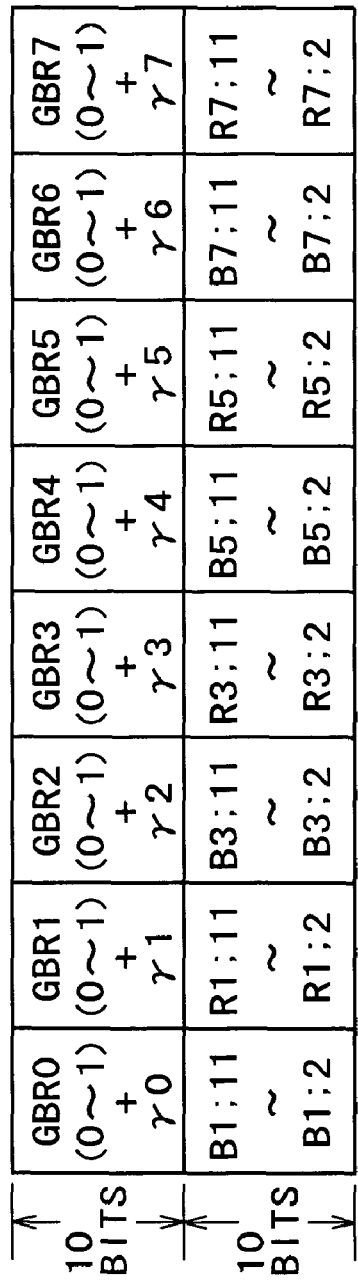

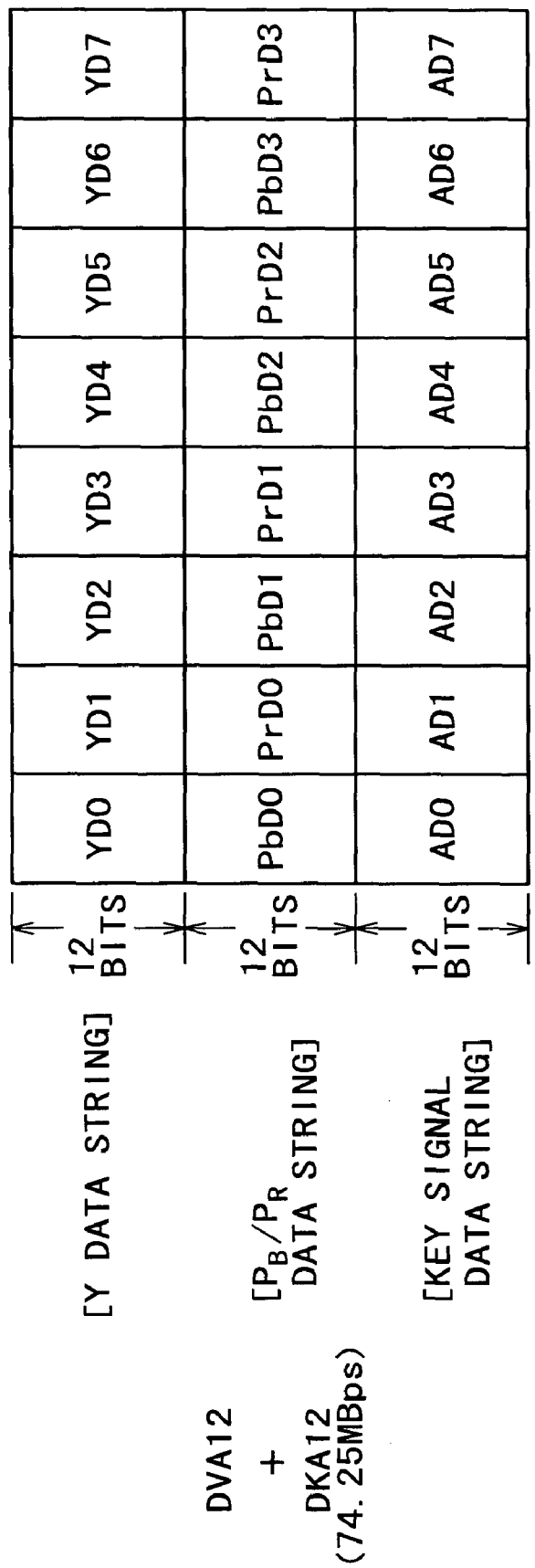

FIG. 16A

| | | | | | | | | |
|---|---|---|---|---|---|---|---|---|
| DVC12A (74.25MBps) (LINK A) — 10 BITS | Y0; 2-11 | Y1; 2-11 | Y2; 2-11 | Y3; 2-11 | Y4; 2-11 | Y5; 2-11 | Y6; 2-11 | Y7; 2-11 |
| — 10 BITS | Pb0; 2-11 | Pr0; 2-11 | Pb1; 2-11 | Pr1; 2-11 | Pb2; 2-11 | Pr2; 2-11 | Pb3; 2-11 | Pr3; 2-11 |

FIG. 16B

| | | | | | | | | |
|---|---|---|---|---|---|---|---|---|
| DVC12B (74.25MBps) (LINK B) — 10 BITS | [Y0; 0-1] + c0 | [Y1; 0-1] + c1 | [Y2; 0-1] + c2 | [Y3; 0-1] + c3 | [Y4; 0-1] + c4 | [Y5; 0-1] + c5 | [Y6; 0-1] + c6 | [Y7; 0-1] + c7 |
| — 10 BITS | [Pb0; 0-1] + d0 | [Pr0; 0-1] + d1 | [Pb1; 0-1] + d2 | [Pr1; 0-1] + d3 | [Pb2; 0-1] + d4 | [Pr2; 0-1] + d5 | [Pb3; 0-1] + d6 | [Pr3; 0-1] + d7 |

FIG. 16C

| | | | | | | | | |
|---|---|---|---|---|---|---|---|---|
| DVC12C (74.25MBps) (LINK C) — 10 BITS | A0; 2-11 | A1; 2-11 | A2; 2-11 | A3; 2-11 | A4; 2-11 | A5; 2-11 | A6; 2-11 | A7; 2-11 |
| — 10 BITS | [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

FIG. 17A

DVC12A
(74.25MBps)
(LINK A)

| 10 BITS | Y0; 2-11 | Y1; 2-11 | Y2; 2-11 | Y3; 2-11 | Y4; 2-11 | Y5; 2-11 | Y6; 2-11 | Y7; 2-11 |
|---|---|---|---|---|---|---|---|---|
| 10 BITS | Pb0; 2-11 | Pr0; 2-11 | Pb1; 2-11 | Pr1; 2-11 | Pb2; 2-11 | Pr2; 2-11 | Pb3; 2-11 | Pr3; 2-11 |

FIG. 17B

DVC12B
(74.25MBps)
(LINK B)

| 10 BITS | [Y0BR0; 0-1] + d0 | [Y1; 0-1] + e0 | [Y2BR1; 0-1] + d1 | [Y3; 0-1] + e1 | [Y4BR2; 0-1] + d2 | [Y5; 0-1] + e2 | [Y6BR3; 0-1] + d3 | [Y7; 0-1] + e3 |
|---|---|---|---|---|---|---|---|---|
| 10 BITS | αD0 | αD1 | αD2 | αD3 | αD4 | αD5 | αD6 | αD7 |

FIG. 17C

DVC12C
(74.25MBps)
(LINK C)

| 10 BITS | A0; 2-11 | A1; 2-11 | A2; 2-11 | A3; 2-11 | A4; 2-11 | A5; 2-11 | A6; 2-11 | A7; 2-11 |
|---|---|---|---|---|---|---|---|---|
| 10 BITS | [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

[Y0BR0; 0-1] → Y0; 0-1, Pb0; 0-1, Pr0; 0-1

[Y2BR1; 0-1] → Y2; 0-1, Pb1; 0-1, Pr1; 0-1

[Y4BR2; 0-1] → Y4; 0-1, Pb2; 0-1, Pr2; 0-1

[Y6BR3; 0-1] → Y6; 0-1, Pb3; 0-1, Pr3; 0-1

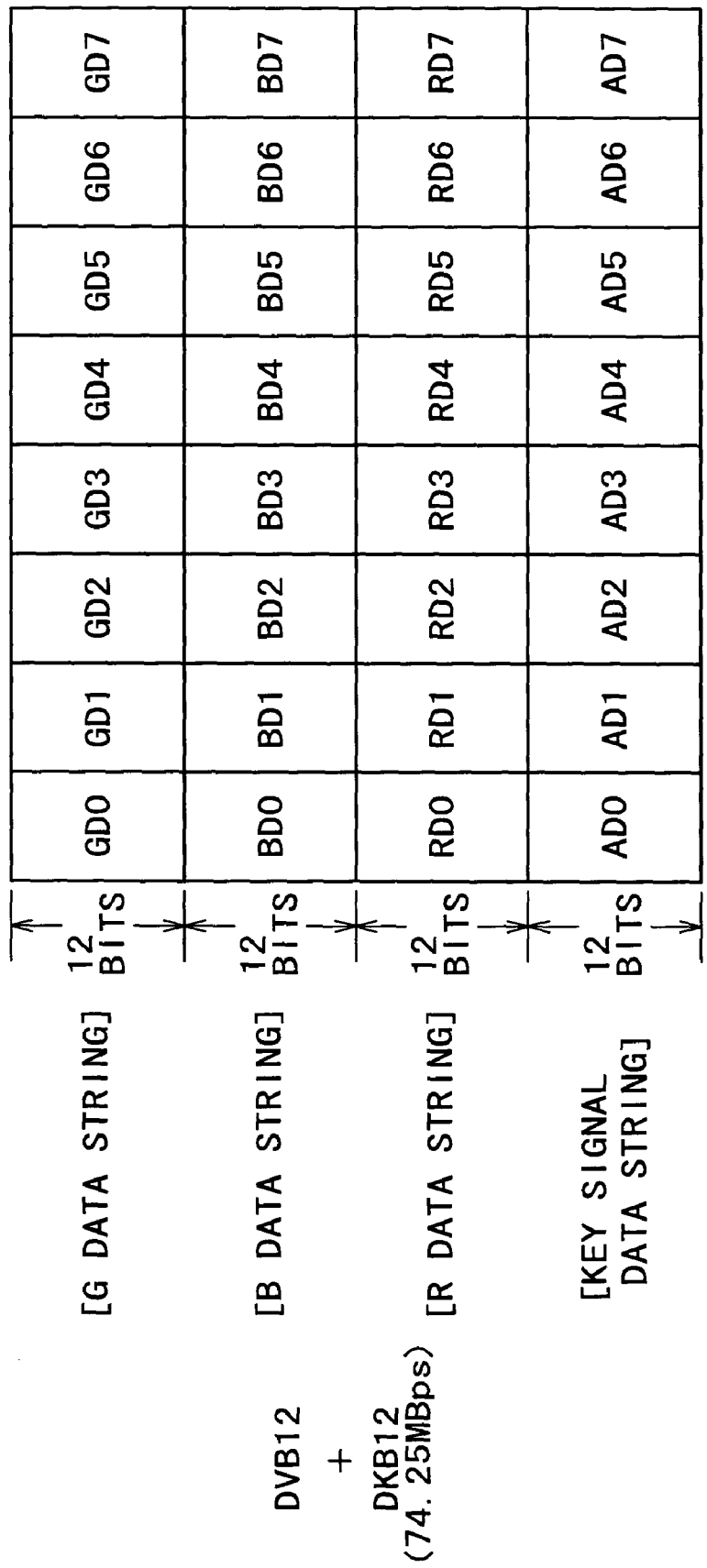

FIG. 19

10-BIT WORD GROUP 1

| 10 BITS | G0; 2-11 | G1; 2-11 | G2; 2-11 | G3; 2-11 | G4; 2-11 | G5; 2-11 | G6; 2-11 | G7; 2-11 |
|---|---|---|---|---|---|---|---|---|
| 10 BITS | B0; 2-11 | B1; 2-11 | B2; 2-11 | B3; 2-11 | B4; 2-11 | B5; 2-11 | B6; 2-11 | B7; 2-11 |
| 10 BITS | R0; 2-11 | R1; 2-11 | R2; 2-11 | R3; 2-11 | R4; 2-11 | R5; 2-11 | R6; 2-11 | R7; 2-11 |
| 10 BITS | [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |

[GBR0; 0-1]
↓
$G_n$; 0-1
$B_n$; 0-1
$R_n$; 0-1
(n=0, 1, 2, 3, ········)

10-BIT WORD GROUP 2

FIG. 20A

| | 10 BITS | G0; 2-11 | G1; 2-11 | G2; 2-11 | G3; 2-11 | G4; 2-11 | G5; 2-11 | G6; 2-11 | G7; 2-11 |
|---|---|---|---|---|---|---|---|---|---|
| DVD12A (74.25MBps) (LINK A) | 10 BITS | B0; 2-11 | R0; 2-11 | B2; 2-11 | R2; 2-11 | B4; 2-11 | R4; 2-11 | B6; 2-11 | R6; 2-11 |

FIG. 20B

| | 10 BITS | [GBR0; 0-1] + f0 | [GBR1; 0-1] + f1 | [GBR2; 0-1] + f2 | [GBR3; 0-1] + f3 | [GBR4; 0-1] + f4 | [GBR5; 0-1] + f5 | [GBR6; 0-1] + f6 | [GBR7; 0-1] + f7 |
|---|---|---|---|---|---|---|---|---|---|
| DVD12B (74.25MBps) (LINK B) | 10 BITS | B1; 2-11 | R1; 2-11 | B3; 2-11 | R3; 2-11 | B5; 2-11 | R5; 2-11 | B7; 2-11 | R7; 2-11 |

FIG. 20C

| | 10 BITS | A0; 2-11 | A1; 2-11 | A2; 2-11 | A3; 2-11 | A4; 2-11 | A5; 2-11 | A6; 2-11 | A7; 2-11 |
|---|---|---|---|---|---|---|---|---|---|
| DVD12C (74.25MBps) (LINK C) | 10 BITS | [A0; 0-1] + e0 | [A1; 0-1] + e1 | [A2; 0-1] + e2 | [A3; 0-1] + e3 | [A4; 0-1] + e4 | [A5; 0-1] + e5 | [A6; 0-1] + e6 | [A7; 0-1] + e7 |

[Y DATA STRING]

[P_B/P_R DATA STRING]

YD0~YDn : Y SIGNAL DATA WORD
PbD0~PbD(n−1)/2 : P_B SIGNAL DATA WORD
PrD0~PrD(n−1)/2 : P_R SIGNEL DATA WORD

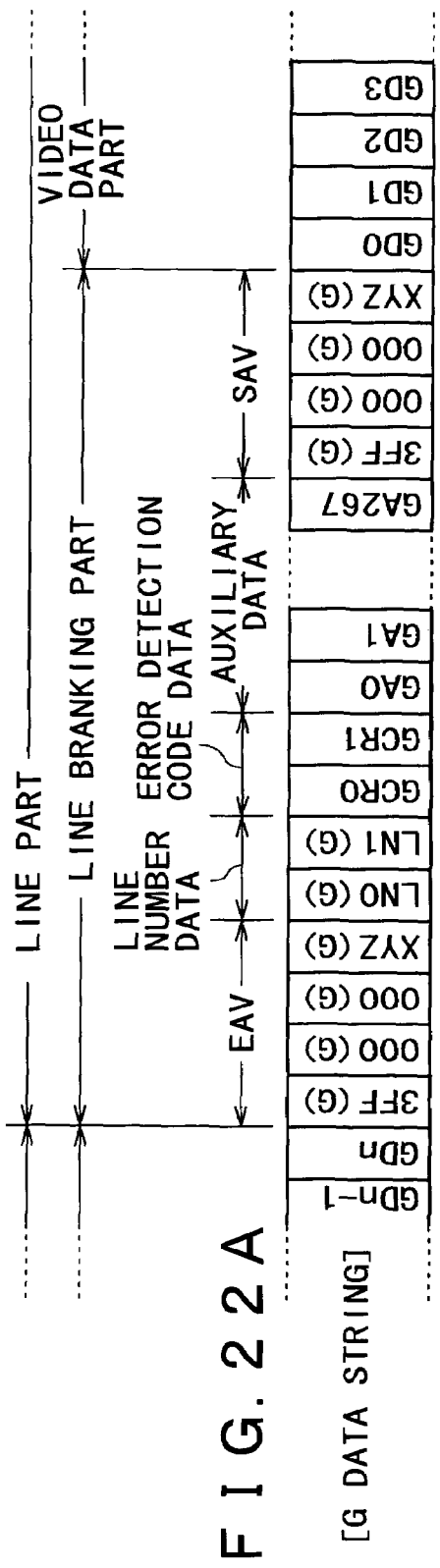
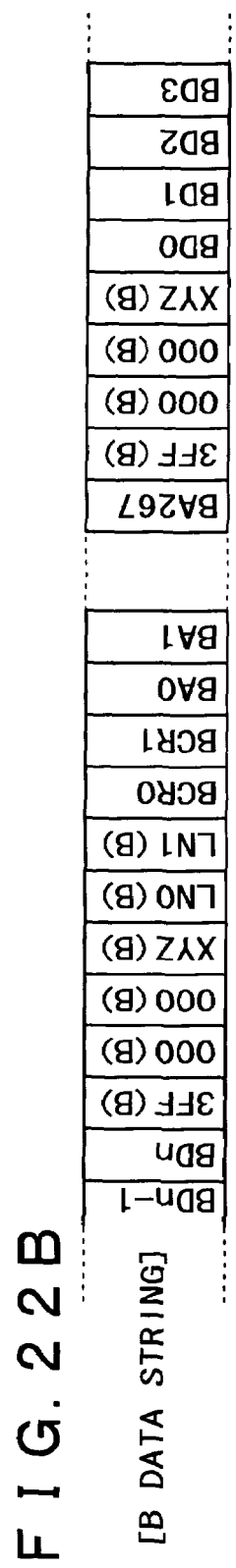
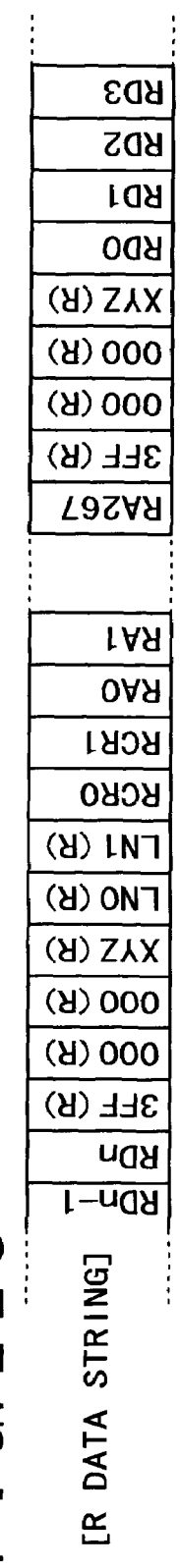
FIG. 22A [G DATA STRING]
FIG. 22B [B DATA STRING]
FIG. 22C [R DATA STRING]

F I G. 2 3

| DATA | EFFECTIVE DATA SAMPLE NUMBER/L (SAMPLES) | AL NUMBER /FRAME (LINES) | FRAME RATE (Hz) | SAMPLING FREQUENCY (MHz) | QUANTIZATION BIT NUMBER (BITS) |
|---|---|---|---|---|---|
| DA12:1080/24P, 25P, 30P /4:2:2/ 12 | 1920 | 1080 | 24, 25, 30 | 74.25 | 12 |
| DA14:1080/24P, 25P, 30P /4:2:2/ 14 | 1920 | 1080 | 24, 25, 30 | 74.25 | 14 |
| DA16:1080/24P, 25P, 30P /4:2:2/ 16 | 1920 | 1080 | 24, 25, 30 | 74.25 | 16 |
| DB10:1080/24P, 25P, 30P /4:4:4/ 10 | 1920 | 1080 | 24, 25, 30 | 74.25 | 10 |
| DB12:1080/24P, 25P, 30P /4:4:4/ 12 | 1920 | 1080 | 24, 25, 30 | 74.25 | 12 |
| DC12:1080/50P, 60P /4:2:2/ 12 | 1920 | 1080 | 50, 60 | 148.5 | 12 |
| DC14:1080/50P, 60P /4:2:2/ 14 | 1920 | 1080 | 50, 60 | 148.5 | 14 |
| DC16:1080/50P, 60P /4:2:2/ 16 | 1920 | 1080 | 50, 60 | 148.5 | 16 |
| DD10:1080/50P, 60P /4:4:4/ 10 | 1920 | 1080 | 50, 60 | 148.5 | 10 |
| DD12:1080/50P, 60P /4:4:4/ 12 | 1920 | 1080 | 50, 60 | 148.5 | 12 |

\* P：PROGRESSIVE SYSTEM       \* L：LINES       \* AL：EFFECTIVE LINES

F I G. 2 4

| DATA | EFFECTIVE DATA SAMPLE NUMBER/L (SAMPLES) | AL NUMBER /FRAME (LINES) | FRAME RATE (Hz) | SAMPLING FREQUENCY (MHz) | QUANTIZATION BIT NUMBER (BITS) |
|---|---|---|---|---|---|
| DVA12:720/60P / 4:2:2 / 12 | 1280 | 720 | 60 | 74.25 | 12 |
| DVA14:720/60P / 4:2:2 / 14 | 1280 | 720 | 60 | 74.25 | 14 |
| DVA16:720/60P / 4:2:2 / 16 | 1280 | 720 | 60 | 74.25 | 16 |
| DVB10:720/60P / 4:4:4 / 10 | 1280 | 720 | 60 | 74.25 | 10 |
| DVB12:720/60P / 4:4:4 / 12 | 1280 | 720 | 60 | 74.25 | 12 |
| DVA10+DKA10:720/60P / 4:2:2:4 / 10 | 1280 | 720 | 60 | 74.25 | 10 |
| DVA12+DKA12:720/60P / 4:2:2:4 / 12 | 1280 | 720 | 60 | 74.25 | 12 |
| DVA14+DKA14:720/60P / 4:2:2:4 / 14 | 1280 | 720 | 60 | 74.25 | 14 |
| DVA16+DKA16:720/60P / 4:2:2:4 / 16 | 1280 | 720 | 60 | 74.25 | 16 |
| DVB10+DKB10:720/60P / 4:4:4:4 / 10 | 1280 | 720 | 60 | 74.25 | 10 |
| DVB12+DKB12:720/60P / 4:4:4:4 / 12 | 1280 | 720 | 60 | 74.25 | 12 |

* P:PROGRESSIVE SYSTEM     * L:LINES     * AL:EFFECTIVE LINES

DATA TRANSMISSION METHOD AND DATA TRANSMISSION APPARATUS

BACKGROUND OF THE INVENTION

This invention relates to a data transmission method wherein a plurality of optical signals obtained by converting a plurality of digital data representative of video signal information or like information into serial data and then opto-electrically converting the serial data are bidirectionally transmitted between two transmission/reception sections through an optical signal transmission cable and a data transmission apparatus for carrying out the data transmission method.

In the field of video signals, digitalization is proceeding in order to achieve diversification of transmission information and higher picture quality of reproduction images. For example, a high definition television (HDTV) system which handles a digital video signal formed from digital data representative of video signal information has been proposed. A digital video signal under the HDTV system (a signal of the type mentioned is hereinafter referred to as HD digital video signal) is formed, for example, in accordance with specifications established by the BTA (Broadcasting Technology Association). According to the specification, a digital video signal of the Y, $P_B/P_R$ format and another digital video signal of the G, B, R format are available. In the digital video signal of the Y, $P_B/P_R$ format, Y signifies a luminance signal, and $P_B$ and $P_R$ signify color difference signals. Meanwhile, in the digital video signal of the G, B, R format, G, B, and R signify a green primary color signal, a blue primary color signal and a red primary color signal, respectively.

The HD digital video signal of the Y, $P_B/P_R$ format has a frame rate of 30 Hz or 30/1.001 Hz (in the present specification, both rates are referred to as 3.:/;./0 Hz) and is a signal for interlaced scanning wherein each frame image is formed separately in a first field image and a second field image. The digital video signal of the Y, $P_B/P_R$ format is formed, for example, with such a data format as illustrated in FIGS. 21A and 21B. The data format illustrated in FIGS. 21A and 2B includes a luminance signal data string (Y data string) representative of luminance signal information of the video signal as seen in FIG. 21A and a color difference signal data string ($P_B/P_R$ data string) representative of color difference signal information as seen in FIG. 21B. Each of the Y data string and the $P_B/P_R$ data string has a quantization bit number of 10, and accordingly, each of data words which form the data strings has a 10-bit configuration. Further, each of the Y data string and the $P_B/P_R$ data string has a word transmission rate of, for example, 74.25 MBps. FIG. 21A illustrates a line blanking part in a line part of the Y data string and part of video data parts forwardly and rearwardly of the line blanking part. FIG. 21B illustrates a line blanking part in a line part of the $P_B/P_R$ data string and part of video data parts forwardly and rearwardly of the line blanking part.

In the Y data string, each video data part is preceded by timing reference code data (SAV: Start of Active Video) of 4 words (3FF(Y), 000(Y), 000(Y), XYZ(Y); 3FF, 000 and XYZ are hexadecimal representations, and (Y) represents that the word is included in the Y data string) each having a 10-bit configuration. Further, each video data part is followed by another timing reference code data (EAV; End of Active Video) of 4 words (3FF(Y), 000(Y), 000(Y), XYZ(Y)) each having a 10-bit configuration. Similarly, also in the $P_B/P_R$ data string, each video data part is preceded by timing reference code data SAV of 4 words (3FF(C), 000(C), 000(C), XYZ(C); 3FF, 000 and XYZ are hexadecimal representations, and (C) represents that the word is included in the $P_B/P_R$ data string) each having a 10-bit configuration. Further, each video data is followed by another timing reference code data EAV of 4 words (3FF(C), 000(C), 000(C), XYZ(C)) each having a 10-bit configuration. Naturally, each of the timing reference code data EAV and SAV in the Y data string is disposed in each of the line blanking parts in the Y data string, and each of the timing reference code data EAV and SAV in the $P_B/P_R$ data string is disposed in each of the line blanking parts in the $P_B/P_R$ data string.

In the four words (3FF, 000, 000, XYZ) shown with (Y) or (C) added thereto, the first three words (3FF, 000, 000) are provided for establishing word synchronism or line synchronism. Meanwhile, the last one word (XYZ) is provided for identification between the first field and the second field in the same frame or for identification between the timing reference code data SAV and the timing reference code data EAV. This similarly applies to the following description.

Also the HD digital video signal of the G, B, R format is a signal for interlaced scanning having a frame rate of 30 Hz and is formed with such a data format, for example, as illustrated in FIGS. 22A, 22B, and 22C. The data format illustrated in FIGS. 22A, 22B, and 22C includes a green primary color signal data string (G data string) of the video signal as seen in FIG. 22A, a blue primary color signal data string (B data string) of the video signal as seen in FIG. 22B, and a red primary color signal data string (R data string) of the video signal as seen in FIG. 22C. The G data string represents green primary color signal information. The B data string represents blue primary color signal information. The R data string represents red primary color signal information. Each of the G, B, and R data strings has a quantization bit number of 10, and accordingly, each of data words which form the data strings has a 10-bit configuration. Further, each of the G, B, and R data strings has a word transmission rate of, for example, 74.25 MBps. FIGS. 22A, 22B, and 22C illustrate a line blanking part in a line part of the G, B, and R data strings, respectively, and part of video data parts forwardly and rearwardly of the line blanking part.

In each of the G, B, and R data strings, each video data part is preceded by timing reference code data SAV of 4 words (3FF(G), 000(G), 000(G), XYZ(G); (G) represents that the word is included in the G data string, 3FF(B), 000(B), 000(B), XYZ(B); (B) represents that the word is included in the B data string, 3FF(R), 000(R), 000(R), XYZ(R); (R) represents that the word is included in the R data string) each having a 10-bit configuration. Further, each video data part is followed by another timing reference code data EAV of 4 words (3FF(G), 000(G), 000(G), XYZ(G); 3FF(B), 000(B), 000(B), XYZ(B); or 3FF(R), 000(R), 000(R), XYZ(R)) each having a 10-bit configuration. Naturally, each of the timing reference code data EAV and SAV in the G, B, and R data strings is disposed in each of the line blanking parts in the G, B or R data string.

The existing HDTV system employs an HD digital video signal of the Y, $P_B/P_R$ format or the G, B, R format for interlaced scanning having a frame rate of 30 Hz as described above. In contrast, as an HDTV system of a next generation, a system is proposed which employs an HD digital video signal of the Y, $P_B/P_R$ format or the G, B, R format for progressive scanning having a frame rate of 60 Hz or 60/1.001 Hz (in the present specification, both rates are referred to as 60 Hz). According to the progressive scanning, each frame image is formed without being divided into first and second fields. The HD digital video signal of the Y, $P_B/P_R$ format or the G, B, R format for progressive scanning is called HD digital video signal of the progressive type.

It has been proposed to standardize the format of digital data which form an HD digital video signal of the progressive type having a frame rate of 60 Hz with the standards SMPTE 274M established by the SMPTE (Society of Motion Picture and Television Engineers) of the United States. The format standardized by the SMPTE 274M includes prescriptions of a frame rate: 60 Hz, an effective data sample number per line: 1.920, an effective line number per frame: 1.080, a sampling frequency: 148.5 MHz or 148.5/1.001 MHz (in the present specification, both frequencies are referred to as 148.5 MHz), and a quantization bit number: 8 or 10. Further, the parallel data interface uses 8 bits×2=16 bits or 10 bits×2=20 bits for the Y, $P_B/P_R$ format, but uses 8 bits×3=24 or 10 bits×3=30 bits for the G, B, R format.

In digital data which form a digital video signal whose quantization bit number is 8 or 10 as just described, a code which is not used to represent video signal information is defined as an inhibition code. For example, where the quantization bit number is 8, 00h and FFh (the suffix h represents that the numeral is a hexadecimal representation), that is, 0000 0000, and 1111 1111, are defined as inhibition bits. Meanwhile, where the quantization bit number is 10, 000h to 003h, and 3FCh to 3FFh, that is, 00 0000 0000 to 00 0000 0011 and 11 1111 1100 to 11 1111 1111, are defined as inhibition codes.

It is to be noted that, in the Y, $P_B/P_R$ format, the sampling frequency of each of the $P_B$ data string and the $P_R$ data string is ½ that of the Y data string. In the following description, the Y, $P_B/P_R$ format is suitably represented as 4:2:2 format. Meanwhile, in the G, B, R format, the sampling frequencies of the G, B, and R data strings are equal to each other. In the following description, the G, B, R format is suitably represented as 4:4:4 format.

Separately from such an HD digital video signal as described above, a digital video signal of the progressive type is proposed for producing moving pictures of a cinema to be projected, for example, through a film including 24 frames per second with picture quality equal to that of an image obtained by the HDTV system. Such a digital video signal as just described is hereinafter referred to as D-Cinema signal.

The D-Cinema signal can be considered as a digital video signal of the progressive type which has a frame rate of, for example, 24 Hz or 24/1.001 Hz (in the present specification, both rates are referred to as 24 Hz). However, the frame rate of the D-Cinema signal is not limited to 24 Hz, but may be 25 Hz, 30 Hz, 50 Hz, 60 Hz or some other rate. Digital data which form a digital video signal whose frame rate is 24 Hz, 25 Hz, 30 Hz, 50 Hz, 60 Hz or some other rate are standardized in terms of the format by the SMPTE 274M. In particular, the format includes prescriptions of an effective data sample number per line: 1920, an effective line number per frame: 1080, a sampling frequency: 74.25 MHz or 74.25/1.001 MHz (in the present specification, both frequencies are referred to as 74.25 MHz) or 148.5 MHz, and a quantization bit number: 8 or 10. Further, the parallel data interface uses 8 bits×2=16 bits or 10 bits×2=20 bits for the 4:2:2 format, but uses 8 bits×3=24 bits or 10 bits×3=30 bits for the 4:4:4 format.

Further, separately from the HD digital video signal and the D-Cinema signal described above, a different digital video signal of the progressive type (hereinafter referred to as 720P signal) has been proposed. The 720P signal has a frame rate set to 60 Hz and an effective line number set to 720 for each frame and further has an effective data sample number set to 1280 for each line. Digital data which form the 720p signal are standardized in terms of the format by the SMPTE 296M established by the SMPTE. The format standardized by the SMPTE 296M includes prescriptions of a frame rate: 60 Hz, an effective line number per frame: 720, an effective data sample number per line: 1280, a line number per frame: 750, a sampling frequency: 74.25 MHz, and a quantization bit number: 8 or 10. Further, the parallel data interface uses 8 bits×2=16 bits or 10 bits×2=20 bits for the Y, $P_B/P_R$ format, but uses 8 bits×3=24 bits or 10 bits×3=30 bits for the G, B, R format.

The 720P signal was proposed during a transition period to HD digital video signals in the field of digital video signals. While the effective line number per frame and the effective data sample number per line of the HD digital video signal are 1080 lines and 1920 samples, respectively, those of the 720P signal are 720 lines and 1280 lines which are equal to two thirds those of the HD digital video signal, respectively. Therefore, while the 720P signal is inferior to the HD digital video signal in terms of the resolution of an-image reproduced based thereon, since the frame rate is 60 Hz, the 720P signal is suitable for utilization as a signal representative of images which exhibit a quick movement.

In such a situation as described above, it becomes demanded to further improve, for example, the resolution of an image reproduced based on digital data which form a digital video signal such as the HD digital video signal, D-Cinema signal or 720P signal. To this end, it is demanded to set the quantization bit number to a higher bit number than the bit number 8 or 10 used in the past, for example, to 12 bits, 14 bits or 16 bits. However, although existing standards for digital data which form a digital video signal including the SMPTE 274M and the SMPTE 296M standardize digital data whose quantization bit number is 8 or 10, they do not standardize quantization bit numbers exceeding 8 or 10, such as, for example, bit numbers of 12, 14, and 16.

Further, digital data which form a digital video signal whose quantization bit number is 12, 14 or 16 involves a problem regarding transmission. In particular, for transmission of digital data which form a digital video signal, it is desired to use serial transmission wherein the digital data are transmitted after converted into serial data. At present, however, only it is standardized that digital data which form an HD digital signal of the 4:2:2 format whose quantization bit number is 8 or 10 are transmitted using the HD SDI (High Definition Serial Digital Interface) according to the standards BTA S-004 established by the BTA mentioned hereinabove. On the other hand, nothing is standardized for serial transmission of digital data of the other formats such as, for example, digital data which form a digital video signal of the 4:4:4 format or digital data which form a digital video signal whose quantization bit number exceeds 10.

In connection with a video signal whose digitalization is proceeding as described above, a Key signal has been proposed which is used for synthesis of a video signal with another video signal. The Key signal is a signal representative of the opacity or transparency of the related video signal and is recommended in the "SMPTE RECOMMENDED PRACTICE" RP 157-1995.

In the Key signal relating to a digital video signal of the 4:2:2 format, a Key signal data string representative of digital data which form the Key signal has a format equivalent to that of a Y data string included in the digital data which form the digital video signal. Thus, the Key signal data string is handled similarly to the Y data string. Meanwhile, in the Key signal relating to a digital video signal of the 4:4:4 format, a Key signal data string representative of digital data which form the Key signal has a format equivalent to that of a G data string included in the digital data which form the digital video signal. Thus, the Key signal data string is handled similarly to the G data string.

It is sometimes demanded to transmit, upon transmission of digital data which form a digital video signal of the 4:2:2 format or the 4:4:4 format, digital data which form the digital video signal and a Key signal data string relating to the digital data. In such an instance, the following conditions are demanded from the point of view of facilitation in carrying out of the transmission and reduction of the cost. In particular, it is demanded that, in addition to digital data which form a digital video signal of the 4:2:2 format or the 4:4:4 format, a Key signal data string relating to the digital data be transmitted as an additional information data string incidental to the digital data which form the digital video signal to be transmitted. Also it is demanded that such transmission of digital data and a relating Key signal data string as just described be performed utilizing existing circuit components used for serial transmission of digital data which form, for example, a digital video signal whose quantization bit number is 10.

Details of various D-Cinema signals whose quantization bit number is 10, 12, 14, and 16 are, for example, such as illustrated in FIG. 23. Meanwhile, details of various 720P signals whose quantization bit number is 10, 12, 14, and 16 and combinations of such 720P signals and Key signals are, for example, such as illustrated in FIG. 24.

The digital video signal such as a D-Cinema signal or a 720P signal as described above or a digital video signal of the type mentioned and a Key signal are obtained, for example, from a video camera which performs an image pickup operation to form a video signal. The digital video signal or the digital video signal and the Key signal are then supplied to a signal recording and reproduction section which includes a video tape recorder (VTR) which records and reproduces the digital video signal or the digital video signal and the Key signal when necessary.

Upon image pickup by a video camera and recording and/or reproduction of a video signal from the video camera by the signal recording and reproduction section, for recording of broadcasting program information by a television broadcasting station or the like, usually a plurality of video cameras are used and form a camera section. Video signals or video signals and Key signals obtained from the video cameras which form the camera section are sent to the signal recording and reproduction section.

When the plurality of video cameras of the camera section are used for image pickup, it is necessary for each person (cameraman) who operates one of the video cameras to know an image pickup situation by the other video cameras. To this end, reproduction images based on image signals obtained from the other video cameras are displayed on an image monitor provided for each of the video cameras. Therefore, the video signals obtained from the video cameras and sent to the signal recording and reproduction section are subject a to predetermined process in the signal recording and reproduction section. Then, the video signals processed in this manner are supplied from the signal recording and reproduction section to the camera section formed from the plurality of video cameras.

The video signals supplied to the camera section formed from the plurality of video cameras are used for image reproduction on the image monitor provided for each of the video cameras of the camera section. Therefore, it is not demanded that reproduction images based on the video signals have particularly high quality. Therefore, such video signals derived from the other video cameras are obtained by performing a compression process and so forth to limit the transmission capacity thereof, and thereby facilitating transmission. In the following description, a video signal obtained, for example, by performing a compression process for a video signal is referred to as return video signal.

In this manner, between the camera section and the signal recording and reproduction section, bidirectional transmission of video signals or video signals and Key signals and a return video signal is performed. More particularly, video signals or video signals and Key signals obtained from the plurality of video cameras of the camera section are transmitted to the signal recording and reproduction section which includes a VTR. Meanwhile, a return video signal for which predetermined processing has been performed is transmitted from the signal recording and reproduction section to the camera section. Typically, a plurality of return video signals are transmitted.

Where each of the video signals obtained from the plurality of video cameras of the camera section is, for example, a D-Cinema signal or a 720P signal, the return signal is also a digital signal, that is, a digital return signal. When the D-Cinema signals or 720P signals and the digital return signals are transmitted, they are transmitted in the form of serial digital data.

As possible measures, the D-cinema signals or 720P signals or the D-Cinema signals or 720P signals and the Key signals obtained from the plurality of video cameras which form the camera section and the digital return video signals are bidirectionally transmitted between the camera section and the signal recording and reproduction section in the following manner. In particular, digital data which form the D-Cinema signal or 720P signals or the D-Cinema signals or 720P signals and the Key signals and digital data which form the digital return video signals are converted individually into optical signals. Then, the optical signals are transmitted through an optical signal transmission cable which has a great transmission signal capacity and exhibits a high transmission efficiency. In this instance, the optical signal transmission cable for interconnecting the camera section and the signal recording and reproduction section may be formed using an optical fiber.

An optical fiber used for formation of such an optical signal transmission cable as described above typically is a quartz single mode fiber, that is, a quartz SMF. The quartz SMF typically has a core diameter of 10 .,m and a clad diameter of 125 .,m and has a single propagation mode. The quartz SMF has characteristics that the transmission frequency band is wide and that the propagation loss can be suppressed low. Accordingly, the quartz SMF can be applied advantageously to high-speed long-haul communication by an optical signal and is suitable for transmission of an optical signal based on a digital video signal obtained from a video camera.

The quartz SMF exhibits attenuation of an optical signal in accordance with an attenuation characteristic illustrated in FIG. 25 and exhibits dispersion of an optical signal in accordance with a dispersion characteristic illustrated in FIG. 26. The dispersion of an optical signal is spread of a frequency spectrum of the optical signal and spread or waveform distortion of the propagation time of the optical signal caused by the material and the structure of the optical fiber. The attenuation characteristic illustrated in FIG. 25 exhibits a minimum value of attenuation with respect to light having a wavelength of approximately 1.3 .,m and light having another wavelength of approximately 1.5 .,m. Meanwhile, the dispersion characteristic illustrated in FIG. 26 exhibits minimum dispersion with respect to light having a wavelength of approximately 1.3 .,m.

When digital data which form digital video signals including D-Cinema signals, 720P signals or the like or such digital video signals and Key signals obtained from a plurality of video cameras which form a camera section and digital data which form digital return video signals are individually converted into optical signals and the optical signals are bidirectionally transmitted between the camera section and a signal recording and reproduction section using an optical signal transmission cable as described above, a plurality of optical signals are bidirectionally transmitted between the camera section and the signal recording and reproduction section. Accordingly, where a conventional data transmission technique is used, serial transmission of digital data which form digital video signals including D-Cinema signals or 720P signals or such video signals and Key signals requires parallel arrangement of a large number of optical signal transmission cables between the camera section and the signal recording and reproduction section. This also arises from the fact that it cannot be avoided to transmit the digital data which form the digital video signals or the digital video signals and Key signals divisionally in a plurality of channels. Such arrangement of a large number of optical signal transmission cables requires a great cable installation space and a high cost.

Therefore, a data transmission system is demanded which can use a single optical signal transmission cable to achieve efficient bidirectional transmission, between the camera section and the signal recording and reproduction section, of a plurality of optical signals obtained by conversion of digital data which form digital video signals including D-Cinema signals, 720P signals or the like and such digital video signals and Key signals obtained individually from a plurality of video cameras which form the camera section and digital data which form digital return video signals. However, no data transmission system of the type described is conventionally available.

SUMMARY OF THE INVENTION

It is an object of the present invention to provide a data transmission method and a data transmission apparatus by which a plurality of optical signals based on a plurality of serial digital data can be transmitted bidirectionally using a common optical signal transmission cable and therefore, where the method or the apparatus is applied to bidirectional transmission between a camera section and a signal recording and reproduction section of a plurality of optical signals obtained by conversion of digital data, which form digital video signals including D-Cinema signals, 720P signals, or the like having a quantization bit number greater than 10, or such digital video signals and Key signals obtained individually, for example, from a plurality of video cameras, which form the camera section, and digital video data, which form digital return video signals, the bidirectional transmission can be performed efficiently using the single optical signal transmission cable.

In order to attain the object described above, according to, an aspect of the present invention, there is provided a data transmission method, including the steps of forming first to fourth word string data based on parallel data representative of digital video signals having a frame rate set to 50 Hz or 60 Hz, an effective line number set to 1,080 for each frame, and an effective data sample number set to 1,920 for each line, producing first to fourth serial data based on the first to fourth word string data, respectively, converting the first to fourth serial data into first to fourth optical signals having first to fourth center frequencies, respectively, which are successively proximate to each other with a predetermined wavelength interval left therebetween, multiplexing the first to fourth optical signals to obtain a multiplexed optical signal, supplying the multiplexed optical signal to a first input/output terminal of a first bidirectional wavelength multiplexing coupler (bidirectional WDM coupler), which has the first input/output terminal and a second input/output terminal provided at an end thereof and has a third input/output terminal provided at the other end thereof, so that the multiplexed optical signal is led out to the third input/output terminal of the first bidirectional WDM coupler, the multiplexed optical signal led out to the third input/output terminal being signaled to an optical signal transmission-cable so that the multiplexed optical signal is transmitted from a first end to a second end of the optical signal transmission cable, converting fifth serial data into a fifth optical signal, supplying the fifth optical signal to a fourth input/output terminal of a second bidirectional WDM coupler, which has the fourth input/output terminal and a fifth input/output terminal provided at an end thereof and has a sixth input/output terminal provided at the other end thereof, so that the fifth optical signal is led out to the sixth input/output terminal, the fifth optical signal led out to the sixth input/output terminal being transmitted to the optical signal transmission cable so that the fifth optical signal is transmitted from the second end to the first end of the optical signal transmission cable, leading out the multiplexed optical signal transmitted to the second end of the optical signal transmission cable to the fifth input/output terminal of the second bidirectional WDM coupler, performing a demultiplexing process and an opto-electric conversion process for the multiplexed optical signal led out to the fifth input/output terminal of the second bidirectional WDM coupler to reproduce the first to fourth serial data, leading out the fifth optical signal transmitted to the first end of the optical signal transmission cable to the second input/output terminal of the first bidirectional WDM coupler, and performing an opto-electric conversion process for the fifth optical signal led out to the second input/output terminal of the first bidirectional WDM coupler to reproduce the fifth serial data.

The data transmission method described above is suitably carried out by a data transmission apparatus, including a data processing section for forming first to fourth word string data based on parallel data representative of digital video signals, which have a frame rate set to 50 Hz or 60 Hz, an effective line number set to 1,080 for each frame, and an effective data sample number set to 1,920 for each line, a parallel/serial (P/S) conversion section for producing first to fourth serial data based on the first to fourth word string data, respectively, first to fourth electro-optical (E/O) conversion sections for converting the first to fourth serial data into first to fourth optical signals having first to fourth center frequencies, respectively, which are successively proximate to each other with a predetermined wavelength interval left therebetween, a multiplexed optical signal formation section for multiplexing the first to fourth optical signals to produce a multiplexed optical signal, a first bidirectional WDM coupler having first and second input/output terminals provided at an end thereof and having a third input/output terminal provided at the other end thereof, the first bidirectional WDM coupler leading out, when the multiplexed optical signal is supplied to the first input/output terminal thereof, the multiplexed optical signal to the third input/output terminal thereof, a fifth E/O conversion section for converting fifth serial data into a fifth optical signal, a second bidirectional WDM coupler having fourth and fifth input/output terminals provided at an end thereof and having a sixth input/output terminal provided at the other end thereof, the second bidirectional WDM coupler leading out, when the fifth optical signal is supplied to the fourth input/output terminal thereof, the fifth optical signal to the sixth input/output terminal thereof, an optical signal transmission cable for transmitting the multiplexed optical signal led out to the third input/output terminal of the first bidirectional WDM coupler from a first end to a second end thereof and transmitting the fifth optical signal led out to the sixth input/output terminal of the second bidirectional WDM coupler from the second end to the first end thereof, a demultiplexing section for demultiplexing the multiplexed optical signal appearing at the second end of the optical signal transmission cable and led out to the fifth input/output terminal from the sixth input/output terminal through the second bidirectional WDM coupler into the first to fourth optical signals, first to fourth opto-electric (O/E) conversion sections for converting the first to fourth optical signals obtained from the demultiplexing section into the first to fourth serial data, respectively, and a fifth O/E conversion section for converting the fifth optical signal appearing at the first end of the optical signal transmission cable and led out to the second input/output terminal from the third input/output terminal through the first bidirectional WDM coupler into the fifth serial data.

With the data transmission method and the data transmission apparatus described above, first to fourth serial data based on digital data forming digital video signals, which have a frame rate set to 50 Hz or 60 Hz, an effective line number set to 1,080 for each frame, and an effective data sample number set to 1,920 for each line, and fifth serial data different from the first to fourth serial data are converted into optical signals and bidirectionally transmitted by using a single optical signal transmission cable. The digital video signals may be, for example, signals of the 4:2:2 format or the 4:4:4 format having a quantization bit number of 10, 12, 14, or 16.

Then, the first to fourth serial data and the fifth serial data are reproduced at the respective transmission destinations of the optical signals through the single optical signal transmission cable.

The bidirectional transmission of the first to fourth serial data and the fifth serial data can be performed making use of existing circuit components, for example, for serial transmission of digital video signals in conformity with the HD SDI.

According to another aspect of the present invention, there is provided a data transmission method, including the steps of forming first to third word string data based on parallel data representative of a digital video signal having a frame rate set to 60 Hz, an effective line number set to 720 for each frame, and an effective data sample number set to 1,280 for each line, producing first to third serial data based on the first to third word string data, respectively, converting the first to third serial data into first to third optical signals having first to third center frequencies, respectively, which are successively proximate to each other with a predetermined wavelength interval left therebetween, supplying the first to third optical signals to first, second, and third input/output terminals of a first bidirectional WDM coupler, which has the first to third input/output terminals and a fourth input/output terminal provided at an end thereof and has a fifth input/output terminal provided at the other end thereof, so that a multiplexed optical signal is led out to the fifth input/output terminal of the first bidirectional WDM coupler, the multiplexed optical signal being supplied to a sixth input/output terminal of a second bidirectional WDM coupler, which has the sixth input/output terminal and a seventh input/output terminal provided at an end thereof and has an eighth input/output terminal provided at the other end thereof, so that the multiplexed optical signal is led out to the eighth input/output terminal of the second bidirectional WDM coupler, the multiplexed optical signal led out to the eighth input/output terminal being signaled to an optical signal transmission cable so that the multiplexed optical signal is transmitted from a first end to a second end of the optical signal transmission cable, converting fourth serial data into a fourth optical signal having a fourth center frequency proximate to the third center frequency with a predetermined wavelength interval left therebetween, the fourth optical signal being supplied to a twelfth input/output terminal of a third bidirectional WDM coupler, which has ninth to eleventh input terminals and the twelfth input/output terminal provided at an end thereof and has a thirteenth input/output terminal provided at the other end thereof, so that the fourth optical signal is led out to the thirteenth input/output terminal, the fourth optical signal led out to the thirteenth input/output terminal being supplied to a fourteenth input/output terminal of a fourth bidirectional WDM coupler, which has the fourteenth input/output terminal and a fifteenth input/output terminal provided at an end thereof and has a sixteenth input/output terminal provided at the other end thereof, so that the fourth optical signal is led out to the sixteenth input/output terminal of the fourth bidirectional WDM coupler, the fourth optical signal led out to the sixteenth input/output terminal being signaled to the optical signal transmission cable so that the fourth optical signal is transmitted from the second end to the first end of the optical signal transmission cable, converting fifth serial data into a fifth optical signal and supplying the fifth optical signal to the fifteenth input/output terminal of the fourth bidirectional WDM coupler so that the fifth optical signal is led out to the sixteenth input/output terminal of the fourth bidirectional WDM coupler, the fifth optical signal led out to the sixteenth input/output terminal being signaled to the optical signal transmission cable so that the fifth optical signal is transmitted from the second end to the first end of the optical signal transmission cable, leading out the multiplexed optical signal transmitted to the second end of the optical signal transmission cable to the fourteenth input/output terminal of the fourth bidirectional WDM coupler, the multiplexed optical signal led out to the fourteenth input/output terminal being led out as the first to third optical signals to the ninth to eleventh input/output terminals of the third bidirectional WDM coupler, performing an opto-electric conversion process for the first to third optical signals led out respectively to the ninth to eleventh input/output terminals of the third bidirectional WDM coupler to reproduce the first to third serial data, leading out the fourth optical signal transmitted to the first end of the optical signal transmission cable to the sixth input/output terminal of the second bidirectional WDM coupler, the fourth optical signal led out to the sixth input/output terminal being led out to the fourth input/output terminal of the first bidirectional WDM coupler, performing an opto-electric conversion process for the fourth optical signal led out to the fourth input/output terminal of the first bidirectional WDM coupler to reproduce the fourth serial data, leading out the fifth optical signal transmitted to the first end of the optical signal transmission cable to the seventh input/output terminal of the second bidirectional WDM coupler, and performing an opto-electric conversion process for the fifth optical signal led out to the seventh input/output terminal of the second bidirectional WDM coupler to reproduce the fifth serial data.

The data transmission method described above is suitably carried out by a data transmission apparatus, including a data processing section for forming first to third word string data based on parallel data representative of digital video signals which have a frame rate set to 60 Hz, an effective line number set to 720 for each frame, and an effective data sample number set to 1,280 for each line, a P/S conversion section for producing first to third serial data based on the first to third word string data, respectively, first to third E/O conversion sections for converting the first to third serial data into first to third optical signals having first to third center frequencies, respectively, which are successively proximate to each other with a predetermined wavelength interval left therebetween, a first bidirectional WDM coupler having first to fourth input/output terminals provided at an end thereof and having a fifth input/output terminal provided at the other end thereof, the first bidirectional WDM coupler leading out, when the first to third optical signals are supplied to the first to third input/output terminals thereof, respectively, a multiplexed optical signal of the first to third optical signals to the fifth input/output terminal, respectively, a second bidirectional WDM coupler having sixth and seventh input/output terminals provided at an end thereof and having an eighth input/output terminal provided at the other end thereof, the second bidirectional WDM coupler leading out, when the multiplexed signal led out to the fifth input/output terminal of the first bidirectional WDM coupler is supplied to the sixth input/output terminal thereof, the multiplexed optical signal to the eighth input/output terminal, a fourth O/E conversion section for converting fourth serial data into a fourth optical signal having a fourth center frequency proximate to the third center frequency with a predetermined wavelength interval left therebetween, a fifth O/E conversion section for converting fifth serial data into a fifth optical signal, a third bidirectional WDM coupler having ninth to twelfth input terminals provided at an end thereof and having a thirteenth input/output terminal provided at the other end thereof, the third bidirectional WDM coupler leading out, when the fourth optical signal is supplied to the twelfth input/output terminal thereof, the fourth optical signal to the thirteenth input/output terminal thereof, a fourth bidirectional WDM coupler having fourteenth and fifteenth input/output terminals provided at an end thereof and having a sixteenth input/output terminal provided at the other end thereof, the fourth bidirectional WDM coupler leading out, when the fourth optical signal led out to the thirteenth input/output terminal of the third bidirectional WDM coupler is supplied to the fourteenth input/output terminal thereof, the fourth optical signal to the sixteenth input/output terminal thereof, the fourth bidirectional WDM coupler leading out, when the fifth optical signal is supplied to the fifteenth input/output terminal thereof, the fifth optical signal to the sixteenth input/output terminal thereof, an optical signal transmission cable for transmitting the multiplexed signal led out to the eighth input/output terminal of the second bidirectional WDM coupler from a first end to a second end thereof and transmitting the fourth and fifth optical signals led out to the sixteenth input/output terminal of the fourth bidirectional WDM coupler from the second end to the first end thereof, first to third O/E conversion sections provided at the second end of the optical signal transmission cable for converting the first to third optical signals led out to the ninth to eleventh input/output terminals of the third bidirectional WDM coupler, respectively, when the multiplexed optical signal having passed through the fourth bidirectional WDM coupler from the sixteenth input/output terminal to the fourteenth input/output terminal is supplied to the thirteenth input/output terminal of the third bidirectional WDM coupler, into the first to third serial data, respectively, a fourth O/E conversion section provided at the first end of the optical signal transmission cable for converting the fourth optical signal led out to the fourth input/output terminal of the first bidirectional WDM coupler when the fourth optical signal having passed through the second bidirectional WDM coupler from the eighth input/output terminal to the sixth input/output terminal passes through the first bidirectional WDM coupler from the fifth input/output terminal to the fourth input/output terminal into the fourth serial data, and a fifth O/E conversion section provided at the first end of the optical signal transmission cable for converting the fifth optical signal led out to the seventh input/output terminal of the second bidirectional WDM coupler when the fifth optical signal passes through the second bidirectional WDM coupler from the eighth input/output terminal to the seventh input/output terminal into the fifth serial data.

With the data transmission method and the data transmission apparatus described above, first to third serial data based on digital data forming digital video signals, which have a frame rate set to 60 Hz, an effective line number set to 720 for each frame, and an effective data sample number set to 1,280 for each line, and fourth and fifth serial data different from the first to third serial data are converted into optical signals and bidirectionally transmitted by using the single optical signal transmission cable. The digital video signals may be, for example, those of the 4:2:2 format or the 4:4:4 format having a quantization bit number of 12, 14, or 16.

Then, the first to third serial data and the fourth and fifth serial data are reproduced at the respective transmission destinations of the optical signals through the single optical signal transmission cable.

The bidirectional transmission of the first to third serial data and the fourth and fifth serial data can be performed making use of existing circuit components, for example, for serial transmission of digital video signals in conformity with the HD SDI.

Any of the data transmission methods and the data transmission apparatus described above can be applied, for example, to bidirectional transmission, using optical signal transmission cable means between a camera section and a signal recording and reproduction section, of a plurality of optical signals obtained by conversion of digital data, which form digital video signals including D-Cinema signals, 720P signals, or the like having a quantization bit number greater than 10, or such digital video signals and Key signals obtained individually from a plurality of video cameras, which form the camera section, and digital video data, which form digital return video signals. Where any of the data transmission methods and the data transmission apparatus described above is applied such bidirectional transmission as described above, the bidirectional transmission of the plurality of optical signals between the camera section and the signal recording and reproduction section using the optical signal transmission cable means can be performed efficiently using a single optical signal transmission cable. Consequently, the required cost can be reduced efficiently.

BRIEF DESCRIPTION OF THE DRAWINGS

These and other objects of the invention will be seen by reference to the description, taken in connection with the accompanying drawing, in which:

FIGS. 3A, 3B, 4A, and 4B are diagrammatic views illustrating different data, which may be used in an operation of data processing sections shown in FIGS. 1 and 2;

FIGS. 5A, 5B, and 6 are diagrammatic views illustrating data used in another operation of the data processing sections shown in FIGS. 1 and 2;

FIGS. 7A and 7B are diagrammatic views illustrating data used in a further operation of the data processing sections shown in FIGS. 1 and 2;

FIGS. 8A, 8B, 9, 10A, and 10B are diagrammatic views illustrating data used in a still further operation of the data processing sections shown in FIGS. 1 and 2;

FIGS. 15, 16A, 16B, and 16C are diagrammatic views illustrating data used in an operation of data processing sections shown in FIGS. 13 and 14;

FIGS. 17A, 17B, and 17C are diagrammatic views illustrating data used in another operation of data processing sections shown in FIGS. 13 and 14;

FIGS. 18, 19, 20A, 20B, and 20C are diagrammatic views illustrating data used in a further operation of data processing sections shown in FIGS. 13 and 14;

FIGS. 22A, 22B, and 22C are diagrammatic views illustrating an example of a data format of another HD digital video signal;

FIGS. 23 and 24 are tables illustrating digital data, which form a digital video signal;

DETAILED DESCRIPTION OF THE PREFERRED EMBODIMENTS

Figure 1:
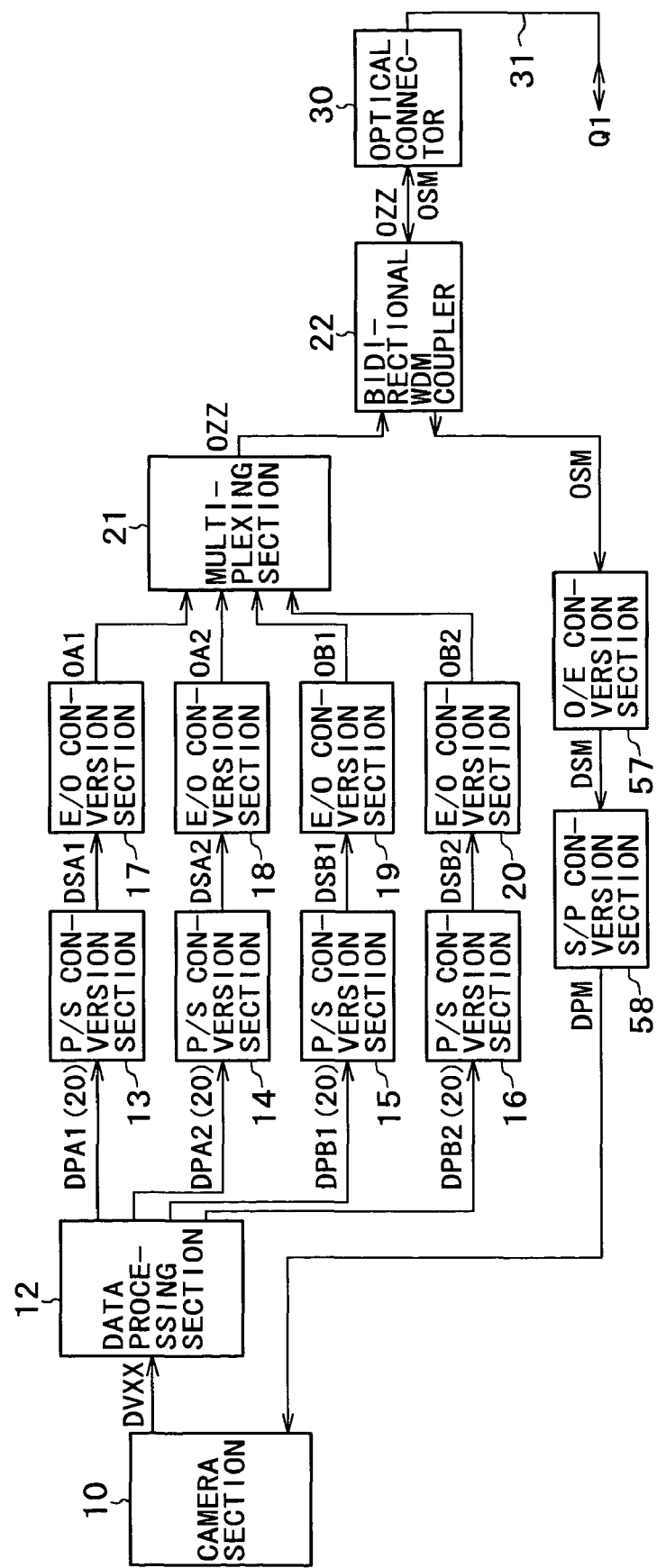
FIGS. 1 and 2 are block diagrams showing a data transmission apparatus according to the present invention to which a data transmission method according to the present invention is applied.
Figure 2:
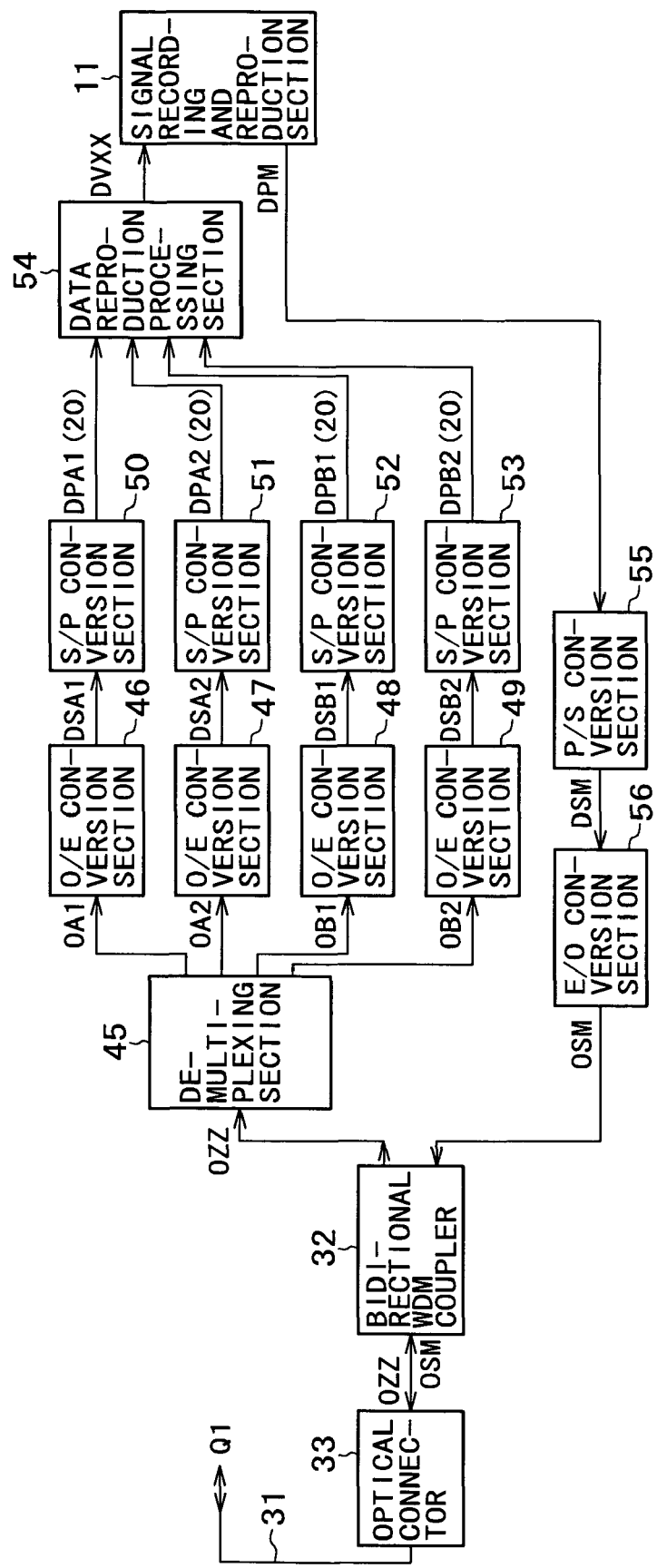

Referring first to FIGS. 1 and 2, there is shown a data transmission apparatus according to the present invention to which a data transmission method according to the present invention is applied.

The data transmission apparatus is used for bidirectional transmission of digital data between a camera section 10 and a signal recording and reproduction section 11. The bidirectional transmission is for the digital data, which form a D-Cinema signal, and digital data, which form a digital return video signal. The camera section 10 signals data DVXX while a data processing section 12 receives the data DVXX.

The data DVXX are parallel data which form, for example, D-Cinema signals indicated as one of data DC12, DC14, DC16, DD10, and DD12 in a table shown in FIG. 23. The D-Cinema signal is a digital video signal of the 4:2:2 format or the 4:4:4 format wherein the frame rate is set to 50 Hz or 60 Hz; the sampling frequency to 148.5 MHz; the effective data sample number in each line to 1,920; the effective line number in each frame to 1,080; and the quantization bit number to 10, 12, 14, or 16.

Where the data DVXX are one of the data DC12, DC14, and DC16, which form D-Cinema signals of the 4:2:2 format whose quantization bit number is 12, 14, or 16, for example, the data DC12, then, the data DC12 are supplied as 24-bit word string data to the data processing section 12. The 24-bit word string data are obtained by parallelly multiplexing a Y data string and a $P_B/P_R$ data string as seen in FIG. 3A with frame synchronism and line synchronism maintained therebetween and has a data transmission rate of 148.5 MBps. The Y data string includes 12-bit word string data having a word transmission rate of 148.5 MBps. The $P_B/P_R$ data string includes 12-bit word string data having a word transmission rate of 148.5 MBps.

The data processing section 12 receives the parallelly multiplexed data DC12 of FIG. 3A. The data processing section 12 thus performs a process of distributing 12-bit words YD0, YD1, YD2, YD3, . . . , which form the Y data string of the data DC12, and 12-bit data words PbD0, PrD0, PbD1, PrD1, PbD2, PrD2, . . . , which form the $P_B/P_R$ data string of the data DC12, into a group 1 and a group 2 for each line part. Then, the data processing section 12 forms 24-bit word string data DC12A having a word transmission rate of 148.5 MBps/2=74.25 MBps as a link A as seen in FIG. 3B based on the data of every other line parts of the Y data string and the $P_B/P_R$ data string, which form the group 1. Further, the data processing section 12 forms 24-bit word string data DC12B having a word transmission rate of 148.5 MBps/2=74.25 MBps as a link B as seen in FIG. 3B based on the data of the other every other lines of the Y data string and the $P_B/P_R$ data string, which form the group 2.

Thereafter, the data processing section 12 performs a process of dividing the Y data string and the $P_B/P_R$ data string of the 24-bit word string data DC12A whose word transmission rate is 74.25 MBps. More particularly, the data processing section 12 divides the 12-bit words YD0, YD1, YD2, YD3, . . . into 10 high-order bits Y0;2 to Y0;11, Y1;2 to Y1;11, Y2;2 to Y2;11, Y3;2 to Y3;11, . . . and 2 low-order bits Y0;0 to Y0;1, Y1;0 to Y1;1, Y2;0 to Y2;1, Y3;0 to Y3;1, . . . . Further, the data processing section 12 divides the 12-bit words PbD0, PrD0, PbD1, PrD1, PbD2, PrD2, . . . into 10 high-order bits Pb0;2 to Pb0;11, Pr0;2 to Pr0;11, Pb1;2 to Pb1;11, Pr1;2 to Pr1;11, Pb2;2 to Pb2;11, Pr2;2 to Pr2;11, . . . and 2 low-order bits Pb0;0 to Pb0;1, Pr0;0 to Pr0;1, Pb1;0 to Pb1;1, Pr1;0 to Pr1;1, Pb2;0 to Pb2;1, Pr2;0 to Pr2;1, . . . .

Then, the data processing section 12 parallelly multiplexes the string of 10 high-order bits Y0;2 to Y0;11, Y1;2 to Y1;11, Y2;2 to Y2;11, Y3;2 to Y3;11, . . . obtained by the division and the string of 10 high-order bits Pb0;2 to Pb0;11, Pr0;2 to Pr0;11, Pb1;2 to Pb1;11, Pr1;2 to Pr1;11, Pb2;2 to Pb2;11, Pr2;2 to Pr2;11, . . . obtained by the division. Consequently, 20-bit word string data DC12A1 whose word transmission rate is 74.25 MBps are produced as a link A-1 based on the divisional 10 high-order bits as seen in FIG. 4A.

Further, the data processing section 12 adds eight auxiliary bits ,,0, ,,1, ,,2, ,,3, . . . to the 2 low-order bits Y0;0 to Y0;1, Y1;0 to Y1;1, Y2;0 to Y2;1, Y3;0 to Y3;1, . . . obtained by the division to produce 10 bits Y0;0 to Y0;1+,,0, Y1;0 to Y1;1+,,1, Y2;0 to Y2;1+,,2, Y3;0 to Y3;1+,,3, . . . . Further, the data processing section 12 adds eight auxiliary bits ,,0, ,,1, ,,2, ,,3, ,,4, ,,5, . . . to the 2 low-order bits Pb0;0 to Pb0;1, Pr0;0 to Pr0;1, Pb1;0 to Pb1;1, Pr1;0 to Pr1;1, Pb2;0 to Pb2;1, Pr2;0 to Pr2;1, . . . to produce 10 bits Pb0;0 to Pb0;1+,,0, Pr0;0 to Pr0;1+,,1, Pb1;0 to Pb1;1+,,2, Pr1;0 to Pr1;1+,,3, Pb2;0 to Pb2;1+,,4, Pr2;0 to Pr2;1+,,5, . . . . Then, the data processing section 12 parallelly multiplexes the string of 10 bits Y0;0 to Y0;1+,,0, Y1;0 to Y1;1+,,1, Y2;0 to Y2;1+,,2, Y3;0 to Y3;1+,,3, . . . and the string of 10 bits Pb0;0 to Pb0;1+,,0, Pr0;0 to Pr0;1+,,1, Pb1;0 to Pb1;1+,,2, Pr1;0 to Pr1;1+,,3, Pb2;0 to Pb2;1+,,4, Pr2;0 to Pr2;1+,,5, . . . . Consequently, 20-bit word string data DC12A2 whose word transmission rate is 74.25 MBps are formed as a link A-2 based on the divisional 2 low-order bits as seen in FIG. 4B. In short, the data processing section 12 converts the 24-bit word string data DC12A whose word transmission rate is 74.25 MBps into two strings of word string data including the 20-bit word string data DC12A1 whose data transmission rate is 74.25 MBps and the 20-bit word string data DC12A2 whose word transmission rate is 74.25 MBps.

The data processing section 12 performs a process of dividing the Y data string and the $P_B/P_R$ data string also of the 24-bit word string data DC12B illustrated in FIG. 3B whose word transmission rate is 74.25 MBps. More particularly, the data processing section 12 divides the 12-bit words YD0, YD1, YD2, YD3, . . . into 10 high-order bits Y0;2 to Y0;11, Y1;2 to Y1;11, Y2;2 to Y2;11, Y3;2 to Y3;11, . . . and 2 low-order bits Y0;0 to Y0;1, Y1;0 to Y1;1, Y2;0 to Y2;1, Y3;0 to Y3;1, . . . . Further, the data processing section 12 divides the 12-bit words PbD0, PrD0, PbD1, PrD1, PbD2, PrD2, . . . into 10 high-order bits Pb0;2 to Pb0;11, Pr0;2 to Pr0;11, Pb1;2 to Pb1;11, Pr1;2 to Pr1;11, Pb2;2 to Pb2;11, Pr2;2 to Pr2; 11, . . . and 2 low-order bits Pb0;0 to Pb0;1, Pr0;0 to Pr0;1, Pb1;0 to Pb1;1, Pr1;0 to Pr1;1, Pb2;0 to Pb2;1, Pr2;0 to Pr2; 1, . . . .

Then, the data processing section 12 parallelly multiplexes the string of 10 high-order bits Y0;2 to Y0;11, Y1;2 to Y1;11, Y2;2 to Y2;11, Y3;2 to Y3;11, . . . and the string of 10 high-order bits Pb0;2 to Pb0;11, Pr0;2 to Pr0;11, Pb1;2 to Pb1;11, Pr1;2 to Pr1;11, Pb2;2 to Pb2;11, Pr2;2 to Pr2; 11, . . . obtained by the division. Consequently, 20-bit word string data DC12B1 whose word transmission rate is 74.25 MBps is produced as a link B-1 based on the divisional 10 high-order bits as seen in FIG. 4A.

Further, the data processing section 12 adds eight auxiliary bits ₐ0, ₐ1, ₐ2, ₐ3, . . . to the 2 low-order bits Y0;0 to Y0;1, Y1;0 to Y1;1, Y2;0 to Y2;1, Y3;0 to Y3;1, . . . obtained by the division to produce 10 bits Y0;0 to Y0;1+ₐ0, Y1;0 to Y1;1+ₐ1, Y2;0 to Y2;1+ₐ2, Y3;0 to Y3;1+ₐ3, . . . . Further, the data processing section 12 adds eight auxiliary bits ₐ0, ₐ1, ₐ2, ₐ3, ₐ4, ₐ5, . . . to the 2 low-order bits Pb0;0 to Pb0;1, Pr0;0 to Pr0;1, Pb1;0 to Pb1;1, Pr1;0 to Pr1;1, Pb2;0 to Pb2;1, Pr2;0 to Pr2; 1, . . . to produce 10 bits Pb0;0 to Pb0;1+ₐ0, Pr0;0 to Pr0;1+ₐ1, Pb1;0 to Pb1;1+ₐ2, Pr1;0 to Pr1;1+ₐ3, Pb2;0 to Pb2;1+ₐ4, Pr2;0 to Pr2;1+ₐ5, . . . . Then, the data processing section 12 parallelly multiplexes the string of 10 bits Y0;0 to Y0;1+ₐ0, Y1;0 to Y1;1+ₐ1, Y2;0 to Y2;1+ₐ2, Y3;0 to Y3;1+ₐ3, . . . and the string of 10 bits Pb0;0 to Pb0;1+ₐ0, Pr0;0 to Pr0;1+ₐ1, Pb1;0 to Pb1;1+ₐ2, Pr1;0 to Pr1;1+ₐ3, Pb2;0 to Pb2;1+ₐ4, Pr2;0 to Pr2;1+ₐ5, . . . . Consequently, 20-bit word string data DC12B2 whose word transmission rate is 74.25 MBps are formed as a link B-2 based on the divisional 2 low-order bits as seen in FIG. 4B. In short, the data processing section 12 converts the 24-bit word string data DC12B whose word transmission rate is 74.25 MBps into two strings of word string data including the 20-bit word string data DC12B1 whose data transmission rate is 74.25 MBps and the 20-bit word string data DC12B2 whose word transmission rate is 74.25 MBps.

As a result, where the digital data DVXX supplied to the data processing section 12 are the data DC12, which are 24-bit word string data having a word transmission rate of 148.5 MBps, the data processing section 12 converts the 24-bit word string data DC12 into word string data of four strings of 20-bit word string data DC12A1, DC12A2, DC12B1, and DC12B2 each having a word transmission rate of 74.25 MBps.

Where the data DVXX are the data DC14 or the data DC16 illustrated in FIG. 23, the data DC14 are 28-bit word string data having a word transmission rate of 148.5 MBps, but the data DC16 are 32-bit word string data having a word transmission rate of 148.5 MBps. Then, similarly as in the case wherein the data DVXX are the data DC12, the 28-bit word string data are converted into word string data of four strings of 20-bit word string data DC14A1, DC14A2, DC14B1, and DC14B2 each having a word transmission rate of 74.25 MBps. Meanwhile, the 32-bit word string data are converted into word string data of four strings of 20-bit word string data DC16A1, DC16A2, DC16B1, and DC16B2 each having a word transmission rate of 74.25 MBps.

It is to be noted, however, that, in such an instance as just described, the following data conversion may be used in place of the division of each of 12-bit words, which form the Y data string, and 12-bit words, which form the $P_B/P_R$ data, into 10 high-order bits and 2 low-order bits in the case wherein the data DVXX are the data DC12. In particular, where the data DVXX are the data DC14, each of 14-bit words, which form the Y data string, and 14-bit words, which form the $P_B/P_R$ data string, is divided into 10 high-order bits and 4 low-order bits. On the other hand, where the data DVXX are the data DC16, each of 16-bit words, which form the Y data string, and 16-bit words, which form the $P_B/P_R$ data string, is divided into 10 high-order bits and 6 low-order bits. Then, the data DC14, which are 28-bit word string data whose word transmission rate is 148.5 MBps, are converted into word string data of four strings of 20-bit word string data DC14A1, DC14A2, DC14B1, and DC14B2 each having a word transmission rate of 74.25 MBps. On the other hand, the data DC16, which are 32-bit word string data whose word transmission rate is 148.5 MBps, are converted into word string data of four strings of 20-bit word string data DC16A1, DC16A2, DC16B1, and DC16B2 each having a word transmission rate of 74.25 MBps.

Where the data DVXX are the data DD10, which form D-Cinema signals of the 4:4:4 format whose quantization bit number is 10, the data DD10 are supplied as 30-bit word string data having a word transmission rate of 148.5 MBps to the data processing section 12. The 30-bit word string data are obtained by parallelly multiplexing a G data string of 10-bit word string data having a data transmission rate of 148.5 MBps, a B data string of 10-bit word string data having a data transmission rate of 148.5 MBps, and an R data string of 10-bit word string data having a data transmission rate of 148.5 MBps as seen in FIG. 5A with frame synchronism and line synchronism maintained thereamong.

Figure 5A:
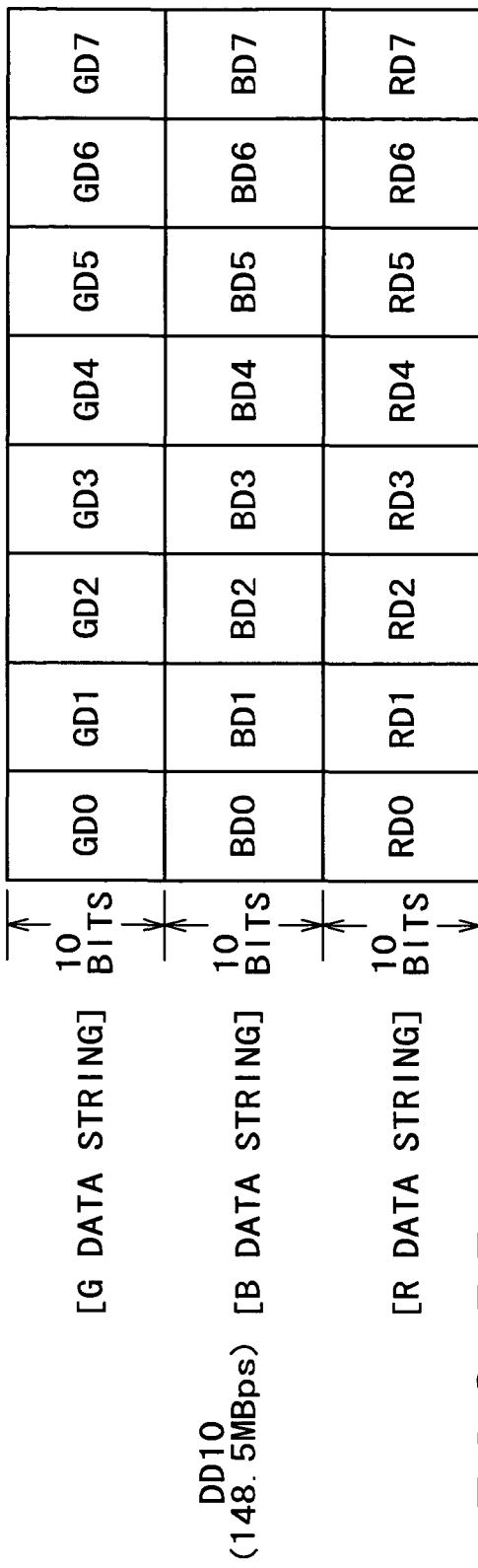
Figure 5B:
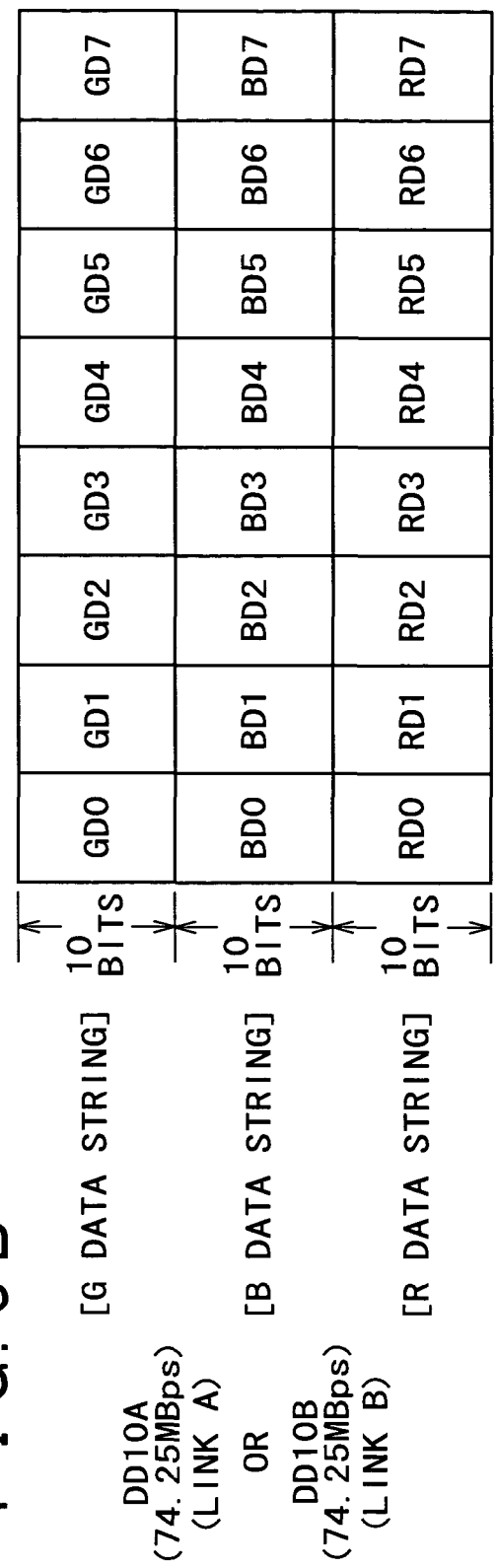

The data processing section 12 receives the parallelly multiplexed data DD10 illustrated in FIG. 5A. The data processing section 12 thus performs a process of distributing 10-bit words GD0, GD1, GD2, GD3, . . . , which form the G data string of the data DD10, 10-bit words BD0, BD1, BD2, BD3, . . . , which form the B data string of the data DD10, and 10-bit words RD0, RD1, RD2, RD3, . . . , which form the R data string of the data DD10, into a group 1 and a group 2 for each line part. Then, the data processing section 12 forms 30-bit word string data DD10A having a word transmission rate of 148.5 MBps/2=74.25 MBps as a link A as seen in FIG. 5B based on the data of every other lines of the G data string, B data string, and R data string, which form the group 1. Further, the data processing section 12 forms 30-bit word string data DD10B having a word transmission rate of 148.5 MBps/2=74.25 MBps as a link B as seen in FIG. 5B based on the data of the other every other lines of the G data string, B data string, and R data string, which form the group 2.

Thereafter, the data processing section 12 adds 10-bit words ad0, ad1, ad2, ad3, . . . , which form an auxiliary data string, to the 30-bit word string data DD10A obtained as seen in FIG. 5B. More particularly, the data processing section 12 adds the 10-bit words ad0, ad1, ad2, ad3, . . . to the 10-bit words GD0, GD1, GD2, GD3, . . . , which form the G data string of the data DD10, 10-bit words BD0, BD1, BD2, BD3, . . . , which form the B data string of the data DD10, and 10-bit words RD0, RD1, RD2, RD3, . . . , which form the R data string of the data DD10, respectively, as seen in FIG. 6. Then, the data processing section 12 distributes the data obtained by the addition described above into a 10-bit word group 1 and another 10-bit word group 2 as indicated separately with a thick partitioning line in FIG. 6. The 10-bit word group 1 includes the 10-bit words GD0, GD1, GD2, GD3, . . . , which form the G data string, every other ones BD0, BD2, BD4, BD6, . . . of the 10-bit words, which form the B data string, and every other ones RD0, RD2, RD4, RD6, . . . of the 10-bit words, which form the R data string. The 10-bit word group 2 includes the 10-bit words ad0, ad1, ad2, ad3, . . . , which form the auxiliary data string, the other every other ones BD1, BD3, BD3, BD7, . . . of the 10-bit words, which form the B-data string, and the other every other ones RD1, RD3, RD5, RD7, . . . of the 10-bit words, which form the R data string.

Then, the data processing section 12 forms 20-bit word string data DD10A1 having a word transmission rate of 74.25 MBps as a link A-1 as seen in FIG. 7A based on the 10-bit word group 1. Further, the data processing section 12 forms 20-bit word string data DD10A2 having a word transmission rate of 74.25 MBps as a link A-2 as seen in FIG. 7B based on the 10-bit word group 2. In short, the data processing section 12 converts the 30-bit word string data DD10A whose word transmission rate is 74.25 MBps into two strings of word string data including the 20-bit word string data DD10A1 and DD10A2 each having a word transmission rate of 74.25 MBps.

Also to the 30-bit word string data DD10B obtained as seen in FIG. 5B, the data processing section 12 adds the 10-bit words ad0, ad1, ad2, ad3, . . . , which form the auxiliary data string. More particularly, the data processing section 12 adds the 10-bit words ad0, ad1, ad2, ad3, . . . to the 10-bit words GD0, GD1, GD2, GD3, . . . , which form the G data string of the data DD10, 10-bit words BD0, BD1, BD2, BD3, . . . , which form the B data string of the data DD10, and 10-bit words RD0, RD1, RD2, RD3, . . . , which form the R data string of the data DD10, respectively, as seen in FIG. 6. Then, the data processing section 12 distributes the data obtained by the addition described above into a 10-bit word group 1 and another 10-bit word group 2 as indicated separately with a thick partitioning line in FIG. 6. The 10-bit word group 1 includes the 10-bit words GD0, GD1, GD2, GD3, . . . , which form the G data string, every other ones BD0, BD2, BD4, BD6, . . . of the 10-bit words which form the B data string, and every other ones RD0, RD2, RD4, RD6, . . . of the 10-bit words, which form the R data string. The 10-bit word group 2 includes the 10-bit words ad0, ad1, ad2, ad3, . . . , which form the auxiliary data string, the other every other ones BD1, BD3, BD3, BD7, . . . of the 10-bit words, which form the B-data string, and the other every other ones RD1, RD3, RD5, RD7, . . . of the 10-bit words, which form the R data string.

Then, the data processing section 12 forms 20-bit word string data DD10B1 having a word transmission rate of 74.25 MBps as a link B-1 as seen in FIG. 7A based on the 10-bit word group 1. Further, the data processing section 12 forms 20-bit word string data DD10B2 having a word transmission rate of 74.25 MBps as a link B-2 as seen in FIG. 7B based on the 10-bit word group 2. In short, the data processing section 12 converts the 30-bit word string data DD10B whose word transmission rate is 74.25 MBps into two strings of word string data including the 20-bit word string data DD10B1 and DD10B2 each having a word transmission rate of 74.25 MBps.

As a result, where the data DVXX supplied to the data processing section 12 are the data DD10, which are 30-bit word string data having a word transmission rate of 148.5 MBps, the data processing section 12 converts the 30-bit word string data DD10 into word string data of four strings of 20-bit word string data DD10A1, DD10A2, DD10B1, and DD10B2 each having a word transmission rate of 74.25 MBps.

Where the data DVXX is the data DD12, which form D-Cinema signals of the 4:4:4 format whose quantization bit number is 12, the data DD12 are supplied as 36-bit word string data having a word transmission rate of 148.5 MBps to the data processing section 12. The 36-bit word string data is obtained by parallelly multiplexing a G data string of 12-bit word string data having a data transmission rate of 148.5 MBps, a B data string of 12-bit word string data having a data transmission rate of 148.5 MBps, and an R data string of 12-bit word string data having a data transmission rate of 148.5 MBps as seen in FIG. 8A with frame synchronism and line synchronism maintained thereamong.

The data processing section 12 receives the parallelly multiplexed data DD12 illustrated in FIG. 8A. The data processing section 12 thus performs a process of distributing 12-bit words GD0, GD1, GD2, GD3, . . . , which form the G data string of the data DD12, 12-bit words BD0, BD1, BD2, BD3, . . . , which form the B data string of the data DD12, and 12-bit words RD0, RD1, RD2, RD3, . . . , which form the R data string of the data DD12, into a group 1 and a group 2 for each line part. Then, the data processing section 12 forms 36-bit word string data DD12A having a word transmission rate of 148.5 MBps/2=74.25 MBps as a link A as seen in FIG. 8B based on the data of every other lines of the G data string, B data string, and R data string, which form the group 1. Further, the data processing section 12 forms 36-bit word string data DD12B having a word transmission rate of 148.5 MBps/2=74.25 MBps as a link B as seen in FIG. 8B based on the data of the other every other lines of the G data string, B data string, and R data string, which form the group 2.

Thereafter, the data processing section 12 performs a process of dividing the G data string, B data string, and R data string of the 36-bit word string data DD12A having a word transmission rate of 74.25 MBps as illustrated in FIG. 8B. More particularly, the data processing section 12 divides the 12-bit words GD0, GD1, GD2, GD3, . . . into 10 high-order bits G0;2 to G0;11, G1;2 to G1;11, G2;2 to G2;11, G3;2 to G3;11, . . . and 2 low-order bits G0;0 to G0;1, G1;0 to G1;1, G2;0 to G2;1, G3;0 to G3;1, . . . . Further, the data processing section 12 divides the 12-bit words BD0, BD1, BD2, BD3, . . . into 10 high-order bits B0;2 to B0;11, B1;2 to B1;11, B2;2 to B2;11, B3;2 to B3;11, . . . and 2 low-order bits B0;0 to B0;1, B1;0 to B1;1, B2;0 to B2;1, B3;0 to B3;1, . . . . Furthermore, the data processing section 12 divides the 12-bit words RD0, RD1, RD2, RD3, . . . into 10 high-order bits R0;2 to R0;11, R1;2 to R1;11, R2;2 to R2;11, R3;2 to R3;11, . . . and 2 low-order bits R0;0 to R0;1, R1;0 to R1;1, R2;0 to R2;1, R3;0 to R3;1, . . . .

Then, the data processing section 12 bit multiplexes the 2 low-order bits G0;0 to G0;1, B0;0 to B0;1, and R0;0 to R0;1 obtained by the division to form 6 bits GBR0(0-1). Similarly, the data processing section 12 bit multiplexes the 2 low-order bits G1;0 to G1;1, B1;0 to B1;1, and R1;0 to R1;1 obtained by the division to form 6 bits GBR1(0-1). Further, the data processing section 12 bit multiplexes the 2 low-order bits G2;0 to G2;1, B2;0 to B2;1 and R2;0 to R2;1 obtained by the division to form 6 bits GBR2(0-1). Furthermore, the data processing section 12 bit multiplexes the 2 low-order bits G3;0 to G3;1, B3;0 to B3;1 and R3;0 to R3;1 obtained by the division to form 6 bits GBR3(0-1). The data processing section 12 further performs similar bit multiplexing for the remaining 2 low-order bits. Then, the data processing section 12 adds four auxiliary bits ,,0, ,,1, ,,2, ,,3, ... to the 6 bits GBR0(0-1), GBR1(0-1), GBR2(0-1), GBR3(0-1), ... to form 10 bits GBR0(0-1)+,,0, GBR1(0-1)+,,1, GBR2(0-1)+,,2, GBR3(0-1)+,,3, ....

Further, the data processing section 12 distributes the 10 high-order bits G0;2 to G0;11, G1;2 to G1;11, G2;2 to G2;11, G3;2 to G3;11, ..., B0;2 to B0;11, B1;2 to B1;11, B2;2 to B2;11, B3;2 to B3;11, ..., and R0;2 to R0;11, R1;2 to R1;11, R2;2 to R2;11, R3;2 to R3;11, ... obtained by the division described above into a group 1 and another group 2. Then, the data processing section 12 adds the 10 bits GBR0(0-1)+,,0, GBR1(0-1)+,,1, GBR2(0-1)+,,2, GBR3(0-1)+,,3, ... to the group 2. Consequently, such a 10-bit word group 1 and another 10-bit word group 2 as indicated separately with a thick partitioning line in FIG. 9 are obtained.

Then, the data processing section 12 forms 20-bit word string data DD12A1 having a word transmission rate of 74.25 MBps as a link A-1 as seen in FIG. 10A based on the 10-bit word group 1 illustrated in FIG. 9. Further, the data processing section 12 forms 20-bit word string data DD12A2 having a word transmission rate of 74.25 MBps as a link A-2 as seen in FIG. 10B based on the 10-bit word group 2 illustrated in FIG. 9. In short, the data processing section 12 converts the 36-bit word string data DD12A whose word transmission rate is 74.25 MBps into two strings of word string data including the 20-bit word string data DD12A1 and DD12A2 each having a word transmission rate of 74.25 MBps.

Also for the 36-bit word string data DD12B having a word transmission rate of 74.25 MBps as illustrated in FIG. 8B, the data processing section 12 performs a process of dividing the G data string, B data string, and R data string. More particularly, the data processing section 12 divides the 12-bit words GD0, GD1, GD2, GD3, ... into 10 high-order bits G0;2 to G0;11, G1;2 to G1;11, G2;2 to G2;11, G3;2 to G3;11, ... and 2 low-order bits G0;0 to G0;1, G1;0 to G1;1, G2;0 to G2;1, G3;0 to G3;1, .... Similarly, the data processing section 12 divides the 12-bit words BD0, BD1, BD2, BD3, ... into 10 high-order bits B0;2 to B0;11, B1;2 to B1;11, B2;2 to B2;11, B3;2 to B3;11, ... and 2 low-order bits B0;0 to B0;1, B1;0 to B1;1, B2;0 to B2;1, B3;0 to B3;1, .... Further, the data processing section 12 divides the 12-bit words RD0, RD1, RD2, RD3, ... into 10 high-order bits R0;2 to R0;11, R1;2 to R1;11, R2;2 to R2;11, R3;2 to R3;11, ... and 2 low-order bits R0;0 to R0;1, R1;0 to R1;1, R2;0 to R2;1, R3;0 to R3;1, ....

Then, the data processing section 12 bit multiplexes the 2 low-order bits G0;0 to G0;1, B0;0 to B0;1, and R0;0 to R0;1 obtained by the division to form 6 bits GBR0(0-1) Similarly, the data processing section 12 bit multiplexes the 2 low-order bits G1;0 to G1;1, B1;0 to B1;1, and R1;0 to R1;1 obtained by the division to form 6 bits GBR1(0-1). Further, the data processing section 12 bit multiplexes the 2 low-order bits G2;0 to G2;1, B2;0 to B2;1, and R2;0 to R2;1 obtained by the division to form 6 bits GBR2(0-1). Furthermore, the data processing section 12 bit multiplexes the 2 low-order bits G3;0 to G3;1, B3;0 to B3;1 and R3;0 to R3;1 obtained by the division to form 6 bits GBR3(0-1). The data processing section 12 further performs similar bit multiplexing for the remaining 2 low-order bits. Then, the data processing section 12 adds four auxiliary bits ,,0, ,,1, ,,2, ,,3, ... to the 6 bits GBR0(0-1), GBR1(0-1), GBR2(0-1), GBR3(0-1), ... to form 10 bits GBR0(0-1)+,,0, GBR1(0-1)+,,1, GBR2(0-1)+,,2, GBR3(0-1)+,,3, ....

Further, the data processing section 12 distributes the 10 high-order bits G0;2 to G0;11, G1;2 to G1;11, G2;2 to G2;11, G3;2 to G3;11, ..., B0;2 to B0;11, B1;2 to B1;11, B2;2 to B2;11, B3;2 to B3;11, ... and R0;2 to R0;11, R1;2 to R1;11, R2;2 to R2;11, R3;2 to R3;11, ... obtained by the division described above into a group 1 and another group 2. Then, the data processing section 12 adds the 10 bits GBR0(0-1)+,,0, GBR1(0-1)+,,1, GBR2(0-1)+,,2, GBR3(0-1)+,,3, ... to the group 2. Consequently, such a 10-bit word group 1 and another 10-bit word group 2 as indicated separately with a thick partitioning line in FIG. 9 are obtained.

Then, the data processing section 12 forms 20-bit word string data DD12B1 having a word transmission rate of 74.25 MBps as a link B-1 as seen in FIG. 10A based on the 10-bit word group 1 illustrated in FIG. 9. Further, the data processing section 12 forms 20-bit word string data DD12B2 having a word transmission rate of 74.25 MBps as a link B-2 as seen in FIG. 10B based on the 10-bit word group 2 illustrated in FIG. 9. In short, the data processing section 12 converts the 36-bit word string data DD12B whose word transmission rate is 74.25 MBps into two strings of word string data including the 20-bit word string data DD12B1 and DD12B2 each having a word transmission rate of 74.25 MBps.

As a result, where the data DVXX supplied to the data processing section 12 are the data DD12, which are 36-bit word string data having a word transmission rate of 148.5 MBps, the data processing section 12 converts the data DD12 into word string data of four strings of 20-bit word string data DD12A1, DD12A2, DD12B1, and DD12B2 each having a word transmission rate of 74.25 MBps.

The data processing section 12 leads out one of a set of the 20-bit word string data DC12A1, DC12A2, DC12B1, and DC12B2, another set of the 20-bit word string data DC14A1, DC14A2, DC14B1, and DC14B2, a further set of the 20-bit word string data DC16A1, DC16A2, DC16B1, and DC16B2, a still further set of the 20-bit word string data DD10A1, DD10A2, DD10B1, and DD10B2, and a yet further set of the 20-bit word string data DD12A1, DD12A2, DD12B1, and DD12B2, obtained in such a manner as described above and each having a word transmission rate of 74.25 MBps, as a set of 20-bit word string data DPA1(20), DPA2(20), DPB1(20), and DPB2(20).

The 20-bit word string data DPA1(20), DPA2(20), DPB1(20), and DPB2(20) signaled from the data processing section 12 and having a word transmission rate of 74.25 MBps are supplied to P/S conversion sections 13, 14, 15, and 16, respectively. The P/S conversion section 13 performs P/S conversion for the 20-bit word string data DPA1(20) to form serial data DSA1 having a transmission rate of 74.25 MBps× 20=1.485 Gbps based on the 20-bit word string data DPA1 (20). The P/S conversion section 14 performs P/S conversion for the 20-bit word string data DPA2(20) to form serial data DSA2 having a bit transmission rate of 74.25 MBps× 20=1.485 Gbps based on the 20-bit word string data DPA2 (20). The P/S conversion section 15 performs P/S conversion for the 20-bit word string data DPB1(20) to form serial data DSB1 having a transmission rate of 74.25 MBps×20=1.485 Gbps based on the 20-bit word string data DPB1(20). The P/S conversion section 16 performs P/S conversion for the 20-bit word string data DPB2(20) to form serial data DSB2 having a transmission rate of 74.25 MBps×20=1.485 Gbps based on the 20-bit word string data DPB2(20).

The serial data DSA1 outputted from the P/S conversion section 13 is supplied to an E/O conversion section 17. The serial data DSA2 outputted from the P/S conversion section 14 is supplied to another E/O conversion section 18. The serial data DSB1 outputted from the P/S conversion section 15 is supplied to a further E/O conversion section 19. The serial data DSB2 outputted from the P/S conversion section 16 is supplied to a still further E/O conversion section 20.

The E/O conversion section 17 performs an E/O conversion process for the serial data DSA1 to form an optical signal OA1 based on the serial data DSA1 and supplies the optical signal OA1 to a multiplexing section 21. The optical signal OA1 has a center frequency of, for example, approximately 1.511 μm and a bit transmission rate of 1.485 Gbps. The E/O conversion section 18 performs an E/O conversion process for the serial data DSA2 to form an optical signal OA2 based on the serial data DSA2 and outputs the optical signal OA2 to the multiplexing section 21. The optical signal OA2 has a center frequency of, for example, approximately 1.531 μm and a bit transmission rate of 1.485 Gbps. The E/O conversion section 19 performs an E/O conversion process for the serial data DSB1 to form an optical signal OB1 based on the serial data DSB1 and outputs the optical signal OB1 to the multiplexing section 21. The optical signal OB1 has a center frequency of, for example, approximately 1.551 μm and a bit transmission rate of 1.485 Gbps. The E/O conversion section 20 performs an E/O conversion process for the serial data DSB2 to form an optical signal OB2 based on the serial data DSB2 and outputs the optical signal OB2 to the multiplexing section 21. The optical signal OB2 has a center frequency of, for example, approximately 1.571 μm and a bit transmission rate of 1.485 Gbps.

The multiplexing section 21 multiplexes the optical signal OA1 having a center frequency of approximately 1.511 μm, the optical signal OA2 having another center frequency of approximately 1.531 μm, the optical signal OB1 having a further center frequency of approximately 1.551 μm, and the optical signal OB2 having a still further center frequency of approximately 1.571 μm. Consequently, the multiplexing section 21 forms a multiplexed optical signal OZZ.

In this manner, the optical signals OA1, OA2, OB1, and OB2 having frequencies very proximate to each other such that the center frequencies thereof are different only by approximately 0.020 μm from each other are multiplexed by the multiplexing section 21 to form the multiplexed optical signal OZZ. A wavelength multiplexing technique called Coarse Wavelength Division Multiplexing (CWDM) is used in a block including the E/O conversion sections 17 to 20 and the multiplexing section 21.

The multiplexed optical signal OZZ signaled from the multiplexing section 21 is supplied to a bidirectional WDM coupler 22. The bidirectional WDM coupler 22 has a configuration represented by such an equivalent block connection as shown, for example, in FIG. 11. The equivalent block connection shown in FIG. 11 includes a dielectric multilayer film section 23. An input/output terminal 25 and another input/output terminal 27 are provided at a first end of the dielectric multilayer film section 23. The input/output terminal 25 is connected through an optical fiber and an optical connector 24 while the input/output terminal 27 is connected through another optical fiber and another optical connector 26 to the dielectric multilayer film section 23. A further input/output terminal 29 is provided at the other or second end of the dielectric multilayer film section 23 and connected through a further optical fiber and a further optical connector 28 to the dielectric multilayer film section 23.

Thus, the multiplexed optical signal OZZ from the multiplexing section 21 is introduced from the input/output terminal 25 to the dielectric multilayer film section 23 through the optical connector 24. Then, the multiplexed optical signal OZZ passes through the dielectric multilayer film section 23 and is led out to the input/output terminal 29 through the optical fiber and the optical connector 28. The multiplexed optical signal OZZ led out to the input/output terminal 29 in this manner is signaled from the bidirectional WDM coupler 22 and introduced to an optical connector 30.

Referring back to FIG. 1, the optical connector 30 interconnects the bidirectional WDM coupler 22 and a first end of an optical signal transmission cable 31. Consequently, the multiplexed optical signal OZZ from the bidirectional WDM coupler 22 is signaled to the first end of the optical signal transmission cable 31 through the optical connector 30. The optical signal transmission cable 31 is formed typically from a quartz SMF.

Referring now to FIG. 2, an optical connector 33 for connecting the optical signal transmission cable 31 and a bidirectional WDM coupler 32 is provided at the other or second end of the optical signal transmission cable 31. Consequently, the multiplexed optical signal OZZ signaled to the first end of the optical signal transmission cable 31 through the optical connector 30 is transmitted from the first end to the second end of the optical signal transmission cable 31. Then, the multiplexed optical signal OZZ is introduced from the second end of the optical signal transmission cable 31 to the bidirectional WDM coupler 32 through the optical connector 33.

Figure 12:
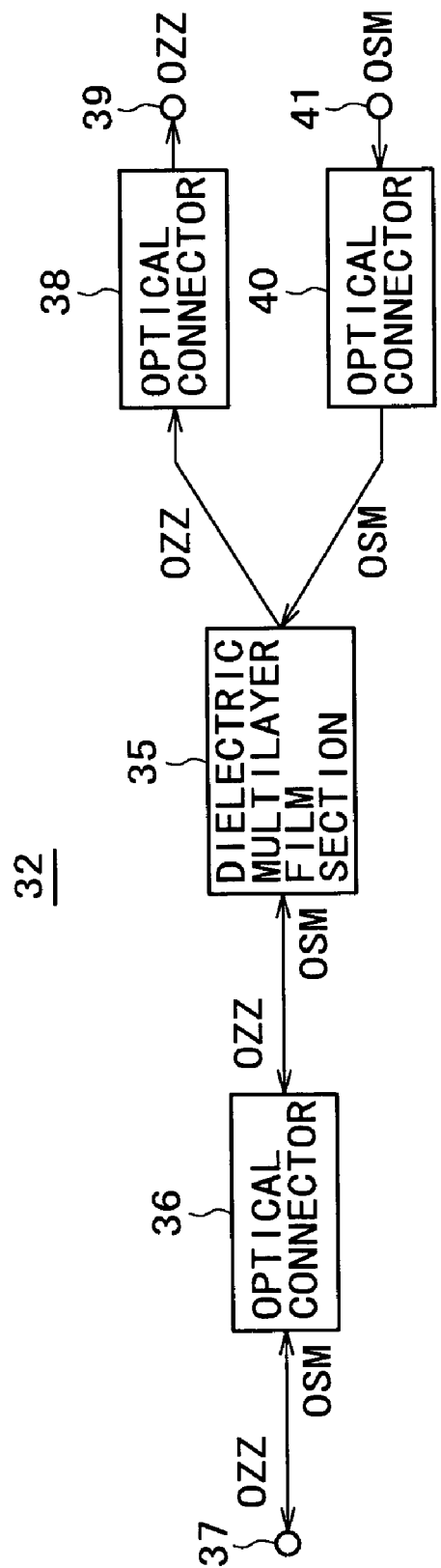

The bidirectional WDM coupler 32 has, for example, such a configuration as represented by an equivalent block connection as shown in FIG. 12. The equivalent block connection shown in FIG. 12 includes a dielectric multilayer film section 35. An input/output terminal 37 is provided at a first end of the dielectric multilayer film section 35 and connected through an optical fiber and an optical connector 36 to the dielectric multilayer film section 35. Meanwhile, an input/output terminal 39 and another input/output terminal 41 are provided at the other or second end of the dielectric multilayer film section 35. The input/output terminal 39 is connected through an optical fiber and an optical connector 38 while the input/output terminal 41 is connected through another optical fiber and another optical connector 40 to the dielectric multilayer film section 35.

The multiplexed optical signal OZZ having passed through the optical connector 33 is introduced from the input/output terminal 37 to the dielectric multilayer film section 35 through the optical connector 36. Then, the multiplexed optical signal OZZ having passed through the dielectric multilayer film section 35 is led out to the input/output terminal 39 through the optical fiber and the optical connector 38. The multiplexed optical signal OZZ led out to the input/output terminal 39 in this manner is signaled from the bidirectional WDM coupler 32 and introduced to a demultiplexing section 45 shown in FIG. 2.

Referring back to FIG. 2, the demultiplexing section 45 demultiplexes the multiplexed optical signal OZZ into a component having a center frequency of approximately 1.511 μm, another component having another center frequency of approximately 1.531 μm, a further component having a further center frequency of approximately 1.551 μm, and a still further component having a still further center frequency of approximately 1.571 μm to reproduce optical signals OA1, OA2, OB1, and OB2, respectively. The optical signal OA1 has a bit transmission rate of 1.485 Gbps and a center frequency of approximately 1.511 μm. The optical signal OA2 has a bit transmission rate of 1.485 Gbps and a center frequency of approximately 1.531 μm. The optical signal OB1 has a bit transmission rate of 1.485 Gbps and a center frequency of approximately 1.551 μm. The optical signal OB2 has a bit transmission rate of 1.485 Gbps and a center frequency of approximately 1.571 μm.

The optical signals OA1, OA2, OB1, and OB2 reproduced by the demultiplexing section 45 are introduced to O/E conversion sections 46, 47, 48, and 49, respectively. The O/E conversion section 46 performs an O/E conversion process for the optical signal OA1, which has a bit transmission rate of 1,485 Gbps and a central frequency of approximately 1.511 μm. Consequently, serial data DSA1 having a bit transmission rate of 1.485 Gbps are produced based on the optical signal OA1. The reproduced serial data DSA1 are supplied to an S/P conversion section 50. The O/E conversion section 47 performs an O/E conversion process for the optical signal OA2, which has a bit transmission rate of 1,485 Gbps and a central frequency of approximately 1.531 μm. Consequently, serial data DSA2 having a bit transmission rate of 1.485 Gbps is produced based on the optical signal OA2. The reproduced serial data DSA2 is supplied to another S/P conversion section 51. The O/E conversion section 48 performs an O/E conversion process for the optical signal OB1, which has a bit transmission rate of 1,485 Gbps and a central frequency of approximately 1.551 μm. Consequently, serial data DSB1 having a bit transmission rate of 1.485 Gbps is produced based on the optical signal OB1. The reproduced serial data DSB1 is supplied to a further S/P conversion section 52. The O/E conversion section 49 performs an O/E conversion process for the optical signal OB2, which has a bit transmission rate of 1,485 Gbps and a central frequency of approximately 1.571 μm. Consequently, serial data DSB2 having a bit transmission rate of 1.485 Gbps is produced based on the optical signal OB2. The reproduced serial data DSB2 is supplied to a still further S/P conversion section 53.

The S/P conversion section 50 performs serial/parallel (S/P) conversion for formation of 20-bit parallel data for the serial data DSA1 to reproduce 20-bit word string data DPA1 (20) whose word transmission rate is 1.485 Gbps/20=74.25 MBps. The S/P conversion section 51 performs serial/parallel conversion for formation of 20-bit parallel data for the serial data DSA2 to reproduce 20-bit word string data DPA2(20) whose word transmission rate is 1.485 Gbps/20=74.25 MBps. The S/P conversion section 52 performs serial/parallel conversion for formation of 20-bit parallel data for the serial data DSB1 to reproduce 20-bit word string data DPB1(20) whose word transmission rate is 1.485 Gbps/20=74.25 MBps. The S/P conversion section 53 performs serial/parallel conversion for formation of 20-bit parallel data for the serial data DSB2 to reproduce 20-bit word string data DPB2(20) whose word transmission rate is 1.485 Gbps/20=74.25 MBps.

The 20-bit word string data DPA1(20), DPA2(20), DPB1(20), and DPB2(20) reproduced by the S/P conversion sections 50 to 53, respectively, are supplied to a data reproduction processing section 54.

The data reproduction processing section 54 performs a data process reverse to the data process performed for the data DVXX by the data processing section 12 for the 20-bit word string data DPA1(20), DPA2(20), DPB1(20), and DPB2(20). Consequently, the data DVXX based on the 20-bit word string data DPA1(20), DPA2(20), DPB1(20), and DPB2(20) are reproduced by the reverse process, and the thus reproduced data DVXX are supplied to the signal recording and reproduction section 11. The data DVXX reproduced in this manner are one of the data DC12, DC14, DC16, DD10, and DD12 illustrated in FIG. 23. Thus, the signal recording and reproduction section 11 performs, for example, recording of the data DVXX by a VTR built therein.

The signal recording and reproduction section 11 further includes a return video signal formation section. The return video signal formation section signals digital data DPM, which are, for example, 20-bit word string data having a word transmission rate of 74.25 MBps and form return video signals. Consequently, the digital data DPM, which form return video signals, are obtained from the signal recording and reproduction section 11.

The digital data DPM obtained from the signal recording and reproduction section 11 are supplied to a P/S conversion section 55. The P/S conversion section 55 performs P/S conversion for the digital data DPM to form serial data DSM whose bit transmission rate is 74.25 MBps×20=1.485 Gbps. The P/S conversion section 55 supplies the serial data DSM to an E/O conversion section 56.

The E/O conversion section 56 performs an E/O conversion process for the serial data DSM to produce an optical signal OSM having a center wavelength of, for example, approximately 1.3 μm based on the serial data DSM. The E/O conversion section 56 signals the optical signal OSM at a bit transmission rate of 1.485 Gbps. The optical signal OSM led out from the E/O conversion section 56 is supplied to the bidirectional WDM coupler 32.

In the bidirectional WDM coupler 32, the optical signal OSM from the E/O conversion section 56 is supplied from the input/output terminal 41 shown in FIG. 12 to the dielectric multilayer film section 35 through the optical connector 40. Then, the optical signal OSM is led out from the dielectric multilayer film section 35 to the input/output terminal 37 through the optical connector 36. The optical signal OSM led out to the input/output terminal 37 is signaled from the bidirectional WDM coupler 32 and introduced to the optical connector 33 shown in FIG. 2.

Referring back to FIG. 2, the optical signal OSM from the bidirectional WDM coupler 32 is signaled to the second end of the optical signal transmission cable 31 through the optical connector 33 and then transmitted from the second end to the first end of the optical signal transmission cable 31. Then, the optical signal OSM is led out from the first end of the optical signal transmission cable 31 to the bidirectional WDM coupler 22 through the optical connector 30 shown in FIG. 1.

Figure 11:
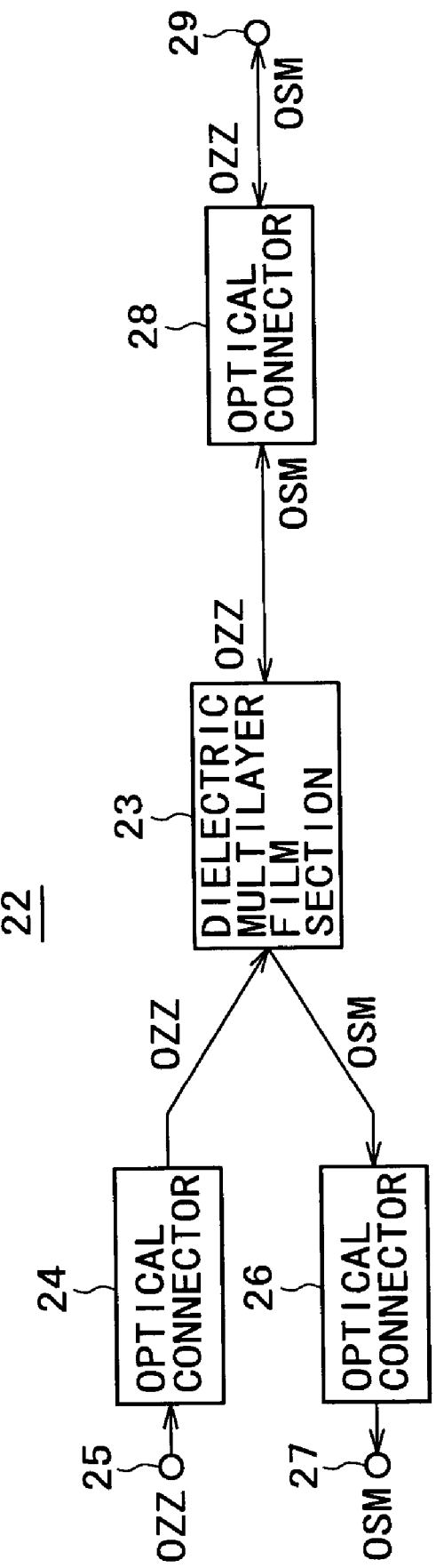
FIGS. 11 and 12 are block diagrams showing an example of a particular configuration of bidirectional WDM couplers used in the data transmission apparatus shown in FIGS. 1 and 2, respectively.

Referring to FIG. 1, in the bidirectional WDM coupler 22, the optical signal OSM from the optical connector 30 having a bit transmission rate of 1.485 Gbps and a center frequency of approximately 1.3 μm is supplied from the input/output terminal 29 shown in FIG. 11 to the dielectric multilayer film section 23 through the optical connector 28. Then, the optical signal OSM is led out from the dielectric multilayer film section 23 to the input/output terminal 27 through the optical connector 26. The optical signal OSM led out to the input/output terminal 27 is signaled from the bidirectional WDM coupler 22 and introduced to an O/E conversion section 57.

The O/E conversion section 57 performs O/E conversion for the optical signal OSM to reproduce serial data DSM having a bit transmission rate of 1.485 Gbps based on the optical signal OSM. Then, the reproduced serial data DSM are supplied to an S/P conversion section 58.

The S/P conversion section 58 performs an S/P conversion process for formation of 20-bit parallel data for the serial data DSM to reproduce digital data DPM, which has a word transmission rate of 1.485 Gbps/20=74.25 MBps and forms return video signals, based on the serial data DSM. The S/P conversion section 58 supplies the digital data DPM to the camera section 10.

In the data transmission apparatus described above with reference to FIGS. 1 and 2, data DVXX obtained from the camera section 10 are one of the data DC12, DC14, DC16, DD10, and DD12 illustrated in FIG. 23 and are converted into a multiplexed optical signal OZZ. The multiplexed optical signal OZZ is transmitted from the camera section 10 side to the signal recording and reproduction section 11 side through the optical signal transmission cable 31. Further, digital data DPM, which form return video signals to be signaled from the signal recording and reproduction section 11, are converted into an optical signal OSM and signaled from the signal recording and reproduction section 11 side to the camera section 10 side through the optical signal transmission cable 31. Consequently, bidirectional transmission of the multiplexed optical signal OZZ and the optical signal OSM is performed between the first end side and the second end side of the single optical signal transmission cable 31.

The conversion of data DVXX obtained from the camera section 10 into a multiplexed optical signal OZZ and the conversion of digital data DPM, which form return video signals, into an optical signal OSM can be performed, for example, utilizing existing circuit components used for serial transmission of a digital video signal in accordance with the HD SDI.

Figure 13:
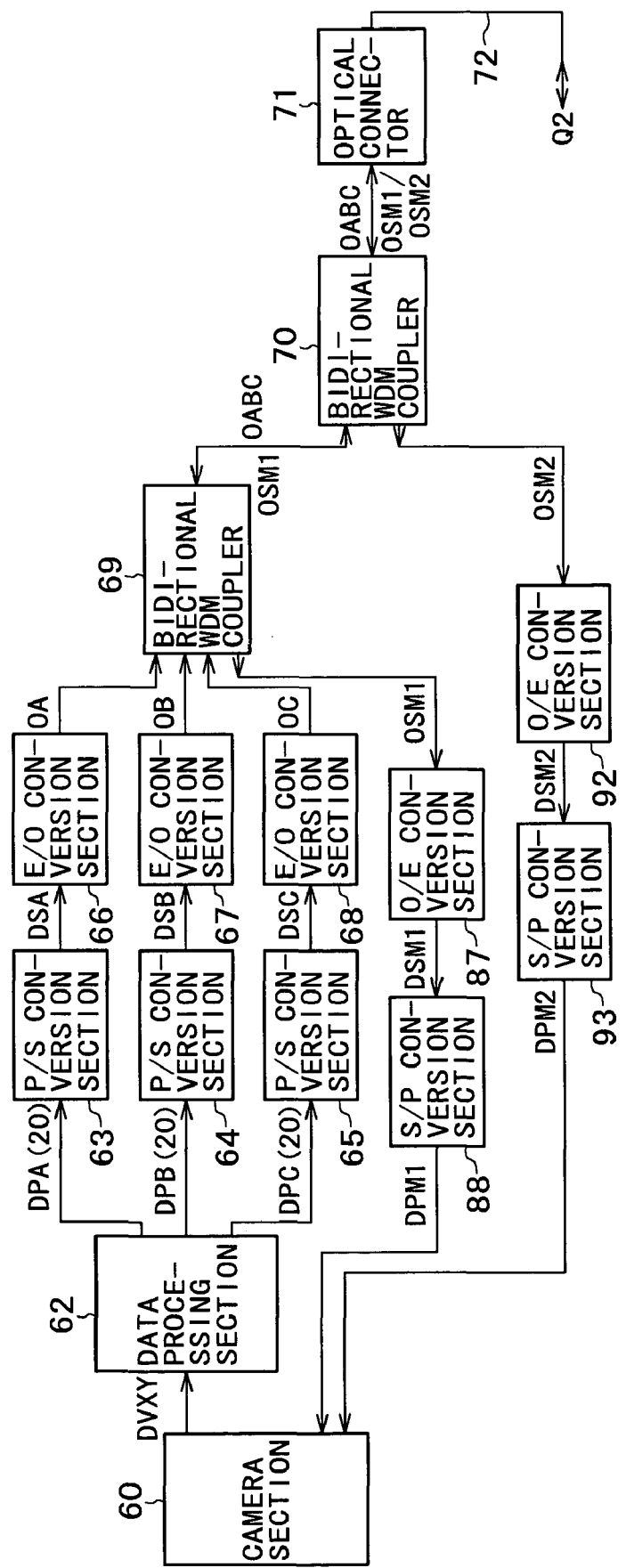
FIGS. 13 and 14 are block diagrams showing another data transmission apparatus according to the present invention to which another data transmission method according to the present invention is applied.
Figure 14:
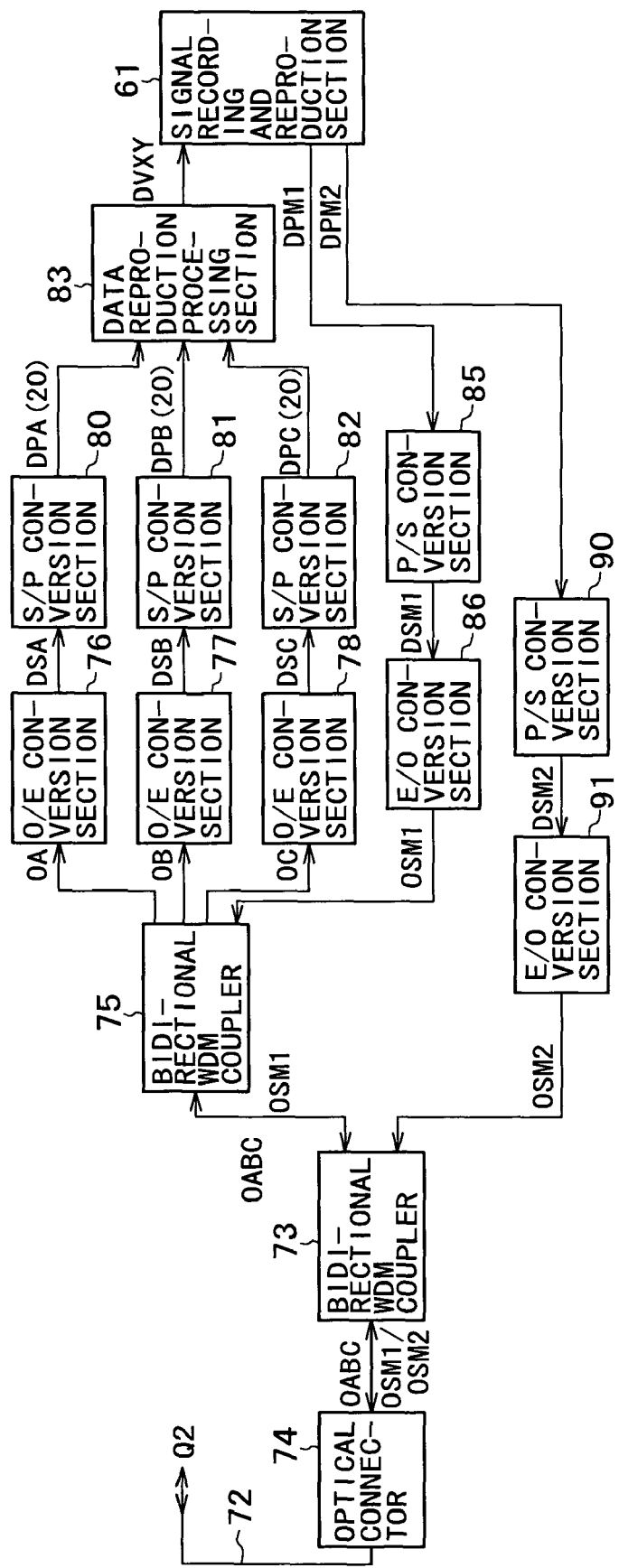
Figure 21A:
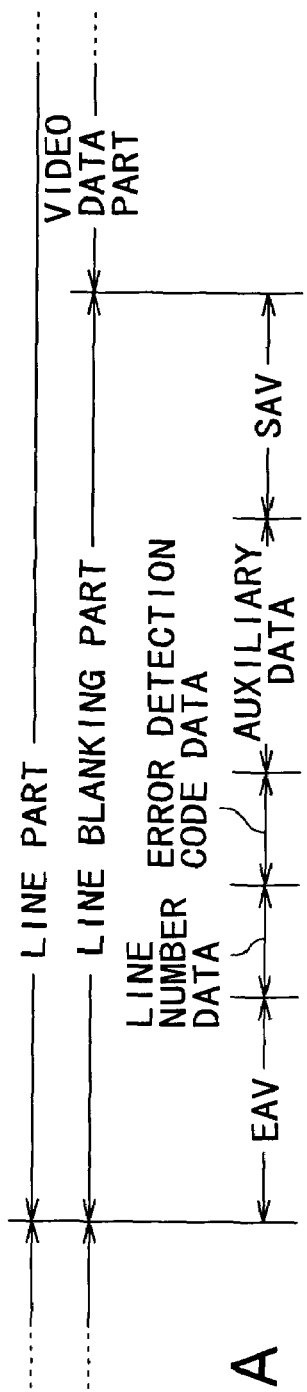
FIGS. 21A and 21B are diagrammatic views illustrating an example of a data format of an HD digital video signal.
Figure 21B:
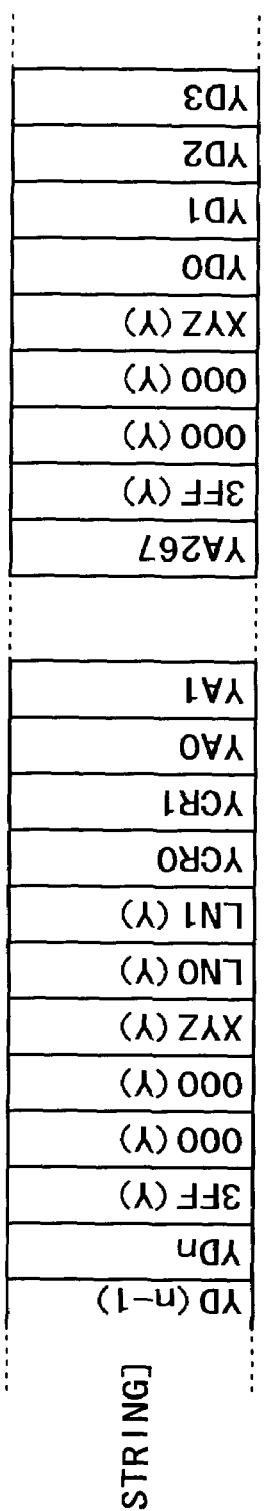
Figure 25:
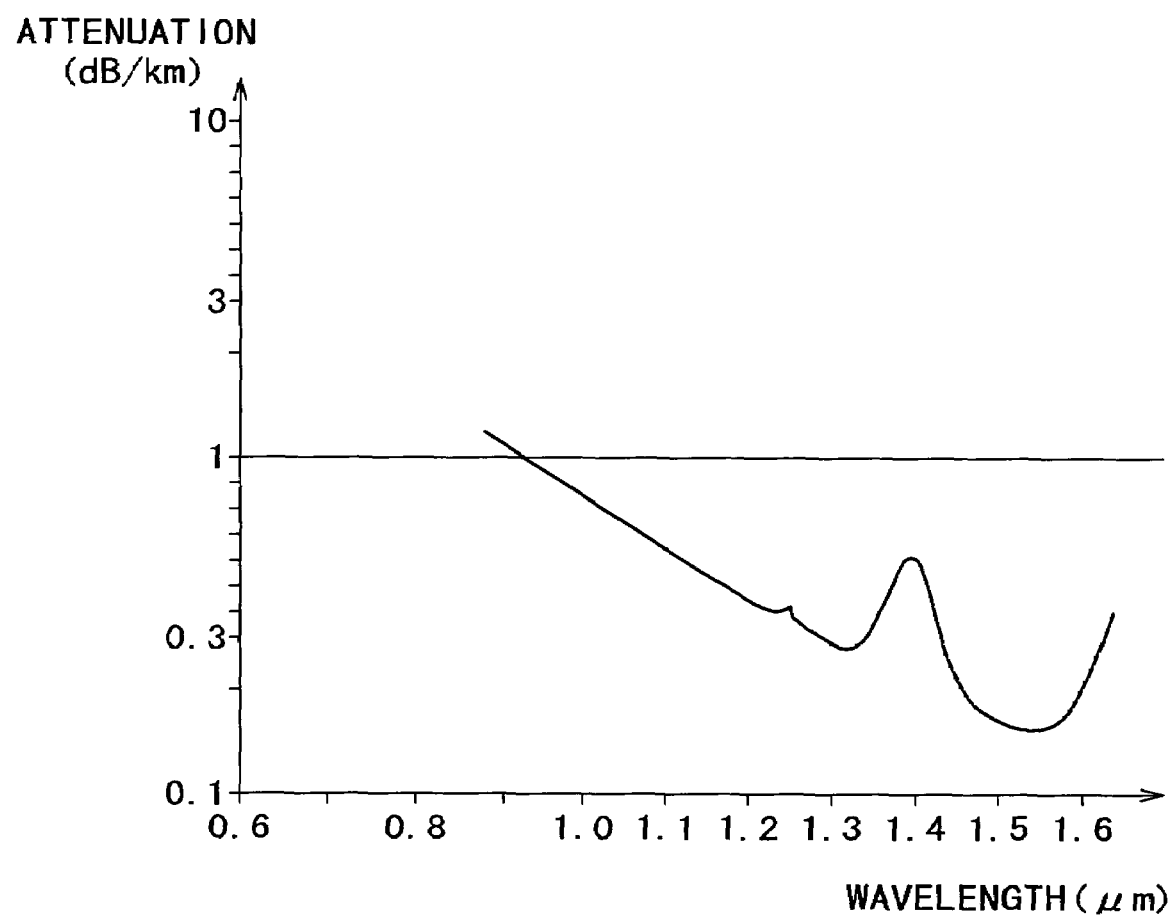
FIG. 25 is a characteristic diagram illustrating an attenuation characteristic of a quartz SMF.
Figure 26:
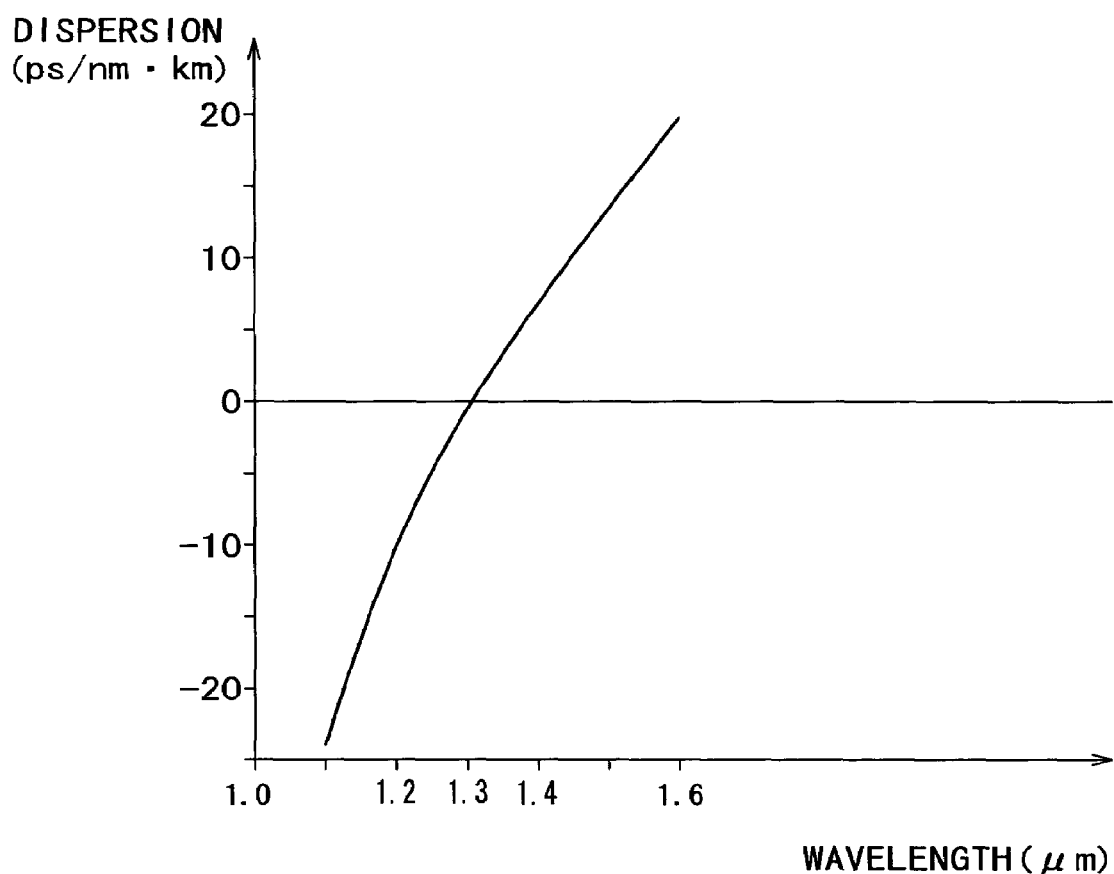
FIG. 26 is a characteristic diagram illustrating a dispersion characteristic of a quartz SMF.

Referring now to FIGS. 13 and 14, there is shown another data transmission apparatus according to the present invention to which another data transmission method according to the present invention is applied.

The data transmission apparatus shown in FIGS. 13 and 14 is used for bidirectional transmission of digital data, which form 720P signals, and of Key signal data strings, which are additional information data strings, and digital data, which form return video signals, between a camera section 60 and a signal recording and reproduction section 61. Data DVXY, which form 720P signals, are signaled from the camera section 60 and supplied to a data processing section 62.

The data DVXY are parallel data forming 720P signals and Key signals, which are represented as one of data DVA12+ DKA12, DVA14+DKA14, DVA16+DKA16, and DVB12+ DKB12 illustrated in a table of FIG. 24. Each of the 720P signals is a digital video signal of the 4:2:2 format or the 4:4:4 format. The 720P has a frame rate set to 60 Hz, a sampling frequency set to 74.25 MHz, an effective data sample number for each line set to 1,280 samples, an effective line number for each frame set to 720 lines, and a quantization bit number set to 12, 14, or 16 bits. Each of the Key signals is a signal formed from 12-, 14- or 16-bit word string data having a format equivalent to that of a Y data string or a G data string included in digital data, which forms a 720P signal.

Where the data DVXY are the data DVA12+DKA12, which form 720P signals of the 4:2:2 format whose quantization bit number is 12 and Key signals, the data DVA12+ DKA12 are supplied as 36-bit word string data in the form of parallel data having a word transmission rate of 74.25 MBps to the data processing section 62. The parallel data are obtained by parallel multiplexing of Y data strings and $P_B/P_R$ data strings (DVA12) and Key signal data strings (DKA12) with frame synchronism and line synchronism maintained thereamong. Each of the Y data strings and each of the $P_B/P_R$ data strings (DVA12) form a 720P signal of the 4:2:2 format and each has a quantization bit number of 12 and a word transmission rate of 74.25 MBps. Each of the Key signal data strings (DKA12) has a data format equivalent to that of the Y data string and has a quantization bit number of 12 and a word transmission rate of 74.25 MBps.

The data processing section 62 performs the following process for the data DVA12+DKA12 supplied thereto in such a manner as described above.

First, the data processing section 62 divides a Y data string and a $P_B/P_R$ data string as well as a Key signal data string as seen in FIG. 15. More particularly, the data processing section 62 divides the 12-bit words YD0, YD1, YD2, YD3, . . . , which form the Y data string, into 10 high-order bits Y0;2-11, Y1;2-11, Y2;2-11, Y3;2-11, . . . and 2 low-order bits Y0;0-1, Y1;0-1, Y2;0-1, Y3;0-1, . . . . Similarly, the data processing section 62 divides the 12-bit words PbD0, PrD0, PbD1, PrD1, PbD2, PrD2, . . . , which form $P_B/P_R$ data string, into 10 high-order bits Pb0;2-11, Pr0;2-11, Pb1;2-11, Pr1;2-11, Pb2;2-11, Pr2; 2-11, . . . and 2 low-order bits Pb0;0-1, Pr0;0-1, Pb1;0-1, Pr1;0-1, Pb2;0-1, Pr2;0-1, . . . . Further, the data processing section 62 divides the 12-bit words AD0, AD1, AD2, AD3, . . . , which form the Key signal data string, into 10 high-order bits A0;2-11, A1;2-11, A2;2-11, A3;2-11, . . . and 2 low-order bits A0;0-1, A1;0-1, A2;0-1, A3;0-1, . . . .

Then, the data processing section 62 parallelly multiplexes the string of 10 high-order bits Y0;2-11, Y1;2-11, Y2;2-11, Y3;2-11, . . . and the string of 10 high-order bits Pb0;2-11, Pr0;2-11, Pb1;2-11, Pr1;2-11, Pb2;211, Pr2;2-11, . . . individually obtained by the division. Consequently, 20-bit word string data DVC12A whose word transmission rate is 74.25 MBps are produced as a link A as seen in FIG. 16A.

Further, the data processing section 62 adds eight auxiliary bits c0, c1, c2, c3, . . . to the 2 low-order bits Y0;0-1, Y1;0-1, Y2;0-1, Y3;0-1, . . . obtained by the division to produce 10 bits [Y0;0-1]+c0, [Y1;0-1]+c1, [Y2;0-1]+c2, [Y3;0-1]+c3, . . . . Similarly, the data processing section 62 adds eight auxiliary bits d0, d1, d2, d3, . . . to the 2 low-order bits Pb0;0-1, Pr0;0-1, Pb1;0-1, Pr1;0-1, Pb2;0-1, Pr2;0-1, . . . to produce 10 bits [Pb0;0-1]+d0, [Pr0;0-1]+d1, [Pb1;0-1]+d2, [Pr1;0-1]+d3, [Pb2;0-1]+d4, [Pr2;0-1]+d5, . . . . Then, the data processing section 62 parallelly multiplexes the string of 10 bits [Y0;0-1]+c0, [Y1;0-1]+c1, [Y2;0-1]+c2, [Y3;0-1]+c3, . . . and the string of 10 bits [Pb0;0-1]+d0, [Pr0;0-1]+d1, [Pb1;0-1]+d2, [Pr1;0-1]+d3, [Pb2;0-1]+d4, [Pr2;0-1]+d5, . . . . Consequently, 20-bit word string data DVC12B whose word transmission rate is 74.25 MBps are formed as a link B as seen in FIG. 16B.

Furthermore, the data processing section 62 adds eight auxiliary bits e0, e1, e2, e3, . . . to the 2 low-order bits A0;0-1, A1;0-1, A2;0-1, A3;0-1, . . . obtained by the division to produce 10 bits [A0;0-1]+e0, [A1;0-1]+e1, [A2;0-1]+e2, [A3;0-1]+e3, . . . . Then, the data processing section 62 parallelly multiplexes the string of 10 bits A0;2-11, A1;2-11, A2;2-11, A3;2-11, . . . obtained by the division and the string of 10 bits [A0;0-1]+e0, [A1;0-1]+e1, [A2;0-1]+e2, [A3;0-1]+ e3, . . . . Consequently, 20-bit word string data DVC12C whose word transmission rate is 74.25 MBps are formed as a link C as seen in FIG. 16C.

In short, the data processing section 62 converts the data DVA12+DKA12, which form 36-bit word string data whose word transmission rate is 74.25 MBps, into three strings of word string data including the 20-bit word string data DVC12A, DVC12B, and DVC12C each having a data transmission rate of 74.25 MBps as seen in FIGS. 16A to 16C.

The data processing section 62 may perform the following process for the data DVA12+DKA12 supplied thereto in such a manner as described above with reference to FIG. 15 in place of the process described above.

First, the data processing section 62 divides the Y data string and the $P_B/P_R$ data string as well as the Key signal data string as seen in FIG. 15. More particularly, the data processing section 62 divides the 12-bit words YD0, YD1, YD2, YD3, . . . , which form the Y data string, into 10 high-order bits Y0;2-11, Y1;2-11, Y2;2-11, Y3;2-11, . . . and 2 low-order bits Y0;0-1, Y1;0-1, Y2;0-1, Y3;0-1, . . . . Similarly, the data processing section 62 divides the 12-bit words PbD0, PrD0, PbD1, PrD1, PbD2, PrD2, . . . , which form $P_B/P_R$ data string, into 10 high-order bits Pb0;2-11, Pr0;2-11, Pb1;2-11, Pr1;2- 11, Pb2;2-11, Pr2;2-11, . . . and 2 low-order bits Pb0;0-1, Pr0;0-1, Pb1;0-1, Pr1;0-1, Pb2;01, Pr2;0-1, . . . . Further, the data processing section 62 divides the 12-bit words AD0, AD1, AD2, AD3, . . . , which form the Key signal data string, into 10 high-order bits A0;2-11, A1;2-11, A2;2-11, A3; 2-11, . . . and 2 low-order bits A0;0-1, A1;0-1, A2;0-1, A3; 0-1, . . . .

Then, the data processing section 62 parallelly multiplexes the string of 10 high-order bits Y0;2-11, Y1;2-11, Y2;2-11, Y3;2-11, . . . and the string of 10 high-order bits Pb0;2-11, Pr0;2-11, Pb1;2-11, Pr1;2-11, Pb2;2-11, Pr2;2-11, . . . individually obtained by the division. Consequently, 20-bit word string data DVC12A whose word transmission rate is 74.25 MBps are produced as a link A as seen in FIG. 17A.

Further, the data processing section 62 bit multiplexes the 2 low-order bits Y0;0-1, Pb0;0-1, and Pr0;0-1 obtained by the division and adds four bits of auxiliary bits d0 to obtain 10 bits [Y0BR0;0-1]+d0. Similarly, the data processing section 62 adds eight bits of auxiliary bits e0 to the 2 low-order bits Y1;0-1 obtained by the division to obtain 10 bits [Y1;0-1]+e0. The data processing section 62 bit multiplexes the 2 low-order bits Y2;0-1, Pb1;0-1, and Pr1;0-1 obtained by the division and adds four bits of auxiliary bits d1 to obtain 10 bits [Y2BR1;0-1]+d1. Further, the data processing section 62 adds eight bits of auxiliary bits e1 to the 2 low-order bits Y3;0-1 obtained by the division to obtain 10 bits [Y1;0-1]+e1. The data processing section 62 bit multiplexes the 2 low-order bits Y4;0-1, Pb2;0-1, and Pr2;0-1 obtained by the division and adds four bits of auxiliary bits d2 to obtain 10 bits [Y4BR2;0-1]+d2. The data processing section 62 adds eight bits of auxiliary bits e2 to the 2 low-order bits Y5;0-1 obtained by the division to obtain 10 bits [Y5;0-1]+e2. The data processing section 62 further processes 10 bits in this manner to obtain a string of 10 bits. Then, the data processing section 62 parallelly multiplexes the string of 10 bits and auxiliary 10-bit words ,,D0, ,,D1, ,,D2, ,,D3, . . . . Consequently, 20-bit word string data DVC12B whose word transmission rate is 74.25 MBps is formed as a link B as seen in FIG. 17B.

Furthermore, the data processing section 62 adds eight bits of auxiliary bits e0, e1, e2, e3, . . . to the 2 low-order bits A0;0-1, A1;0-1, A2;0-1, A3;0-1, . . . obtained by the division to produce 10 bits [A0;0-1]+e0, [A1;0-1]+e1, [A2;0-1]+e2, [A3;0-1]+e3, . . . , respectively. Then, the data processing section 62 parallelly multiplexes the string of 10 bits A0;2-11, A1;2-11, A2;2-11, A3;2-11, . . . and the string of 10 bits [A0;0-1]+e0, [A1;D-1]+e1, [A2;0-1]+e2, [A3;0-1]+e3, . . . . Consequently, 20-bit word-string data DVC12C whose word transmission rate is 74.25 MBps are formed as a link C as seen in FIG. 17C.

In short, also in this instance, the data processing section 62 converts the data DVA12+DKA12, which form 36-bit word string data whose word transmission rate is 74.25 MBps, into three strings of word string data including the 20-bit word string data DVC12A, DVC12B, and DVC12C each having a data transmission rate of 74.25 MBps as seen in FIG. 17.

Where the data DVXY are the data DVA14+DKA14, which form 720P signals of the 4:2:2 format and Key signals each having a quantization bit number of 14, or the data DVA16+DKA16 which form 720P signals of the 4:2:2 format and Key signals each having a quantization bit number of 16, the data DVA14+DKA14 or DVA16+DKA16 are supplied as 42-bit word string data or 48-bit word string data in the form of parallel data having a word transmission rate of 74.25 MBps to the data processing section 62. The parallel data are obtained by parallel multiplexing of Y data strings and $P_B/P_R$ data strings (DVA14 or DVA16) and Key signal data strings (DKA14 or DKA16) with frame synchronism and line synchronism maintained thereamong. The Y data strings and the $P_B/P_R$ data strings (DVA14 or DVA16) form 720P signals of the 4:2:2 format and each has a quantization bit number of 14 or 16 and a word transmission rate of 74.25 MBps. The Key signal data strings (DKA14 or DKA16) have a format equivalent to that of the Y data strings and have a quantization bit number of 14 or 16 and a word transmission rate of 74.25 MBps.

Also in this instance, the data processing section 62 performs, for the data DVA14+DKA14 or DVA16+DKA16, a process similar to that performed for the data DVA12+DKA12. However, the data processing section 62 performs a different operation in place of the operation of dividing each of 12-bit words, which form the Y data strings, the $P_B/P_R$ data strings, and the Key signal data strings, into 10 high-order bits and 2 low-order bits. More particularly, the data processing section 62 performs an operation of dividing each of the 14-bit words, which form the Y data strings, the $P_B/P_R$ data strings, and the Key signal data strings, into 10 high-order bits and 4 low-order bits. Alternatively, the data processing section 62 performs an operation of dividing each of the 16-bit words, which form the Y data strings, the $P_B/P_R$ data strings, and the Key signal data strings, into 10 high-order bits and 6 low-order bits.

Then, the data processing section 62 converts the data DVA14+DKA14, which form 42-bit word string data whose word transmission rate is 74.25 MBps, into three strings of word string data including the 20-bit word string data DVC14A, DVC14B, and DVC14C each having a data transmission rate of 74.25 MBps. The data processing section 62 converts the data DVA16+DKA16, which form 42-bit word string data whose word transmission rate is 74.25 MBps, into three strings of word string data including the 20-bit word string data DVC16A, DVC16B, and DVC16C each having a data transmission rate of 74.25 MBps.

Where the data DVXY are the data DVB12+DKB12, which form 720P signals of the 4:4:4 format and Key signals whose quantization bit number is 12, the data DVB12+DKB12 are supplied as 48-bit word string data in the form of parallel data having a word transmission rate of 74.25 MBps to the data processing section 62. The parallel data are obtained by parallel multiplexing of G data strings, B data strings, and R data strings (DVB12) and Key signal data strings (DKB12) with frame synchronism and line synchronism maintained thereamong. As seen in FIG. 18, a G data string, a B data string, and an R data string (DVB12) form a 720P signal of the 4:4:4 format and each has a quantization bit number of 12 and a word transmission rate of 74.25 MBps. The Key signal data string (DKB12) has a data format equivalent to that of the G data string and has a quantization bit number of 12 and a word transmission rate of 74.25 MBps.

The data processing section 62 performs the following process for the data DVB12+DKB12 supplied thereto in such a manner as described above.

First, the data processing section 62 divides the G data string, B data string, and R data string as seen in FIG. 18. More particularly, the data processing section 62 divides the 12-bit words GD0, GD1, GD2, GD3, . . . into 10 high-order bits GG;2-11, G1;2-11, G2;2-11, G3;2-11, . . . and 2 low-order bits GG;0-1, G1;0-1, G2;0-1, G3;0-1, . . . . Similarly, the data processing section 62 divides the 12-bit words BD0, BD1, BD2, BD3, . . . into 10 high-order bits B0;2-11, B1;2-11, B2;2-11, B3;2-11, . . . and 2 low-order bits B0;0-1, B1;0-1, B2;0-1, B3;0-1, . . . . Further, the data processing section 62 divides the 12-bit words RD0, RD1, RD2, RD3, . . . into 10 high-order bits R0;2-11, R1;2-11, R2;2-11, R3;2-11, . . . and 2 low-order bits R0;0-1, R1;0-1, R2;0-1, R3;0-1, . . . . Furthermore, the data processing section 62 divides the 12-bit words AD0, AD1, AD2, AD3, . . . , which form the Key signal data string, into 10 high-order bits A0;2-11, A1;2-11, A2;2-11, A3;2-11, ... and 2 low-order bits A0;0-1, A1;0-1, A2;0-1, A3;0-1, ....

Then, the data processing section 62 forms a 10-bit string in the following manner based on the 2 low-order bits G0;0-1, G1;0-1, G2;0-1, G3;0-1, ..., B0;0-1, B1;0-1, B2;0-1, B3;0-1, ..., and R0;0-1, R1;0-1, R2;0-1, R3;0-1, .... In particular, the data processing section 62 bit multiplexes the 2 low-bits G0;0-1, B0;0-1, and R0;0-1 and adds four bits of auxiliary bits f0 to form 10 bits [GBR0:0-1]+f0. Similarly, the data processing section 62 bit multiplexes the 2 low-bits G1;0-1, B1;0-1, and R1;0-1 and adds four bits of auxiliary bits f1 to form 10 bits [GBR1:0-1]+f1. Further, the data processing section 62 bit multiplexes the 2 low-bits G2;0-1, B2;0-1, and R2;01 and adds four bits of auxiliary bits f2 to form 10 bits [GBR2:0-1]+f2. Furthermore, the data processing section 62 bit multiplexes the 2 low-bits G3;0-1, B3;0-1, and R3;0-1 and adds four bits of auxiliary bits f3 to form 10 bits [GBR3:0-1]+f3. The data processing section 62 similarly performs multiplexing and addition successively for the remaining 2 low-bits to form 10 bits. Consequently, a string of such 10-bits [GBR0:0-1]+f0, [GBR1:0-1]+f1, [GBR2:0-1]+f2, [GBR3:0-1]+f3, ... is produced.

Thereafter, the data processing section 62 distributes the strings of 10 bits G0;2-11, G1;2-11, G2;2-11, G3;2-11, ..., B0;2-11, B1;2-11, B2;2-11, B3;2-11, ... and R0;2-11, R1;2-11, R2;2-11, R3;2-11, ... all obtained by the division described above and the string of 10 bits [GBR0:0-1]+f0, [GBR1:0-1]+f1, [GBR2:0-1]+f2, [GBR3:0-1]+f3,... formed as described above into a 10-bit word group 1 and another 10-bit word group 2 as indicated separately with a thick partitioning line in FIG. 19. In particular, the 10-bit word group 1 includes the string of 10 high-order bits G0;2-11, G1;2-11, G2;2-11, G3;2-11, ..., the string of 10 high-order bits B0;2-11, B2;2-11, B4;2-11, ... and the string of 10 high-order bits R0;2-11, R2;2-11, R4;2-11, ... obtained by the division. The 10-bit group 2 includes the strings of 10 high-order bits B1;2-11, B3;2-11, B5;2-11, ... and R1;2-11, R3;2-11, R5;2-11, obtained by the division and the string of 10-bits [GBR0:0-1]+f0, [GBR1:0-1]+f1, [GBR2:0-1]+f2, [GBR3:0-1]+f3,... formed as described above.

Then, the data processing section 62 forms 20-bit word string data DVD12A having a word transmission rate of 74.25 MBps as a link A as seen in FIG. 20A based on the 10-bit word group 1 illustrated in FIG. 19. Similarly, the data processing section 62 forms 20-bit word string data DVD12B having a word transmission rate of 74.25 MBps as another link B as seen in FIG. 20B based on the 10-bit word group 2 shown in FIG. 19.

Furthermore, the data processing section 62 adds eight bits of auxiliary bits e0, e1, e2, e3, ... to the 2 low-order bits A0;0-1, A1;0-1, A2;0-1, A3;0-1, ... obtained by the division to produce 10 bits [A0;0-1]+e0, [A1;0-1]+e1, [A2;0-1]+e2, [A3;0-1]+e3, .... Then, the data processing section 62 parallelly multiplexes the string of 10 bits A0;2-11, A1;2-11, A2;2-11, A3;2-11, ... and the string of 10 bits [A0;0-1]+e0, [A1;0-1]+e1, [A2;0-1]+e2, [A3;0-1]+e3, .... Consequently, 20-bit word string data DVD12C whose word transmission rate is 74.25 MBps are formed as a link C as seen in FIG. 20C.

In short, the data processing section 62 converts the data DVB12+DKB12, which form 48-bit word string data whose word transmission rate is 74.25 MBps, into three strings of word string data including the 20-bit word string data DVD12A, DVD12B, and DVD12C each having a data transmission rate of 74.25 MBps.

The data processing section 62 leads out one of a set of the 20-bit word string data DVC12A, DVC12B, and DVC12C, another set of the 20-bit word string data DVC14A, DVC14B, and DVC14C, a further set of the 20-bit word string data DVC16A, DVC16B, and DVC16C, and a still further set of the 20-bit word string data DVD12A, DVD12B, and DVD12C, obtained in such a manner as described above and each having a word transmission rate as a set of 20-bit word string data DPA(20), DPB(20), and DPC(20).

Referring to FIG. 13, the 20-bit word string data DPA(20), DPB(20), and DPC(20) led out from the data processing section 62 and having a word transmission rate 74.25 MBps are supplied to P/S conversion sections 63, 64, and 65, respectively. The P/S conversion section 63 performs P/S conversion for the 20-bit word string data DPA(20) to form serial data DSA having a bit transmission rate of 74.25 MBps× 20=1.485 Gbps based on the 20-bit word string data DPA(20). The P/S conversion section 64 performs P/S conversion for the 20-bit word string data DPB(20) to form serial data DSB having a transmission rate of 74.25 MBps×20=1.485 Gbps based on the 20-bit word string data DPB(20). The P/S conversion section 65 performs P/S conversion for the 20-bit word string data DPC(20) to form serial data DSC having a transmission rate of 74.25 MBps×20=1.485 Gbps based on the 20-bit word string data DPC(20).

The serial data DSA outputted from the P/S conversion section 63 is supplied to an E/O conversion section 66. The serial data DSB outputted from the P/S conversion section 64 is supplied to another E/O conversion section 67. The serial data DSC outputted from the P/S conversion section 65 is supplied to a further E/O conversion section 68. The E/O conversion section 66 performs an E/O conversion process for the serial data serial data DSA to form an optical signal OA based on the serial data DSA. The optical signal OA has a center frequency of, for example, approximately 1.511 $\mu$m and a bit transmission rate of 1.485 Gbps. The E/O conversion section 67 performs an E/O conversion process for the serial data DSB to form an optical signal OB based on the serial data DSB. The optical signal OB has a center frequency of, for example, approximately 1.531 $\mu$m and a bit transmission rate of 1.485 Gbps. The E/O conversion section 68 performs an E/O conversion process for the serial data DSC to form an optical signal OC based on the serial data DSC. The optical signal OC has a center frequency of, for example, approximately 1.551 $\mu$m and a bit transmission rate of 1.485 Gbps.

The optical signals OA, OB, and OC have frequencies very near to each other such that the center frequencies thereof are different only by approximately 0.020 $\mu$m from each other.

The optical signals OA, OB, and OC from the E/O conversion sections 66, 78, and 68 are introduced to a bidirectional WDM coupler 69. The bidirectional WDM coupler 69 has four input/output terminals provided on a first end side thereof and has a single input/output terminal provided on the other or second end side thereof. The optical signals OA, OB, and OC from the E/O conversion sections 66, 78, and 68 are introduced to three of the four input/output terminals provided on the first end side of the bidirectional WDM coupler 69 and then led out as a multiplexed optical signal OABC from the single input/output terminal provided on the second end side of the bidirectional WDM coupler 69.

A wavelength multiplexing technique called CWDM is applied to the block including the E/O conversion sections 66, 78, and 68 and the bidirectional WDM coupler 69.

The multiplexed optical signal OABC led out from the bidirectional WDM coupler 69 is supplied to another bidirectional WDM coupler 70. The bidirectional WDM coupler 70 is configured similarly to the bidirectional WDM coupler 22 provided in the data transmission apparatus of FIGS. 1 and 2. The bidirectional WDM coupler 70 has two input/output terminals provided on a first end side thereof and has a single input/output terminal provided on the other or second end side thereof.

Thus, the multiplexed optical signal OABC led out from the bidirectional WDM coupler 69 is introduced into one of the two input/output terminals provided on the first end side of the bidirectional WDM coupler 70. Then, the multiplexed optical signal OABC is led out from the single input/output terminal provided on the second end side of the bidirectional WDM coupler 70 and then introduced to an optical connector 71.

The optical connector 71 interconnects the bidirectional WDM coupler 70 and a first end of the optical signal transmission cable 72. Consequently, the multiplexed optical signal OABC from the bidirectional WDM coupler 70 is signaled to the first end of the optical signal transmission cable 72 through the optical connector 71. The optical signal transmission cable 72 is formed from, for example, an SMF of the quartz type.

Referring to FIG. 14, an optical connector 74 is provided on the other or second end of the optical signal transmission cable 72 and interconnects the optical signal transmission cable 72 and a bidirectional WDM coupler 73. Consequently, the multiplexed optical signal OABC signaled to the first end of the optical signal transmission cable 72 through the optical connector 71 is transmitted from the first end to the second end of the optical signal transmission cable 72. Then, the multiplexed optical signal OABC is led from the second end of the optical signal transmission cable 72 to the bidirectional WDM coupler 73 through the optical connector 74.

The bidirectional WDM coupler 73 is formed similarly to the bidirectional WDM coupler 32 in the data transmission apparatus of FIGS. 1 and 2. The bidirectional WDM coupler 73 has a single input/output terminal provided on a first end side thereof and has two input/output terminals provided on the other second input side thereof.

The multiplexed optical signal OABC having passed through the optical connector 74 is introduced to the single input/output terminal provided on the first end side of the bidirectional WDM coupler 73. Then, the multiplexed optical signal OABC is led out to one of the two input/output terminals provided on the second end side of the bidirectional WDM coupler 73 and introduced to another bidirectional WDM coupler 75.

The bidirectional WDM coupler 75 has a single input/output terminals provided on a first end side thereof and has four input/output terminal provided on the other or second end side thereof similarly to the bidirectional WDM coupler 69. The multiplexed optical signal OABC having passed through the bidirectional WDM coupler 73 is introduced to the single input/output terminal provided on the first end side of the bidirectional WDM coupler 75. Then, the multiplexed optical signal OABC is led out as optical signals OA, OB, and OC from three of the four input/output terminals provided on the second end side of the bidirectional WDM coupler 75. The optical signal OA has a bit transmission rate of 1.485 Gbps and a center frequency of approximately 1.511 µm. The optical signal OB has a bit transmission rate of 1.485 Gbps and another center frequency of approximately 1.531 µm. The optical signal OC has a bit transmission rate of 1.485 Gbps and a further center frequency of approximately 1.551 µm. The optical signals OA, OB, and OC are introduced to O/E conversion sections 76, 77, and 78, respectively.

The O/E conversion section 76 performs an O/E conversion process for the optical signal OA, which has a bit transmission rate of 1,485 Gbps and a central frequency of approximately 1.511 µm. Consequently, serial data DSA having a bit transmission rate of 1.485 Gbps are produced based on the optical signal OA. The reproduced serial data DSA is supplied to an S/P conversion section 80.

The O/E conversion section 77 performs an O/E conversion process for the optical signal OB, which has a bit transmission rate of 1,485 Gbps and a central frequency of approximately 1.531 µm. Consequently, serial data DSB having a bit transmission rate of 1.485 Gbps is produced based on the optical signal OB. The reproduced serial data DSB is supplied to another S/P conversion section 81.

The O/E conversion section 78 performs an O/E conversion process for the optical signal OC, which has a bit transmission rate of 1,485 Gbps and a central frequency of approximately 1.551 µm. Consequently, serial data DSC having a bit transmission rate of 1.485 Gbps is produced based on the optical signal OC. The reproduced serial data DSC is supplied to a further S/P conversion section 82.

The S/P conversion section 80 performs serial/parallel conversion for formation of 20-bit parallel data for the serial data DSA to reproduce 20-bit word string data DPA(20) whose word transmission rate is 1.485 Gbps/20=74.25 MBps. The S/P conversion section 81 performs serial/parallel conversion for formation of 20-bit parallel data for the serial data DSB to reproduce 20-bit word string data DPB(20) whose word transmission rate is 1.485 Gbps/20=74.25 MBps. The S/P conversion section 82 performs serial/parallel conversion for formation of 20-bit parallel data for the serial data DSC to reproduce 20-bit word string data DPC(20) whose word transmission rate is 1.485 Gbps/20=74.25 MBps.

The 20-bit word string data DPA(20), DPB(20), and DPC(20) reproduced by the S/P conversion sections 80 to 82, respectively, are supplied to a data reproduction processing section 83.

The data reproduction processing section 83 performs a data process reverse to the data process performed for the data DVXY by the data processing section 62 for the 20-bit word string data DPA(20), DPB(20), and DPC(20). Consequently, the data DVXY based on the 20-bit word string data DPA(20), DPB(20), and DPC(20) are reproduced by the reverse process, and the thus reproduced DVXY are supplied to the signal recording and reproduction section 61. The data DVXY reproduced in this manner are one of the data DVA12+ DKA12, DVA14+DKA14, DVA16+DKA16, and DVB12+ DKB12 illustrated in FIG. 24. Thus, the signal recording and reproduction section 61 performs, for example, recording of the data DVXY by means of a VTR built therein.

The signal recording and reproduction section 61 further includes a return video signal formation section. The return video signal formation section signals digital data DPM1 and DPM2 each of which are, for example, 20-bit word string data having a word transmission rate of 74.25 MBps and form return video signals. Consequently, the digital data DPM1 and DPM2, which form return video signals, are obtained from the signal recording and reproduction section 61.

The digital data DPM1 obtained from the signal recording and reproduction section 61 are supplied to a P/S conversion section 85. The P/S conversion section 85 performs P/S conversion for the digital data DPM1 to form serial data DSM1 whose bit transmission rate is 74.25 MBps×20=1.485 Gbps. The P/S conversion section 85 supplies the serial data DSM1 to an E/O conversion section 86.

The E/O conversion section 86 performs an E/O conversion process for the serial data DSM1 to produce an optical signal OSM1 having a center wavelength of, for example, approximately 1.571 µm and having a bit transmission rate of 1.485 Gbps based on the serial data DSM1. In this manner, the optical signal OSM1 has a center frequency near to the center frequency of the optical signal OC, that is, near to approximately 1.551 μm spaced by a wavelength interval of approximately 0.020 μm.

The optical signal OSM1 obtained from the E/O conversion section 86 is introduced to one of the four input/output terminals on the second end side of the bidirectional WDM coupler 75 and led out to the single input/output terminal on the first end side of the bidirectional WDM coupler 75. Then, the optical signal OSM1 is supplied to the bidirectional WDM coupler 73. More particularly, the optical signal OSM1 from the bidirectional WDM coupler 75 is introduced to one of the two input/output terminals provided on the second end side of the bidirectional WDM coupler 73. Then, the optical signal OSM1 is led out to the single input/output terminal provided on the first end side of the bidirectional WDM coupler 73.

The optical signal OSM1 led out to the single input/output terminal provided on the first end side of the bidirectional WDM coupler 73 is introduced to the optical connector 74. Then, the optical signal OSM1 is signaled to the second end of the optical signal transmission cable 72 through the optical connector 74 and transmitted from the second end side to the first end side of the optical signal transmission cable 72. Then, the optical signal OSM1 is introduced from the first end side of the optical signal transmission cable 72 to the bidirectional WDM coupler 70 through the optical connector 71 shown in FIG. 13. In the bidirectional WDM coupler 70, the optical signal OSM1 from the optical connector 71 is introduced to the single input/output terminal provided on the second end side and lead out to one of the two input/output terminals provided on the first end side.

The optical signal OSM1 introduced to one of the two input/output terminals provided on the first end side of the bidirectional WDM coupler 70 and having a bit transmission rate of 1.485 Gbps and a center frequency of approximately 1.571 μm is introduced to the bidirectional WDM coupler 69.

In the bidirectional WDM coupler 69, the optical signal OSM1 is introduced to the single input/output terminal provided on the second end side and led out from one of the four input/output terminals provided on the first end side. Then, the optical signal OSM1 is introduced to an O/E conversion section 87. The O/E conversion section 87 performs an O/E conversion process for the optical signal OSM1 having a bit transmission rate of 1.485 Gbps and a center frequency of approximately 1.571 μm. Consequently, serial data DSM1 having a bit transmission rate of 1.485 Gbps is reproduced based on the optical signal OSM1 and supplied to an S/P conversion section 88.

The S/P conversion section 88 performs an S/P conversion process for formation of 20-bit parallel data for the serial data DSM1 to reproduce digital data DPM1, which have a word transmission rate of 1.485 Gbps/20=74.25 MBps and form return video signals, based on the serial data DSM1. The S/P conversion section 88 supplies the digital data DPM1 to the camera section 60.

Meanwhile, the digital data DPM2 obtained from the signal recording and reproduction section 61 are supplied to a P/S conversion section 90. The P/S conversion section 90 performs P/S conversion for the digital data DPM2 to form serial data DSM2 whose bit transmission rate is 74.25 MBps× 20=1.485 Gbps. The P/S conversion section 90 supplies the serial data DSM2 to an E/O conversion section 91.

The E/O conversion section 91 performs an E/O conversion process for the serial data DSM2 to produce an optical signal OSM2 having a center wavelength of, for example, approximately 1.3 μm based on the serial data DSM2. Then, the E/O conversion section 91 signals the optical signal OSM2 at a bit transmission rate of 1.485Gbps. The optical signal OSM2 led out from the E/O conversion section 91 is supplied to the bidirectional WDM coupler 73.

In the bidirectional WDM coupler 73, the optical signal OSM2 from the E/O conversion section 91 is introduced to the other one of the two input/output terminals provided on the second end side. Then, the optical signal OSM2 is led out from the single input/output terminal provided on the first end side and introduced to the optical connector 74.

Then, the optical signal OSM2 from the bidirectional WDM coupler 73 is signaled to the second end side of the optical signal transmission cable 72 through the optical connector 74 and transmitted from the second end side to the first end side of the optical signal transmission cable 72. Then, the optical signal OSM2 is led out from the first end side of the optical signal transmission cable 72 to the bidirectional WDM coupler 70 through the optical connector 30 shown in FIG. 13.

In the bidirectional WDM coupler 70, the optical signal OSM2 from the optical connector 71 having a bit transmission rate of 1.485 Gbps and a center frequency of approximately 1.3 μm is introduced to the single input/output terminal provided on the second end side. Then, the optical signal OSM2 is led out to the other one of the two input/output terminals provided on the first end portion and introduced to an O/E conversion section 92.

The O/E conversion section 92 performs O/E conversion for the optical signal OSM2 to reproduce serial data DSM2 having a bit transmission rate of 1.485 Gbps based on the optical signal OSM2. Then, the reproduced serial data DSM2 is supplied to an S/P conversion section 93.

The S/P conversion section 93 performs an S/P conversion process for formation of 20-bit parallel data for the serial data DSM2 to reproduce digital data DPM2, which have a word transmission rate of 1.485 Gbps/20=74.25 MBps and form return video signals, based on the serial data DSM2. The S/P conversion section 93 supplies the digital data DPM2 to the camera section 10.

Also in the data transmission apparatus described above with reference to FIGS. 13 and 14, data DVXY obtained from the camera section 60 are one of the data DVA12+KDA12, KVA14+DKA14, DVA16+DKA16, and DVB12+DKB12 illustrated in FIG. 24 and are converted into a multiplexed optical signal OABC. The multiplexed optical signal OABC is transmitted from the camera section 60 side to the signal recording and reproduction section 61 side through the optical signal transmission cable 72. Further, digital data DPM1 and DPM2, which form return video signals to be signaled from the signal recording and reproduction section 61, are converted into optical signals OSM1 and OSM2 and transmitted from the signal recording and reproduction section 61 side to the camera section 60 side through the optical signal transmission cable 72. Consequently, bidirectional transmission of the multiplexed optical signal OABC and the optical signals OSM1 and OSM2 is performed through the optical signal transmission cable 72.

The conversion of data DVXY obtained from the camera section 60 into a multiplexed optical signal OABC and the conversion of digital data DPM1 and DPM2, which form return video signals, into optical signals OSM1 and OSM2 can be performed, for example, utilizing existing circuit component used for serial transmission of a digital video signal in accordance with the HD SDI.

While preferred embodiments of the invention have been described using specific terms, such description is for illustrative purposes only, and it is to be understood that changes and variations may be made without departing from the spirit or scope of the following claims.

What is claimed is:

1. A data transmission method, comprising the steps of:
   forming first to fourth word string data based on parallel data representative of digital video signals having a frame rate set to 50 Hz or 60 Hz, an effective line number set to 1,080 for each frame, and an effective data sample number set to 1,920 for each line;
   producing first to fourth serial data based on the first to fourth word string data, respectively;
   converting the first to fourth serial data into first to fourth optical signals having first to fourth center frequencies, respectively, which are successively proximate to each other with a predetermined wavelength interval left therebetween;
   multiplexing the first to fourth optical signals to obtain a multiplexed optical signal;
   supplying the multiplexed optical signal to a first input/output terminal of a first bidirectional wavelength multiplexing coupler, which has said first input/output terminal and a second input/output terminal provided at an end thereof and has a third input/output terminal provided at the other end thereof, so that the multiplexed optical signal is led out to said third input/output terminal of said first bidirectional wavelength multiplexing coupler, the multiplexed optical signal led out to said third input/output terminal being signaled to an optical signal transmission cable so that the multiplexed optical signal is transmitted from a first end to a second end of said optical signal transmission cable;
   converting fifth serial data into a fifth optical signal;
   supplying the fifth optical signal to a fourth input/output terminal of a second bidirectional wavelength multiplexing coupler, which has said fourth input/output terminal and a fifth input/output terminal provided at an end thereof and has a sixth input/output terminal provided at the other end thereof, so that the fifth optical signal is led out to said sixth input/output terminal, the fifth optical signal led out to said sixth input/output terminal being transmitted to said optical signal transmission cable so that the fifth optical signal is transmitted from said second end to said first end of said optical signal transmission cable;
   leading out the multiplexed optical signal transmitted to said second end of said optical signal transmission cable to said fifth input/output terminal of said second bidirectional wavelength multiplexing coupler;
   performing a demultiplexing process and an optoelectric conversion process for the multiplexed optical signal led out to said fifth input/output terminal of said second bidirectional wavelength multiplexing coupler to reproduce the first to fourth serial data;
   leading out the fifth optical signal transmitted to said first end of said optical signal transmission cable to said second input/output terminal of said first bidirectional wavelength multiplexing coupler; and
   performing an opto-electric conversion process for the fifth optical signal led out to said second input/output terminal of said first bidirectional wavelength multiplexing coupler to reproduce the fifth serial data.

2. A data transmission method according to claim 1; wherein
   the parallel data have a 24-bit, 28-bit, or 32-bit configuration formed from parallel arrangement of a luminance signal data string and a color difference signal data string each including 12-bit, 14-bit, or 16-bit word string data;
   the parallel data are successively distributed into a first group and a second group for each line part to form first intermediate word string data based on the data, which form the first group, and second intermediate word string data based on the data, which form the second group;
   the 12-bit, 14-bit, or 16-bit words, which form the luminance signal data string and the color difference signal data string of the first intermediate word string data, are divided into 10 high-order bits and 2, 4, or 6 low-order bits to form first word string data including the 10 high-order bits obtained by the division and second word string data including the 2, 4, or 6 low-order bits obtained by the division and auxiliary bits; and
   the 12-bit, 14-bit, or 16-bit words, which form the luminance signal data string and the color difference signal data string of the second intermediate word string data, are divided into 10 high-order bits and 2, 4, or 6 low-order bits to form third word string data including the 10 high-order bits obtained by the division and fourth word string data including the 2, 4, or 6 low-order bits obtained by the division and auxiliary bits.

3. A data transmission method according to claim 1; wherein
   the parallel data have a 30-bit configuration formed from parallel arrangement of a green primary color signal data string, a blue primary color signal data string, and a red primary color signal data string each including 10-bit word string data;
   the parallel data are successively distributed into a first group and a second group for each line part to form first intermediate word string data based on the data, which form the first group, and second intermediate word string data based on the data, which form the second group;
   the 10-bit words, which form the green primary color signal data string, blue primary color signal data string, and red primary color signal data string of the first intermediate word string data, are distributed into a first word group including the 10-bit words, which form the green primary color signal data string, and particular ones of the 10-bit words, which form the blue primary color signal data string and the red primary color signal data string, and a second word group including 10-bit words, which form an auxiliary data string, and the remaining ones of the 10-bit words, which form the blue primary color signal data string and the red primary color signal data string, to form first and second word string data based on the first and second word groups, respectively; and
   the 10-bit words, which form the green primary color signal data string, blue primary color signal data string, and red primary color signal data string of the second intermediate word string data, are distributed into a third word group including the 10-bit words, which form the green primary color signal data string, and particular ones of the 10-bit words, which form the blue primary color signal data string and the red primary color signal data string, and a fourth word group including 10-bit words, which form another auxiliary data string, and the remaining ones of the 10-bit words, which form the blue primary color signal data string and the red primary color signal data string, to form third and fourth word string data based on the third and fourth word groups, respectively.

4. A data transmission method according to claim 1; wherein
   the parallel data have a 36-bit configuration formed from parallel arrangement of a green primary color signal data string, a blue primary color signal data string, and a red primary color signal data string each including 12-bit word string data;

the parallel data are successively distributed into a first group and a second group for each line part to form first intermediate word string data based on the data, which form the first group, and second intermediate word string data based on the data, which form the second group;

the 12-bit words, which form the green primary color signal data string, blue primary color signal data string, and red primary color signal data string of the first intermediate word string data, are divided into 10 high-order bits and 2 low-order bits to form first word string data including a plurality of the 10 high-order bits obtained by the division from the green primary color signal data string and a plurality of particular ones of the 10 high-order bits obtained by the division from the blue primary color signal data and the red primary color signal data and second word string data including a plurality of the other 10 high-order bits obtained by the division from the blue primary color signal data and the red primary color signal data, a plurality of the 2 low-order bits obtained by the division from the green primary color signal data string, blue primary color signal data string, and red primary color signal data string, and auxiliary bits; and the 12-bit words, which form the green primary color signal data string, blue primary color signal data string, and red primary color signal data string of the second intermediate word string data, are divided into 10 high-order bits and 2 low-order bits to form third word string data including a plurality of the 10 high-order bits obtained by the division from the green primary color signal data string and a plurality of particular ones of the 10 high-order bits obtained by the division from the blue primary color signal data and the red primary color signal data and fourth word string data including a plurality of the other 10 high-order bits obtained by the division from the blue primary color signal data and the red primary color signal data, a plurality of the 2 low-order bits obtained by the division from the green primary color signal data string, blue primary color signal data string, and red primary color signal data string, and auxiliary bits.

5. A data transmission method according to claim 1, wherein each of the first to fourth word string data are 20-bit word string data having a word transmission rate of 74.25 MBps.

6. A data transmission method, comprising the steps of:

forming first to third word string data based on parallel data representative of a digital video signal having a frame rate set to 60 Hz, an effective line number set to 720 for each frame, and an effective data sample number set to 1,280 for each line;

producing first to third serial data based on the first to third word string data, respectively;

converting the first to third serial data into first to third optical signals having first to third center frequencies, respectively, which are successively proximate to each other with a predetermined wavelength interval left therebetween;

supplying the first to third optical signals to first, second, and third input/output terminals of a first bidirectional wavelength multiplexing coupler, which has said first to third input/output terminals and a fourth input/output terminal provided at an end thereof and has a fifth input/output terminal provided at the other end thereof, so that a multiplexed optical signal is led out to said fifth input/output terminal of said first bidirectional wavelength multiplexing coupler, the multiplexed optical signal being supplied to a sixth input/output terminal of a second bidirectional wavelength multiplexing coupler, which has said sixth input/output terminal and a seventh input/output terminal provided at an end thereof and has an eighth input/output terminal provided at the other end thereof, so that the multiplexed optical signal is led out to said eighth input/output terminal of said second bidirectional wavelength multiplexing coupler, the multiplexed optical signal led out to said eighth input/output terminal being signaled to an optical signal transmission cable so that the multiplexed optical signal is transmitted from a first end to a second end of said optical signal transmission cable;

converting fourth serial data into a fourth optical signal having a fourth center frequency proximate to the third center frequency with a predetermined wavelength interval left therebetween, the fourth optical signal being supplied to a twelfth input/output terminal of a third bidirectional wavelength multiplexing coupler, which has ninth to eleventh input terminals and said twelfth input/output terminal provided at an end thereof and has a thirteenth input/output terminal provided at the other end thereof, so that the fourth optical signal is led out to said thirteenth input/output terminal, the fourth optical signal led out to said thirteenth input/output terminal being supplied to a fourteenth input/output terminal of a fourth bidirectional wavelength multiplexing coupler, which has said fourteenth input/output terminal and a fifteenth input/output terminal provided at an end thereof and has a sixteenth input/output terminal provided at the other end thereof, so that the fourth optical signal is led out to said sixteenth input/output terminal of said fourth bidirectional wavelength multiplexing coupler, the fourth optical signal led out to said sixteenth input/output terminal being signaled to said optical signal transmission cable so that the fourth optical signal is transmitted from said second end to said first end of said optical signal transmission cable;

converting fifth serial data into a fifth optical signal and supplying the fifth optical signal to said fifteenth input/output terminal of said fourth bidirectional wavelength multiplexing coupler so that the fifth optical signal is led out to said sixteenth input/output terminal of said fourth bidirectional wavelength multiplexing coupler, the fifth optical signal led out to said sixteenth input/output terminal being signaled to said optical signal transmission cable so that the fifth optical signal is transmitted from said second end to said first end of said optical signal transmission cable;

leading out the multiplexed optical signal transmitted to said second end of said optical signal transmission cable to said fourteenth input/output terminal of said fourth bidirectional wavelength multiplexing coupler, the multiplexed optical signal led out to said fourteenth input/output terminal being led out as the first to third optical signals to said ninth to eleventh input/output terminals of said third bidirectional wavelength multiplexing coupler;

performing an opto-electric conversion process for the first to third optical signals led out respectively to said ninth to eleventh input/output terminals of said third bidirectional wavelength multiplexing coupler to reproduce the first to third serial data;

leading out the fourth optical signal transmitted to said first end of said optical signal transmission cable to said sixth input/output terminal of said second bidirectional wavelength multiplexing coupler, the fourth optical signal led out to said sixth input/output terminal being led out to said fourth input/output terminal of said first bidirectional wavelength multiplexing coupler;

performing an opto-electric conversion process for the fourth optical signal led out to said fourth input/output terminal of said first bidirectional wavelength multiplexing coupler to reproduce the fourth serial data;

leading out the fifth optical signal transmitted to said first end of said optical signal transmission cable to said seventh input/output terminal of said second bidirectional wavelength multiplexing coupler; and performing an opto-electric conversion process for the fifth optical signal led out to said seventh input/output terminal of said second bidirectional wavelength multiplexing coupler to reproduce the fifth serial data.

7. A data transmission method according to claim 6; wherein the parallel data have a 32-bit, 42-bit, or 48-bit configuration formed from parallel arrangement of a luminance signal data string and a color difference signal data string each including 12-bit, 14-bit, or 16-bit word string data and an additional information data string having a data format equivalent to that of the luminance signal data string; and the parallel data are subject to a data process of dividing the 12-bit, 14-bit, or 16-bit words, which form each of the luminance signal data string, color difference signal data string, and additional information data string into 10 high-order bits and 2, 4, or 6 low-order bits to form first word string data based on a plurality of the 10 high-order bits obtained by the division from the luminance signal data string and the color difference signal data string, second word string data based on a plurality of the 2, 4, or 6 low-order bits obtained by the division from the luminance signal data string and the color difference data string, and third word string data based on a plurality of the 10 high-order bits and a plurality of the 2, 4, or 6 low-order bits obtained by the division from the additional information data string.

8. A data transmission method according to claim 7, wherein the additional information data string represents Key signal information regarding the digital video signal.

9. A data transmission method according to claim 6; wherein the parallel data have a 48-bit configuration formed from parallel arrangement of a green primary color signal data string, a blue primary color signal data string, and a red primary color signal data string each including 12-bit word string data and an additional information data string having a data format equivalent to that of the green primary color signal data string; and the parallel data are subject to a data process of dividing the 12-bit words, which form each of the green primary color signal data string, blue primary color signal data string, red primary color signal data string, and the additional information data string into 10 high-order bits and 2 low-order bits to form first word string data based on a plurality of the 10 high-order bits obtained by the division from the green primary color signal data string and particular ones of a plurality of the 10 high-order bits obtained by the division from the blue primary color signal data string and the red primary color signal data string, second word string data based on the remaining ones of the plurality of the 10 high-order bits obtained by the division from the blue primary color signal data string and the red primary color signal data string and a plurality of the 2 low-order bits obtained by the division from the green primary color signal data string, blue primary color signal data string, and red primary color signal data string, and third word string data based on a plurality of the 10 high-order bits and a plurality of the 2 low-order bits obtained by the division from the additional information data string.

10. A data transmission method according to claim 9, wherein the additional information data string represents Key signal information regarding the digital video signal.

11. A data transmission method according to claim 6, wherein each of the first, second, and third word string data are 20-bit word string data having a word transmission rate of 74.25 MBps.

12. A data transmission apparatus, comprising:

a data processing section for forming first to fourth word string data based on parallel data representative of digital video signals, which have a frame rate set to 50 Hz or 60 Hz, an effective line number set to 1,080 for each frame, and an effective data sample number set to 1,920 for each line;

a parallel/serial conversion section for producing first to fourth serial data based on the first to fourth word string data, respectively;

first to fourth electro-optical conversion sections for converting the first to fourth serial data into first to fourth optical signals having first to fourth center frequencies, respectively, which are successively proximate to each other with a predetermined wavelength interval left therebetween;

a multiplexed optical signal formation section for multiplexing the first to fourth optical signals to produce a multiplexed optical signal;

a first bidirectional wavelength multiplexing coupler having first and second input/output terminals provided at an end thereof and having a third input/output terminal provided at the other end thereof, said first bidirectional wavelength multiplexing coupler leading out, when the multiplexed optical signal is supplied to said first input/output terminal thereof, the multiplexed optical signal to said third input/output terminal thereof;

a fifth electro-optical conversion section for converting fifth serial data into a fifth optical signal;

a second bidirectional wavelength multiplexing coupler having fourth and fifth input/output terminals provided at an end thereof and having a sixth input/output terminal provided at the other end thereof, said second bidirectional wavelength multiplexing coupler leading out, when the fifth optical signal is supplied to said fourth input/output terminal thereof, the fifth optical signal to said sixth input/output terminal thereof;

an optical signal transmission cable for transmitting the multiplexed optical signal led out to said third input/output terminal of said first bidirectional wavelength multiplexing coupler from a first end to a second end thereof and transmitting the fifth optical signal led out to said sixth input/output terminal of said second bidirectional wavelength multiplexing coupler from said second end to said first end thereof;

a demultiplexing section for demultiplexing the multiplexed optical signal appearing at said second end of said optical signal transmission cable and led out to said fifth input/output terminal from said sixth input/output terminal through said second bidirectional wavelength multiplexing coupler into the first to fourth optical signals;

first to fourth opto-electric conversion sections for converting the first to fourth optical signals obtained from said demultiplexing section into the first to fourth serial data, respectively; and a fifth opto-electric conversion section for converting the fifth optical signal appearing at said first end of said optical signal transmission cable and led out to said second input/output terminal from said third input/output terminal through said first bidirectional wavelength multiplexing coupler into the fifth serial data.

13. A data transmission apparatus, comprising:

a data processing section for forming first to third word string data based on parallel data representative of digital video signals having a frame rate set to 60 Hz, an effective line number set to 720 for each frame, and an effective data sample number set to 1,280 for each line;

a parallel/serial conversion section for producing first to third serial data based on the first to third word string data, respectively;

first to third electro-optical conversion sections for converting the first to third serial data into first to third optical signals having first to third center frequencies, respectively, which are successively proximate to each other with a predetermined wavelength interval left therebetween;

a first bidirectional wavelength multiplexing coupler having first to fourth input/output terminals provided at an end thereof and having a fifth input/output terminal provided at the other end thereof, said first bidirectional wavelength multiplexing coupler leading out, when the first to third optical signals are supplied to said first to third input/output terminals thereof, respectively, a multiplexed optical signal of the first to third optical signals to said fifth input/output terminal, respectively;

a second bidirectional wavelength multiplexing coupler having sixth and seventh input/output terminals provided at an end thereof and having an eighth input/output terminal provided at the other end thereof, said second bidirectional wavelength multiplexing coupler leading out, when the multiplexed signal led out to said fifth input/output terminal of said first bidirectional wavelength multiplexing coupler is supplied to said sixth input/output terminal thereof, the multiplexed optical signal to said eighth input/output terminal;

a fourth opto-electric conversion section for converting fourth serial data into a fourth optical signal having a fourth center frequency proximate to the third center frequency with a predetermined wavelength interval left therebetween;

a fifth opto-electric conversion section for converting fifth serial data into a fifth optical signal;

a third bidirectional wavelength multiplexing coupler having ninth to twelfth input terminals provided at an end thereof and having a thirteenth input/output terminal provided at the other end thereof, said third bidirectional wavelength multiplexing coupler leading out, when the fourth optical signal is supplied to said twelfth input/output terminal thereof, the fourth optical signal to said thirteenth input/output terminal thereof;

a fourth bidirectional wavelength multiplexing coupler having fourteenth and fifteenth input/output terminals provided at an end thereof and having a sixteenth input/output terminal provided at the other end thereof, said fourth bidirectional wavelength multiplexing coupler leading out, when the fourth optical signal led out to said thirteenth input/output terminal of said third bidirectional wavelength multiplexing coupler is supplied to said fourteenth input/output terminal thereof, the fourth optical signal to said sixteenth input/output terminal thereof, said fourth bidirectional wavelength multiplexing coupler leading out, when the fifth optical signal is supplied to said fifteenth input/output terminal thereof, the fifth optical signal to said sixteenth input/output terminal thereof;

an optical signal transmission cable for transmitting the multiplexed signal led out to said eighth input/output terminal of said second bidirectional wavelength multiplexing coupler from a first end to a second end thereof and transmitting the fourth and fifth optical signals led out to said sixteenth input/output terminal of said fourth bidirectional wavelength multiplexing coupler from said second end to said first end thereof;

first to third opto-electric conversion sections provided at said second end of said optical signal transmission cable for converting the first to third optical signals led out to said ninth to eleventh input/output terminals of said third bidirectional wavelength multiplexing coupler, respectively, when the multiplexed optical signal having passed through said fourth bidirectional wavelength multiplexing coupler from said sixteenth input/output terminal to said fourteenth input/output terminal is supplied to said thirteenth input/output terminal of said third bidirectional wavelength multiplexing coupler, into the first to third serial data, respectively;

a fourth opto-electric conversion section provided at said first end of said optical signal transmission cable for converting the fourth optical signal led out to said fourth input/output terminal of said first bidirectional wavelength multiplexing coupler, when the fourth optical signal having passed through said second bidirectional wavelength multiplexing coupler from said eighth input/output terminal to said sixth input/output terminal passes through said first bidirectional wavelength multiplexing coupler from said fifth input/output terminal to said fourth input/output terminal, into the fourth serial data; and a fifth opto-electric conversion section provided at said first end of said optical signal transmission cable for converting the fifth optical signal led out to said seventh input/output terminal of said second bidirectional wavelength multiplexing coupler, when the fifth optical signal passes through said second bidirectional wavelength multiplexing coupler from said eighth input/output terminal to said seventh input/output terminal, into the fifth serial data.

* * * * *